(12) United States Patent
Ikenori et al.

(10) Patent No.: US 12,441,183 B2
(45) Date of Patent: Oct. 14, 2025

(54) OPERATION CONTROL METHOD, OPERATION CONTROL SYSTEM, AND OPERATION CONTROL PROGRAM

(71) Applicant: Yanmar Holdings Co., Ltd., Osaka (JP)

(72) Inventors: Kenta Ikenori, Okayama (JP); So Ueno, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 20 days.

(21) Appl. No.: 18/627,123

(22) Filed: Apr. 4, 2024

(65) Prior Publication Data

US 2024/0336137 A1    Oct. 10, 2024

(30) Foreign Application Priority Data

Apr. 6, 2023 (JP) ................. 2023-062202
Feb. 6, 2024 (JP) ................. 2024-016177

(51) Int. Cl.
| | |
|---|---|
| *B60K 35/10* | (2024.01) |
| *A01B 76/00* | (2006.01) |
| *B60K 26/02* | (2006.01) |
| *B60K 35/28* | (2024.01) |

(52) U.S. Cl.
CPC ........... *B60K 35/10* (2024.01); *A01B 76/00* (2013.01); *B60K 26/02* (2013.01); *B60K 35/28* (2024.01); *B60K 2360/11* (2024.01); *B60K 2360/167* (2024.01); *B60K 2360/175* (2024.01)

(58) Field of Classification Search
CPC ........... B60K 35/10; B60K 2826/02; B60K 2360/11; B60K 2360/167; B60K 2360/175; A01B 76/00; A01B 69/008; A01B 69/007; B60W 30/143; B60W 30/14; E02F 9/2045; E02F 9/262
See application file for complete search history.

(56) References Cited

U.S. PATENT DOCUMENTS

| | | |
|---|---|---|
| 2013/0030667 A1 | 1/2013 | Fujimoto et al. |
| 2017/0240175 A1 | 8/2017 | Miwa et al. |
| 2023/0249685 A1* | 8/2023 | Jeon ............ B60W 50/085 701/96 |

FOREIGN PATENT DOCUMENTS

| | | |
|---|---|---|
| EP | 1680952 A1 | 7/2006 |
| EP | 4385297 A2 | 6/2024 |
| JP | 2022-107655 A | 7/2022 |

OTHER PUBLICATIONS

European Extended Search Report dated Aug. 6, 2024, issued in EP Application No. 24168200.4.

* cited by examiner

*Primary Examiner* — Timothy Hannon
(74) *Attorney, Agent, or Firm* — NORTON ROSE FULBRIGHT US LLP

(57) ABSTRACT

The operation control method includes: executing travel control related to travel of the work machine; and adjusting acceleration until time at which a travel speed of the work machine reaches target speeds V1, V2 during the speed reduction of the work machine in accordance with a user's operation.

16 Claims, 48 Drawing Sheets

OPERATION CONTROL METHOD, OPERATION CONTROL SYSTEM, AND OPERATION CONTROL PROGRAM

CROSS-REFERENCE TO RELATED APPLICATION

This application claims priority under 35 U.S.C. § 119 to Japanese Patent Application Nos. JP2023-062202, filed on Apr. 6, 2023 and JP2024-016177, filed on Feb. 6, 2024, the entire contents of which are hereby incorporated by reference in their entireties.

TECHNICAL FIELD

The present invention relates to an operation control method, an operation control system, and an operation control program for a traveling work machine.

BACKGROUND ART

Conventionally, the following work machine capable of automatically traveling in a field has been known. The work machine includes an operation unit that accepts an operation to switch between a start and a stop of automatic steering and an operation to set a start point of a travel reference line for the automatic steering (for example, see Patent Document 1).

The work machine described in Patent Document 1 includes a reverser lever (shuttle lever) used to switch a travel direction of a machine body (vehicle body). When the reverser lever is at a neutral position, the work machine is stopped. When the reverser lever is operated forward, the work machine travels forward. When the reverser lever is operated backward, the work machine travels backward.

PRIOR ART DOCUMENT

Patent Document

Patent Document 1: Japanese Unexamined Patent Application Publication No. 2022-107655

SUMMARY OF INVENTION

Technical Problem

In regard to the above work machine, for example, when the machine body is decelerated suddenly in a case where the forward travel and the backward travel of the work machine is switched little by little, or another case, work accuracy by the work machine (work device) may be reduced, or a shock at the time of the deceleration may be transmitted to an operator.

An object of the present invention is to provide an operation control method, an operation control system, and an operation control program capable of easily alleviating a shock applied to a machine body of a work machine during deceleration.

Solution to Problem

An operation control method according to the present invention includes: executing travel control related to travel of a work machine; and adjusting acceleration until time at which a travel speed of the work machine reaches a target speed during a speed reduction of the work machine in accordance with a user's operation.

An operation control system according to the present invention includes a travel control unit and an acceleration adjustment processing unit. The travel control unit executes travel control related to travel of a work machine. The acceleration adjustment processing unit adjusts acceleration until time at which a travel speed of the work machine reaches a target speed during a speed reduction of the work machine in accordance with a user's operation.

An operation control program according to the present invention is a program for causing one or more processors to: execute travel control related to travel of a work machine; and adjust acceleration until time at which a travel speed of the work machine reaches a target speed during a speed reduction of the work machine in accordance with a user's operation.

Advantageous Effects of Invention

The present invention can provide the operation control method, the operation control system, and the operation control program capable of improving work efficiency of the work machine that includes a machine body and a work implement attached to the machine body.

DESCRIPTION OF EMBODIMENTS

The following embodiment is merely one example that embodies the present invention, and has no intention to limit the technical scope of the present invention.
(Basic Configuration)

Figure 2:
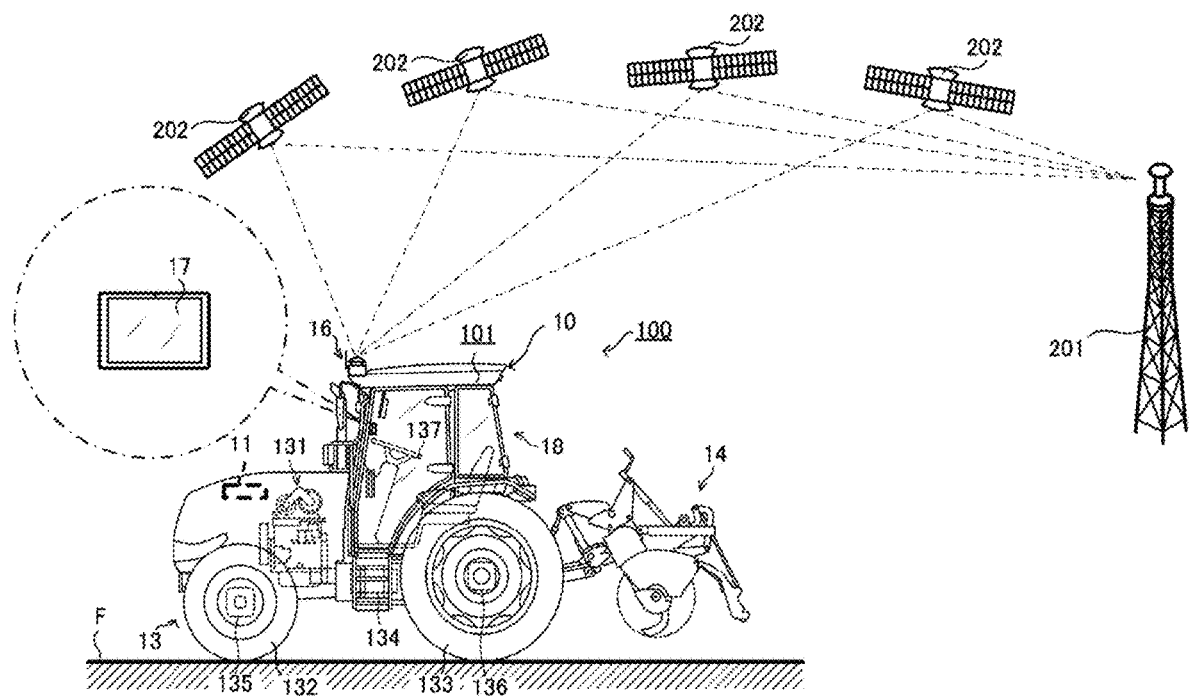
FIG. 2 is an external view illustrating an example of the work machine according to the basic configuration of the present invention.

An automatic travel system 100 according to a basic configuration of the present invention (an example of the operation control system in the present invention) includes a work machine 10, a satellite 202 (see FIGS. 2), and a base station 201 (see FIG. 2). In this basic configuration, a description will be made on an example of a case where the work machine 10 is a tractor. As another embodiment, the work machine 10 may be a work vehicle such as a rice transplanter, a combine harvester, a construction machine, or a snowplow, a flying object such as a drone for spraying work, or the like. In response to an operation by an operator (user), the work machine 10 performs predetermined work (for example, tillage work) while traveling in accordance with a target route in a field F (see FIG. 4). More specifically, the work machine 10 travels straight ahead on the target route in response to automatic steering and turns in response to manual steering (driving operation) by the operator. The work machine 10 travels in the field F and performs work while switching between automatic travel on a straight route and manual travel on a turning route. The target route may be generated in advance on the basis of the operation by the operator and stored as route data. The work machine 10 may automatically travel on each of the straight route and the turning route.

Figure 4:
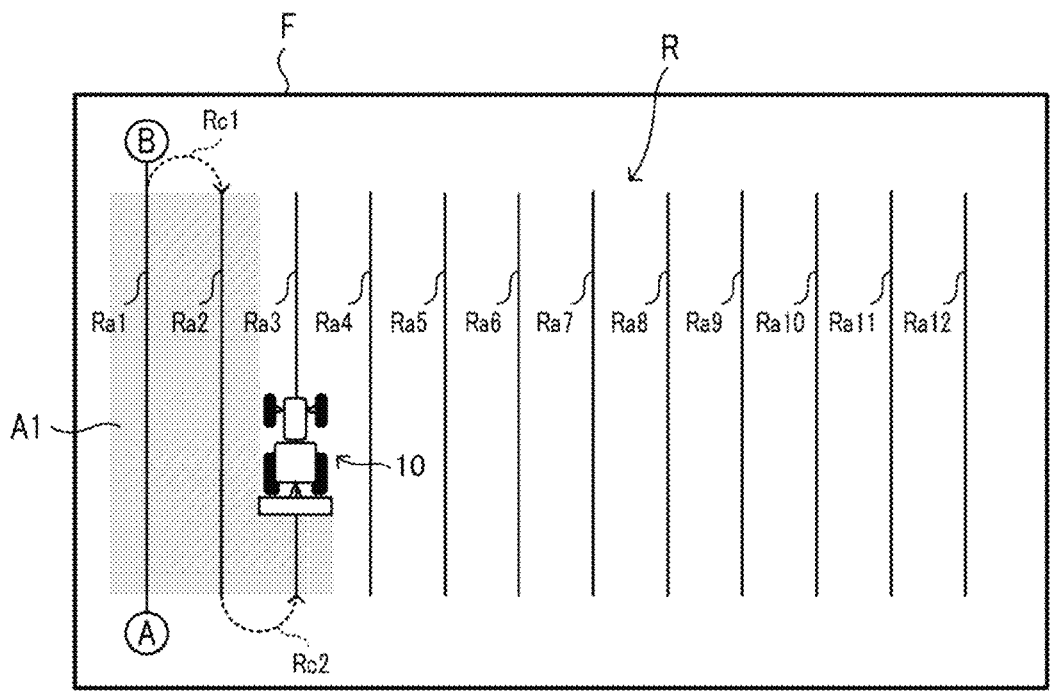
FIG. 4 is a view illustrating an example of a target route of the work machine according to the basic configuration of the present invention.

The work machine 10 travels in the field illustrated in FIG. 4, for example, while repeating straight travel and turning travel until the work is finished. A target route R for the automatic travel includes a plurality of straight routes (work routes). The plural work routes are substantially parallel to each other. FIG. 4 illustrates work routes Ra1 to Ra12. For example, the work machine 10 sequentially executes automatic travel on the work route Ra1, manual travel on a turning route Rc1, automatic travel on the work route Ra2, manual travel on a turning route Rc2, and automatic travel on the work route Ra3. A reference sign A1 illustrated in FIG. 4 denotes a work trajectory (worked area) in which the work machine 10 has traveled and performed work.

The target route R illustrated in FIG. 4 is an example, and the target route R is appropriately determined in accordance with a size of the work machine 10, a width of a work implement 14 (work width), a width in which adjacent work areas overlap each other (lap width), work contents, a shape of the field F, and the like.

The automatic travel system 100 also includes an operation terminal 17 operated by the operator. In other words, the operation terminal 17 constitutes the automatic travel system 100, which is an example of the operation control system, together with the work machine 10 and the like. The operation terminal 17 is, for example, a general-purpose terminal such as a tablet terminal, a smartphone, or a laptop computer. Dedicated application software (program) is installed in the operation terminal 17, which is the general-purpose terminal, and the operation terminal 17 functions as the operation terminal 17 of the automatic travel system 100 by activating the application software. The operation terminal 17 is mutually communicable with the work machine 10. The term "communicable" described in the present disclosure means that information can be transmitted/received directly or indirectly via a communication network (network), a relay, or the like by a wired communication method or a wireless communication method (using a radio wave or optical medium) as appropriate. Examples of the communication network are the Internet, a local area network (LAN), a wide area network (WAN), a public telephone line, a mobile telephone line network, a packet network, and a wireless LAN.

For example, the operator performs an operation to register various types of information (work machine information, field information, work information, and the like) on the operation terminal 17. In addition, at a location away from the work machine 10, the operator can comprehend a travel status, a work status, and the like of the work machine 10 by a travel trajectory displayed on the operation terminal 17. In this basic configuration, as an example, as illustrated in FIG. 2, the operation terminal 17 is arranged in a cabin 18 as a boarding unit, which the operator boards, in the work machine 10. The operation terminal 17 may be included in the components of the work machine 10, or may not be included in the components of the work machine 10.

[Work Machine 10]

Figure 1:
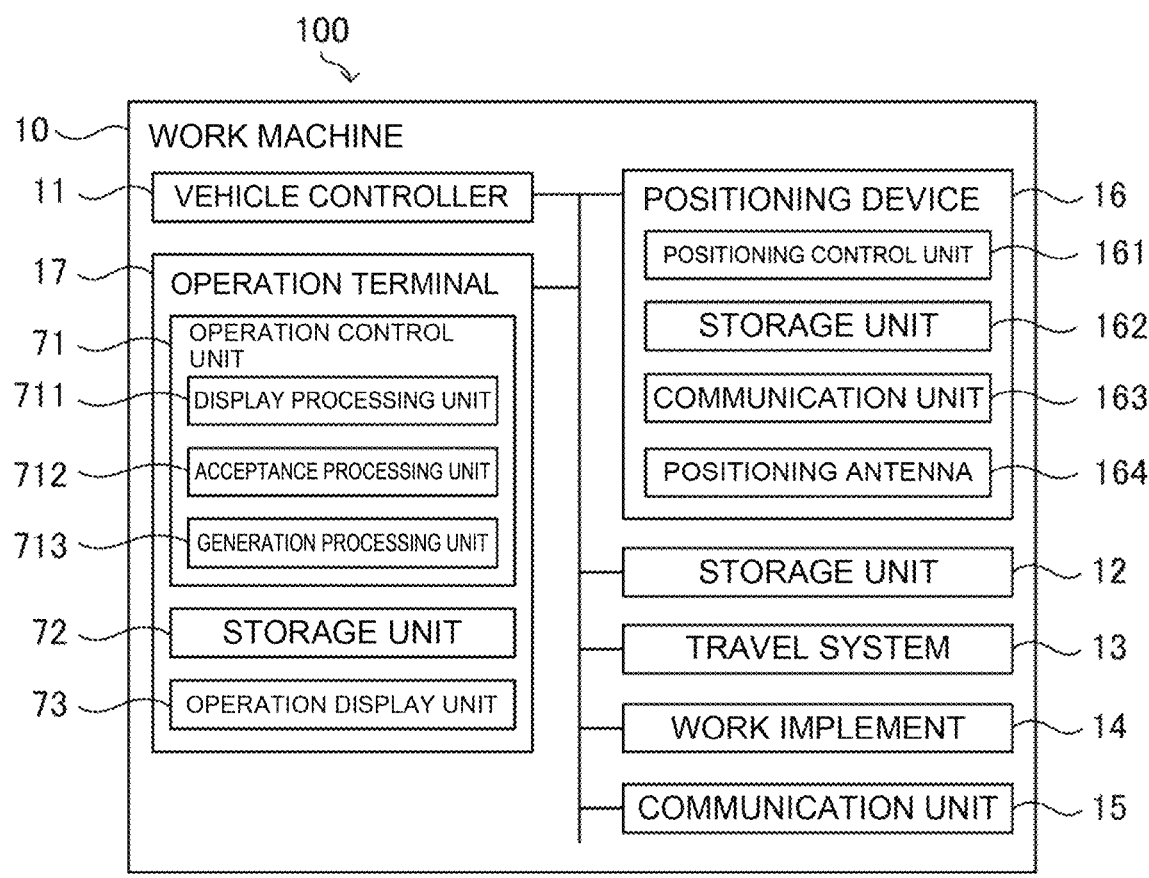
FIG. 1 is a block diagram illustrating a configuration of a work machine according to a basic configuration of the present invention.

As illustrated in FIG. 1 and FIG. 2, the work machine 10 includes a vehicle controller 11, a storage unit 12, a travel system 13, the work implement 14, a communication unit 15, a positioning device 16, and the operation terminal 17. The vehicle controller 11 is electrically connected to the storage unit 12, the travel system 13, the work implement 14, the positioning device 16, the operation terminal 17, and the like. The travel system 13 is at least provided in the machine body 101 of the work machine 10. The vehicle controller 11 and the positioning device 16 may be wirelessly communicable with each other. In addition, the vehicle controller 11 and the operation terminal 17 may be wirelessly communicable with each other.

The communication unit 15 is a communication interface that connects the work machine 10 to the communication network by wire or wirelessly and executes data communication in accordance with a predetermined communication protocol with an external device (operation terminal or the like) via the communication network.

The storage unit 12 is a non-volatile storage unit such as a hard disk drive (HDD) or a solid-state drive (SSD) that stores various types of information. The storage unit 12 stores control programs such as an operation control program for causing the vehicle controller 11 to execute operation control processing (see FIG. 15), which will be described below. For example, the operation control program is non-temporarily recorded on a computer-readable recording medium such as a compact disc (CD) or a digital versatile disc (DVD) and is read out by a predetermined reading device (not illustrated) to be stored in the storage unit 12. The operation control program may be downloaded from a server (not illustrated) to the work machine 10 via the communication network and then stored in the storage unit 12. In addition, the storage unit 12 may store data on the target route generated in the operation terminal 17.

The travel system 13 is a drive unit that causes the work machine 10 to travel. As illustrated in FIG. 2, the travel system 13 includes an engine 131, a front wheel 132, a rear wheel 133, a transmission 134, a front axle 135, a rear axle 136, and a steering wheel 137. The front wheel 132 and the rear wheel 133 are provided on each of the right and left of the work machine 10. In addition, the travel system 13 is not limited to a wheel type equipped with the front wheel 132 and the rear wheel 133, and may be a crawler type equipped with a crawler provided on each of the right and left of the work machine 10.

The engine 131 is a drive source such as a diesel engine or a gasoline engine driven by using fuel supplied to a fuel tank (not illustrated). The travel system 13 may include an electric motor as a drive source, together with the engine 131 or instead of the engine 131. A generator (not illustrated) is connected to the engine 131, and electric power is supplied from the generator to electric components, such as the vehicle controller 11 provided in the work machine 10, a battery, and the like. The battery is charged with the electric power supplied from the generator. The electric components, such as the vehicle controller 11, the positioning device 16, and the operation terminal 17 provided in the work machine 10, can be driven by the electric power supplied from the battery even after the engine 131 is stopped.

A driving force of the engine 131 is transmitted to the front wheel 132 via the transmission 134 and the front axle 135 and transmitted to the rear wheel 133 via the transmission 134 and the rear axle 136. The driving force of the engine 131 is also transmitted to the work implement 14 via a power take-off (PTO) shaft (not illustrated). The travel system 13 performs a travel action in accordance with a command by the vehicle controller 11.

The work implement 14 is, for example, a tiller, a seeder, a mower, a plow, or a fertilizer applicator and detachably mounted to the machine body 101 of the work machine 10. Thus, the work machine 10 can perform various types of work by using each work implement 14. FIG. 2 illustrates a case where the work implement 14 is the tiller.

In the work machine 10, the work implement 14 may be supported by a lifting-lowering mechanism (not illustrated) so as to be lifted or lowered. The vehicle controller 11 can lift or lower the work implement 14 by controlling the lifting-lowering mechanism. For example, the vehicle controller 11 lowers the work implement 14 to a work position when the operator uses a lifting-lowering lever 14L (see FIG. 3) and performs an operation to lower the work implement 14 (for example, an operation to place the lifting-lowering lever 14L in a "lowering" position). Meanwhile, the vehicle controller 11 lifts the work implement 14 to a non-work position when the operator uses the lifting-lowering lever 14L and performs an operation to lift the work implement 14 (for example, an operation to place the lifting-lowering lever 14L in a "lifting" position). The lifting-lowering lever 14L is provided, for example, near the steering wheel 137 (see FIG. 3) but may be provided at another position in the cabin 18.

In addition, the vehicle controller 11 outputs a work stop command to the work implement 14 when acquiring a work stop instruction. When acquiring the work stop instruction, the vehicle controller 11 stops driving of the PTO shaft to stop an action (work) of the work implement 14.

The steering wheel 137 is an operation unit operated by the operator or the vehicle controller 11. For example, in response to an operation of the steering wheel 137 by the operator or the vehicle controller 11, the travel system 13 changes an angle of the front wheel 132 by a hydraulic power steering mechanism (not illustrated) or the like to change a travel direction of the work machine 10.

The travel system 13 also includes a primary speed change lever, a PTO switch, a reverser lever, a shift lever, an accelerator, a clutch, a brake, and the like. For example, the travel system 13 increases a vehicle speed of the work machine 10 when the operator performs a speed increasing operation to increase the vehicle speed of the work machine 10 by using the primary speed change lever. Meanwhile, the travel system 13 reduces the vehicle speed of the work machine 10 when the operator performs a speed reducing operation to reduce the vehicle speed of the work machine 10 by using the primary speed change lever. The reverser lever is an operation tool for switching between forward travel and backward travel of the work machine 10 and can be set to "forward", "neutral", or "backward".

In addition, for example, the travel system 13 transmits the driving force of the engine 131 to the work implement 14 via the PTO shaft to activate the work implement 14 when the operator performs an operation to set the PTO switch to ON (for example, an operation to place the PTO switch in an "ON" position). Meanwhile, the travel system 13 blocks transmission of the driving force from the engine 131 to the work implement 14 to stop the action of the work implement 14 when the operator performs an operation to set the PTO switch to OFF (for example, an operation to place the PTO switch in an "OFF" position).

In response to an operation of the brake, the travel system 13 brakes rotation of the front wheel 132 and the rear wheel 133 by using an electromagnetic brake. Furthermore, in response to an operation of the shift lever, the travel system 13 switches a gear of the transmission 134 to a forward gear, a backward gear, or the like and switches a travel mode of the work machine 10 to the forward travel, the backward travel, or the like. Moreover, in response to an operation of the accelerator, the travel system 13 controls a speed of the engine 131.

The positioning device 16 is communication equipment including a positioning control unit 161, a storage unit 162, a communication unit 163, a positioning antenna 164, and the like. For example, as illustrated in FIG. 2, the positioning device 16 is provided on top of the cabin 18 which the operator boards. However, an installation position of the positioning device 16 is not limited to the cabin 18. Furthermore, the positioning control unit 161, the storage unit 162, the communication unit 163, and the positioning antenna 164 in the positioning device 16 may be arranged separately at different positions in the work machine 10. As described above, the battery is connected to the positioning device 16, and the positioning device 16 can be activated even when the engine 131 is stopped. For example, a mobile phone terminal, a smartphone, a tablet terminal, or the like may be used as the positioning device 16.

The positioning control unit 161 is a computer system including one or more processors and storage memory, such as non-volatile memory and random access memory (RAM). The storage unit 162 is non-volatile memory or the like that stores a positioning control program and data such as positioning information and travel information, and the positioning control program causes the positioning control unit 161 to execute positioning processing. For example, the positioning control program is non-temporarily recorded on a computer-readable recording medium such as a CD or a DVD and is read out by a predetermined reading device (not illustrated) to be stored in the storage unit 162. The positioning control program may be downloaded from a server (not illustrated) to the positioning device 16 via the communication network and then stored in the storage unit 162.

The communication unit 163 is a communication interface that connects the positioning device 16 to the communication network by wire or wirelessly and executes data communication in accordance with a predetermined communication protocol with an external device such as a base station server via the communication network.

The positioning antenna 164 is an antenna that receives a radio wave (global navigation satellite system (GNSS) signal) emitted from a satellite.

The positioning control unit 161 calculates a current position of the work machine 10 on the basis of the GNSS signal that the positioning antenna 164 receives from the satellite. For example, in the case where the work machine 10 automatically travels in the field F, and the positioning antenna 164 receives the radio waves (emitting time, orbit information, and the like) emitted from a plurality of the satellites 202, the positioning control unit 161 calculates a distance between the positioning antenna 164 and each of the satellites 202 and calculates the current position (a latitude and a longitude) of the work machine 10 on the basis of the calculated distance. Here, the positioning control unit 161 may perform positioning by real-time kinematic method (RTK-GNSS positioning method (RTK method)) for calculating the current position of the work machine 10 by using correction information corresponding to the base station (reference station) 201 near the work machine 10. In this way, the work machine 10 automatically travels using the positioning information based on the RTK method. The current position of the work machine 10 may be the same position as the position at which positioning is performed (for example, a position of the positioning antenna 164) or may be a position shifted from the position at which positioning is performed.

The operation terminal is equipment operated by the operator who boards the work machine 10, displays various types of information, and accepts the operation by the operator. More specifically, the operation terminal 17 displays various setting screens to accept various setting operations from the operator, and displays a guidance screen to display information on the traveling work machine 10. A specific configuration of the operation terminal 17 will be described below.

The vehicle controller 11 includes control units such as a central processing unit (CPU), random access memory (ROM), and RAM. The CPU is a processor that executes various types of arithmetic processing. The ROM is a non-volatile storage unit that stores, in advance, control programs such as Basic Input/Output System (BIOS) and an operating system (OS) for causing the CPU to execute the various types of the arithmetic processing. The RAM is a volatile or non-volatile storage unit that stores various types of information, and is used as temporary storage memory (work area) for various types of processing executed by the CPU. The vehicle controller 11 controls the work machine 10 by causing the CPU to execute the various control programs stored in advance in the ROM or the storage unit 12. In addition, the vehicle controller 11 causes the CPU to execute various types of processing in accordance with the automatic travel program. The vehicle controller 11 is an example of an action processing unit in the present invention.

More specifically, the vehicle controller 11 controls travel of the work machine 10. For example, when a travel mode of the work machine 10 is the manual travel (manual travel mode), the vehicle controller 11 causes the work machine 10 to manually travel on the basis of an operation (manual steering) by the operator. For example, the vehicle controller 11 acquires operation information corresponding to the driving operation by the operator, such as a steering operation, a speed change operation, a shift operation, an accelerator operation, or a brake operation, and causes the travel system 13 to perform the travel action on the basis of the operation information.

When the travel mode of the work machine 10 is the automatic travel (automatic travel mode), the vehicle controller 11 causes the work machine 10 to automatically travel on the basis of positional information (positioning information) indicating the current position of the work machine 10 positioned by the positioning control unit 161. For example, when the work machine 10 satisfies an automatic travel start condition and acquires a travel start instruction from the operator, the vehicle controller 11 starts the automatic travel of the work machine 10 on the basis of the positioning information. In addition, the vehicle controller 11 causes the work machine 10 to automatically travel in accordance with the target route R (work route) (see FIG. 4) that is generated in advance.

When the work machine 10 reaches an end (end point) of the work route, the vehicle controller 11 switches the travel mode to the manual travel. The vehicle controller 11 may switch the travel mode to the manual travel when determining that the work machine 10 has reached the end point, or may switch the travel mode to the manual travel in response to the operation by the operator. When the travel mode is switched to the manual travel, for example, the operator causes the work machine 10 to turn (manually travel) by manual steering (see FIG. 4). Examples of a position of the end point of each work route are: a position inside an edge of the field F by a predetermined distance; a position specified by the operator in advance; a position aligned with a position, at which the operator has switched the automatic travel to the manual travel, in the last worked route (a position at which the work route intersects a line that passes the position, at which the automatic travel is switched to the manual travel, and is perpendicular to the worked route, or a position at which the work route intersects a line that passes the position, at which the automatic travel is switched to the manual travel, and is parallel to an edge line of the field F); and a position at which the work route intersects a line that passes a point B on a reference line L1 and is perpendicular to the reference line L1 (for example, a position Pe in FIG. 5C).

The end point of each of the work routes, on which the work machine 10 automatically travels, corresponds to a position of a start point of a non-work route (turning route), on which the work machine 10 manually travels, and a start point of each of the work routes corresponds to an end point of the non-work route (turning route).

As described so far, the vehicle controller 11 switches the travel mode in response to the operation by the operator on the operation terminal 17 to cause the work machine 10 to automatically travel on the work route (target route R) by automatic steering and to manually travel on the non-work route (turning route) by manual steering. In addition, the vehicle controller 11 causes the work machine 10 to execute actions (a sound emission action, a display action, a travel control action, and the like) according to a setting operation by the operator at the end point of each of the work routes.

The term "automatic travel" described in the present disclosure includes "autonomous travel" in which the work machine 10 autonomously travels without relying on the operation by the operator and "semi-automatic travel" in which only steering is automated, for example, as is the case with straight travel assist.

The "autonomous travel" is, for example, a travel mode in which the vehicle speed and the like are automatically controlled in addition to the automatic steering of steered wheels (front wheels 132) in such a manner that the work machine 10 travels along the target route R. The "straight travel assist" is, for example, a travel mode in which only the automatic steering of the steered wheels (front wheels 132) is performed and the vehicle speed and the like are controlled by the operation by the operator in such a manner that the work machine 10 travels along a linear route that is parallel to a straight line (reference line) serving as a reference. That is, in the "semi-automatic travel", although the work machine 10 cannot travel without the operation by the operator, a burden of steering on the operator is reduced, and the work machine 10 can travel along the target route R such as the linear route, which leads to improvement in work efficiency. In addition, since the steered wheels (front wheels 132) are automatically steered in both of the autonomous travel and the semi-automatic travel, it can be said that such a case is one mode of the automatic steering.

In this basic configuration, unless otherwise specified, the "automatic travel" is the "straight travel assist" in which only steering is automated and the work machine 10 travels along the linear route. In other words, as illustrated in FIG. 4, when the target route R including the work routes Ra1 to Ra12 as a plurality of linear routes (straight routes) is set, the work machine 10 sequentially executes the automatic travel (straight travel assist) on the work route Ra1, the manual travel on the turning route Rc1, the automatic travel (straight travel assist) on the work route Ra2, the manual travel on the turning route Rc2, and the automatic travel (straight travel assist) on the work route Ra3.

[Operation Terminal 17]

As illustrated in FIG. 1, the operation terminal 17 includes an operation control unit 71, a storage unit 72, an operation display unit 73, and the like. The operation terminal 17 may be equipment that is detachably mounted to the work machine 10. Alternatively, the operation terminal 17 may be a portable terminal (the tablet terminal, the smartphone, or the like) that can be carried by the operator. The operation terminal 17 is communicably connected to the vehicle controller 11 by wire or wirelessly.

The operation display unit 73 is a user interface that includes: a display unit such as a liquid-crystal display or an organic EL display for displaying various types of information; and an operation unit such as an operation button or a touch panel for accepting an operation. The operation display unit 73 displays various display screens in response to an instruction from the operation control unit 71. In addition, the operation display unit 73 accepts the operation by the operator on each of the display screens.

Figure 3:
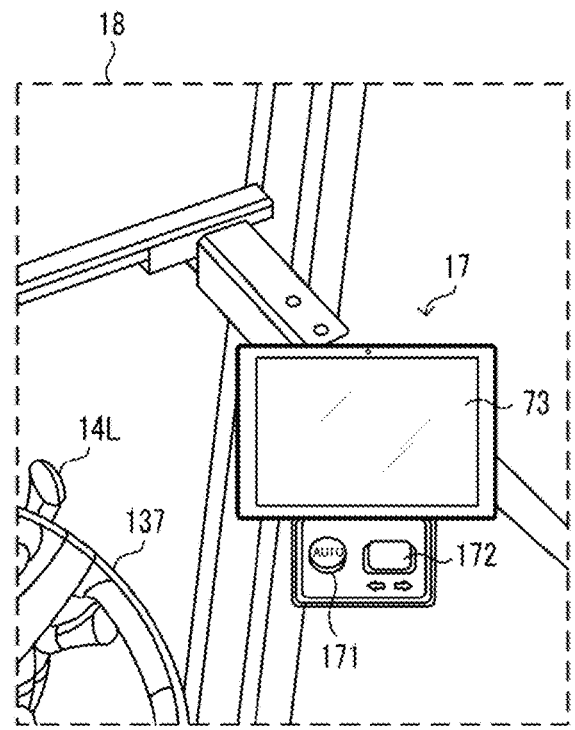
FIG. 3 is an external view illustrating an example of an operation terminal according to the basic configuration of the present invention.

The operation unit includes: an automatic travel button 171 with which the operator issues a travel start instruction at the time of starting the automatic travel of the work machine 10; and a shift button 172 with which a correction operation (shift operation) is performed to correct a positional deviation of the work machine 10 from the target route (see FIG. 3). The automatic travel button 171 and the shift button 172 may be configured as physical buttons.

For example, as illustrated in FIG. 2 and FIG. 3, the operation terminal 17 is installed near the steering wheel 137 in the cabin 18.

The storage unit 72 is a non-volatile storage unit such as an HDD or an SSD that stores various types of information. The storage unit 72 stores control programs such as an operation control program for causing the operation terminal 17 to execute the operation control processing (see FIG. 15), which will be described below. For example, the operation control program is non-temporarily recorded on a computer-readable recording medium such as a CD or a DVD and is read out by a predetermined reading device (not illustrated) to be stored in the storage unit 72. The operation control program may be downloaded from a server (not illustrated) to the operation terminal 17 via the communication network and then stored in the storage unit 72. In addition, the storage unit 72 may store data on the target route generated in the operation terminal 17. Furthermore, the control program may include a route generation program for generating the target route.

The operation control unit 71 includes control units such as a CPU, ROM, and RAM. The CPU is a processor that executes various types of arithmetic processing. The ROM is a non-volatile storage unit that stores, in advance, control programs such as BIOS and an OS for causing the CPU to execute the various types of the arithmetic processing. The RAM is a volatile or non-volatile storage unit that stores various types of information, and is used as temporary storage memory (work area) for various types of processing executed by the CPU. The operation control unit 71 controls the operation terminal 17 by causing the CPU to execute the various control programs stored in advance in the ROM or the storage unit 72.

More specifically, as illustrated in FIG. 1, the operation control unit 71 includes various processing units such as a display processing unit 711, an acceptance processing unit 712, and a generation processing unit 713. The operation terminal 17 functions as the various processing units by causing the CPU to execute various processing in accordance with the control programs. Some or all of the processing units may include an electronic circuit. The control program may be a program that causes a plurality of processors to function as the processing units.

Figure 8:
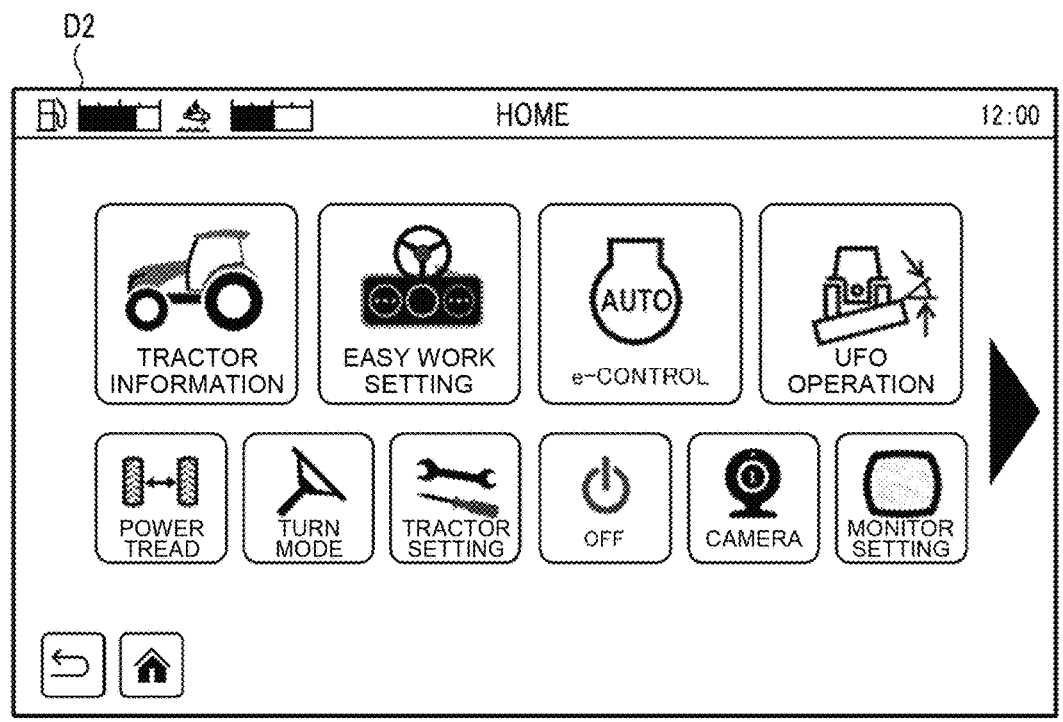
FIG. 8 is a view illustrating an example of a home screen displayed on the operation terminal according to the basic configuration of the present invention.

The display processing unit 711 displays various types of information on the operation display unit 73. For example, the display processing unit 711 displays, on the operation display unit 73, an operation screen for generating the target route, an operation screen displaying information on the automatic travel (the travel status, the work status, and the like of the work machine 10) (a guidance screen D1 in FIG. 6 and the like), a menu screen (a home screen D2 in FIG. 8 and the like), a setting screen for making various settings (for example, an UFO operation screen D3 in FIG. 9 and the like), and the like.

The acceptance processing unit 712 accepts various operations by the operator. For example, the acceptance processing unit 712 accepts, from the operator, an operation to input setting information for causing the work machine 10 to automatically travel, an operation to generate the target route for the automatic travel, an operation to start or stop the automatic travel, and the like.

The generation processing unit 713 generates the target route R on which the work machine 10 automatically travels. For example, the generation processing unit 713 generates the target route R includes a plurality of straight routes (work routes) arranged at predetermined intervals (equally-spaced intervals) on the basis of the reference line L1 passing through a point A (first reference point) and a point B (second reference point) in the field F.

Hereinafter, a description will be made on an example of a procedure for generating the target route R. For example, the display processing unit 711 displays, on the operation display unit 73, an operation screen (not illustrated) for accepting a setting operation to set the reference line L1 from the operator. The operator moves the work machine 10 to a desired position in the field F and presses a point A registration button (not illustrated). For example, the operator moves the work machine 10 to an outer peripheral edge of the field F and presses the point A registration button. When the operator presses the point A registration button, the generation processing unit 713 registers the current position of the work machine 10 as the first reference point (point A). When the generation processing unit 713 registers the point A, the display processing unit 711 displays, on the operation display unit 73, an operation screen (not illustrated) for accepting a registration operation of the second reference point (point B). The operator causes the work machine 10 to manually travel in a direction (target direction) in which the work machine 10 is desired to travel and work (see FIG. 5A). More specifically, the operator causes the work machine 10 to travel straight ahead in a direction parallel to a work direction (for example, a tillage direction) at the time when the work machine 10 works in the work area. At this time, the work machine 10 may perform predetermined work (for example, the tillage work) while manually traveling. Then, the operator presses a point B registration button (not illustrated) at a desired position (for example, the outer peripheral edge of the field F). When the operator presses the point B registration button, the generation processing unit 713 registers the current position of the work machine 10 as the second reference point (point B).

Figure 5A:
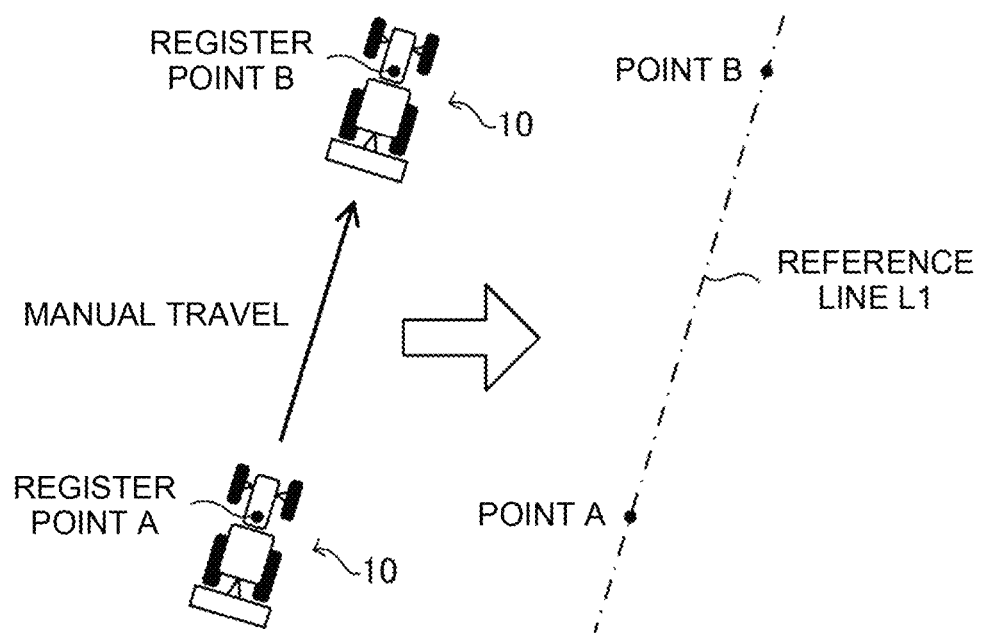
FIG. 5A is a view for explaining a travel method for automatic travel of the work machine according to the basic configuration of the present invention.

When acquiring positional information on the point A and the point B, the generation processing unit 713 sets a linear line passing through the point A and the point B as the reference line L1 (see FIG. 5A). The generation processing unit 713 may be able to adjust the orientation of the generated reference line L1. For example, the generation processing unit 713 displays the generated reference line L1 on the operation screen and, when accepting the registration operation from the operator, sets (registers) the reference line L1. Meanwhile, when accepting an operation (for example, a screen touch operation) to change the orientation of the reference line L1 from the operator, the generation processing unit 713 adjusts the orientation of the reference line L1 in response to the operation. When accepting an operation to register the point B, the generation processing unit 713 may display a screen for selecting whether to register or adjust the reference line L1.

Figure 5B:
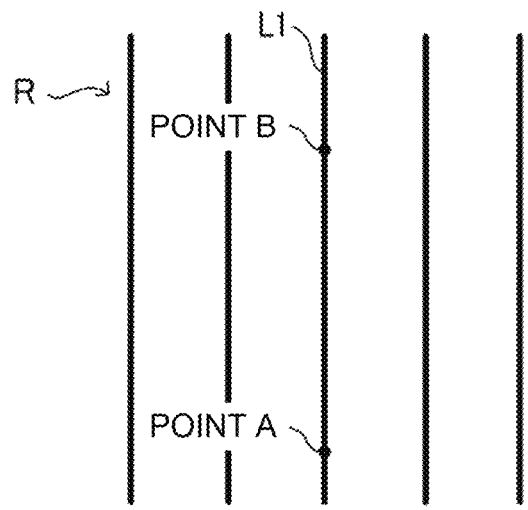
FIG. 5B is a view for explaining the travel method for the automatic travel of the work machine according to the basic configuration of the present invention.
Figure 5C:
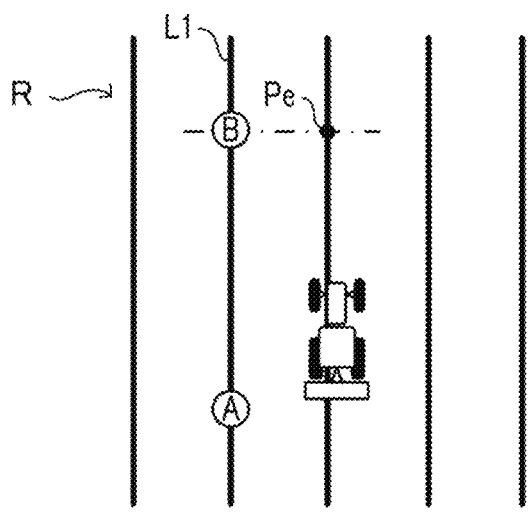
FIG. 5C is a view for explaining the travel method for the automatic travel of the work machine according to the basic configuration of the present invention.

The generation processing unit 713 generates a travel route (target route R) including the reference line L1 and a plurality of straight lines parallel to the reference line L1. For example, the generation processing unit 713 generates the plurality of parallel straight lines at equally-spaced intervals with reference to the reference line L1 on the basis of the work width (lateral width of the work implement 14), which is set in advance, and the lap width (width that overlaps the adjacent worked area) (see FIG. 5B). The generation processing unit 713 registers the generated target route R in the storage unit 72 and displays the generated target route R on the operation display unit 73.

According to the above-described method, since the target route R can be generated using the reference line L1 passing through the two points (point A and point B) at both ends of the field F (see FIG. 4), it is possible to improve work accuracy by the work machine 10. The generation processing unit 713 may be able to register the point B only under the condition that the work machine 10 has traveled a predetermined distance (for example, 5 m) after the registration of the point A. In this way, the further accurate reference line L1 can be set.

The method for generating the target route R is not limited to the above-described method, and may be, for example, a method for generating the target route R on the basis of a reference line generated from the point A and an orientation of the work machine 10 ("point A+vehicle azimuth") or a method for generating the target route R on the basis of a reference line generated from the point A and a set azimuth ("point A+set azimuth").

Figure 6:
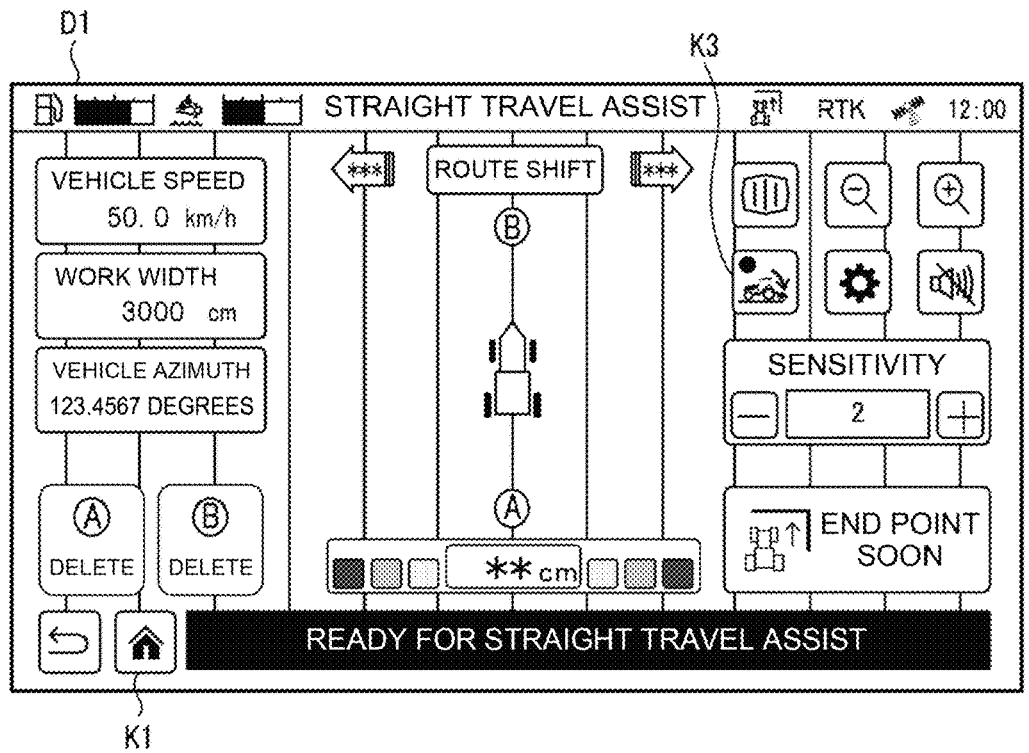
FIG. 6 is a view illustrating an example of a guidance screen displayed on the operation terminal according to the basic configuration of the present invention.

After the target route R is generated, the operator issues an instruction to the work machine 10 to start the automatic travel in the field F (travel start instruction). For example, when the automatic travel start condition is satisfied and the work machine 10 is brought into a state capable of automatically traveling, for example, a state where the work machine 10 is positioned within a predetermined range from the target route R and within a predetermined orientation with respect to the target route R (see FIG. 5C), the display processing unit 711 displays the guidance screen D1 illustrated in FIG. 6. In addition, the display processing unit 711 displays, on the guidance screen D1, a message indicating that the work machine 10 has been brought into the state capable of automatically traveling (for example, "READY FOR STRAIGHT TRAVEL ASSIST"). The guidance screen D1 illustrated in FIG. 6 is an example of an acceptance screen that accepts the instruction to start the automatic travel of the work machine 10 from the operator.

Next, the operator presses the automatic travel button 171 (see FIG. 3) to issue the travel start instruction. When the operator presses the automatic travel button 171 in a state where the guidance screen D1 is displayed on the operation terminal 17, the vehicle controller 11 accepts the travel start instruction and starts the automatic travel of the work machine 10 in such a manner that the work machine 10 follows the target route R. As illustrated in FIG. 4, the work machine 10 performs the predetermined work while automatically traveling along the work route included in the target route R, is switched to the manual travel at the end point of the work route, and turns on the turning route by the manual steering performed by the operator.

Figure 9:
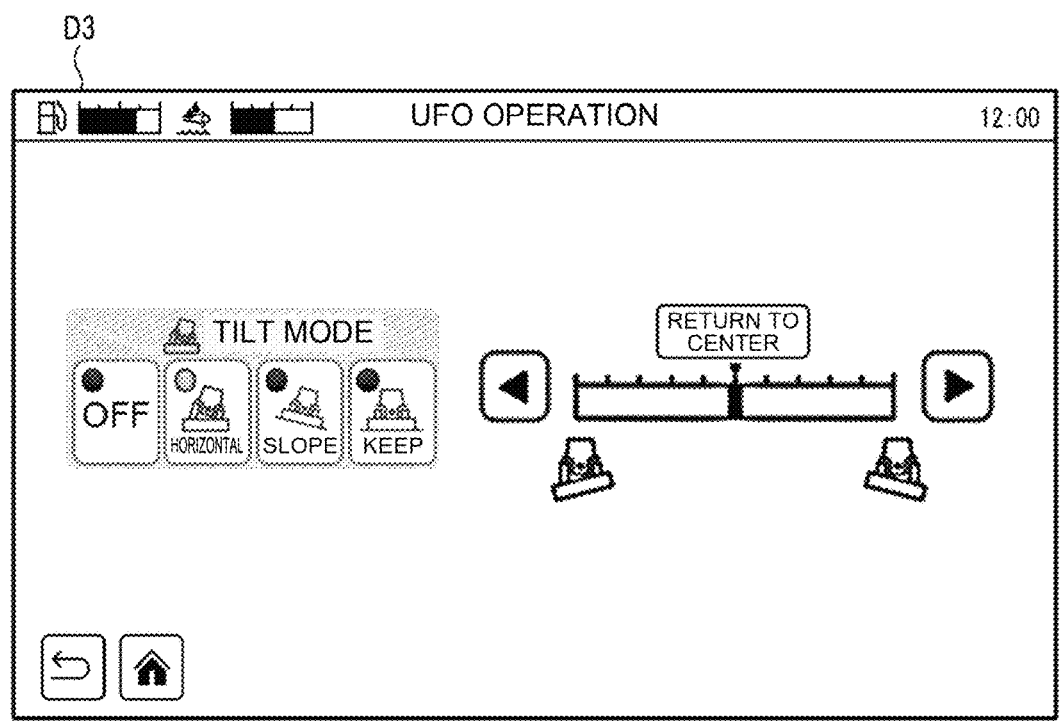
FIG. 9 is a view illustrating an example of a UFO operation screen displayed on the operation terminal according to the basic configuration of the present invention.

Furthermore, when the operator presses the automatic travel button 171 in the state where the guidance screen D1 is displayed on the operation terminal 17, as illustrated in FIG. 9, the display processing unit 711 displays, on the guidance screen D1, a message indicating that the work machine 10 is automatically traveling (for example, "TRAVELING WITH STRAIGHT TRAVEL ASSIST").

Here, when the operator attempts to start the automatic travel, a different display screen from the guidance screen D1 (see FIG. 6) may be displayed on the operation terminal 17. For example, in the case where the operator wishes to make a setting on horizontal control of the work machine 10 (UFO operation) before starting the automatic travel, the operator presses a home button K1 on the guidance screen D1 illustrated in FIG. 6. When the operator presses the home button K1, the display processing unit 711 displays the home screen D2 illustrated in FIG. 8. Next, when the operator presses an icon of "UFO OPERATION" on the home screen D2, the display processing unit 711 displays the UFO operation screen D3 illustrated in FIG. 9. The operator can make the setting on the horizontal control on the UFO operation screen D3.

When completing the setting on the horizontal control, the operator issues the travel start instruction for starting the automatic travel. For example, the operator presses the automatic travel button 171 (see FIG. 3) in a state where the UFO operation screen D3 (see FIG. 9) or the home screen D2 (see FIG. 8) is displayed on the operation terminal 17. When the automatic travel button 171 is pressed in the state where the different display screen (the UFO operation screen D3 or the home screen D2) from the guidance screen D1 is displayed on the operation terminal 17, the display processing unit 711 shifts (makes a transition from) the display screen to the guidance screen D1 (see FIG. 6).

Figure 7:
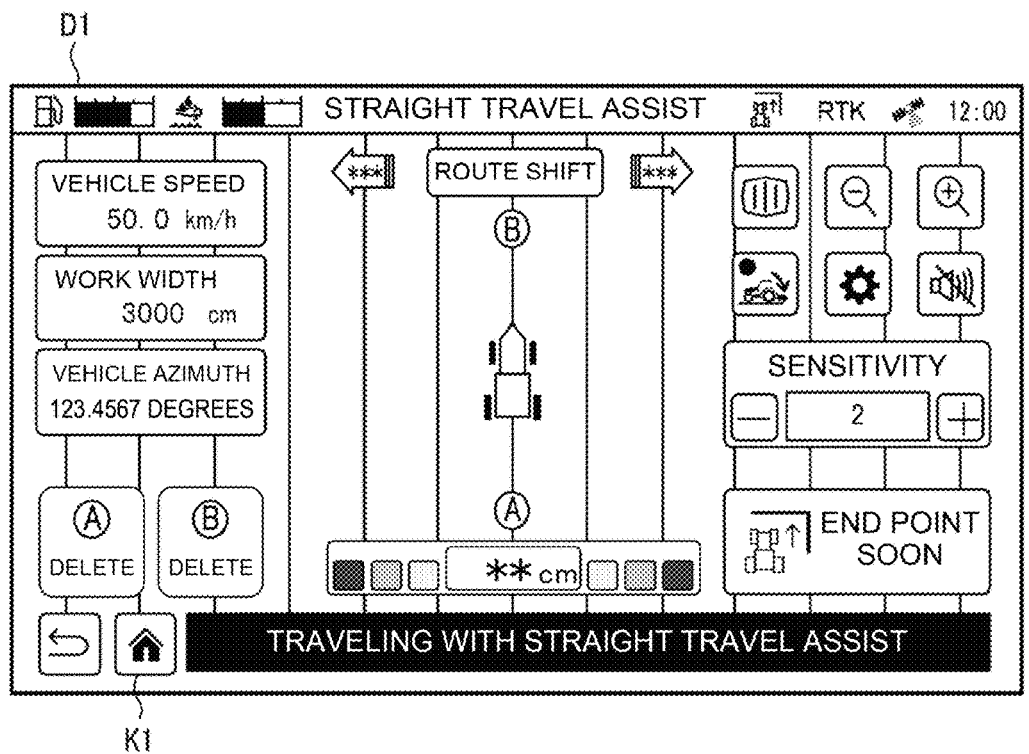
FIG. 7 is a view illustrating an example of the guidance screen displayed on the operation terminal according to the basic configuration of the present invention.

When the automatic travel button 171 is pressed in the state where the different display screen from the guidance screen D1 is displayed on the operation terminal 17, the vehicle controller 11 accepts the travel start instruction but does not start the automatic travel of the work machine 10. When the display screen is shifted to the guidance screen D1 (see FIG. 6), and the operator presses the automatic travel button 171 in the state where the automatic travel condition is satisfied, the vehicle controller 11 accepts the travel start instruction and starts the automatic travel of the work machine 10 in such a manner that the work machine 10 follows the target route R. In addition, as illustrated in FIG. 7, the display processing unit 711 displays, on the guidance screen D1, the message indicating that the work machine 10 is automatically traveling ("TRAVELING WITH STRAIGHT TRAVEL ASSIST").

Just as described, when the operator operates the automatic travel button 171 in the state where the guidance screen D1 (see FIG. 6) related to the automatic travel of the work machine 10 is displayed on the operation terminal 17, the vehicle controller 11 causes the work machine 10 to start the automatic travel, and the display processing unit 711 displays the information on the automatic travel ("TRAVELING WITH STRAIGHT TRAVEL ASSIST") on the guidance screen D1.

Meanwhile, when the operator operates the automatic travel button 171 in a state where a non-guidance screen (the UFO operation screen D3 (see FIG. 9), the home screen D2 (see FIG. 8), or the like) different from the guidance screen D1 is displayed on the operation terminal 17, the vehicle controller 11 does not cause the work machine 10 to start the automatic travel, and the display processing unit 711 shifts the non-guidance screen to the guidance screen D1.

That is, when the operator operates the automatic travel button 171 in the state where the guidance screen D1 is displayed on the operation terminal 17, the vehicle controller 11 causes the work machine 10 to automatically travel. On the contrary, when the operator operates the automatic travel button 171 in the state where the non-guidance screen is displayed on the operation terminal 17, the vehicle controller 11 does not cause the work machine 10 to automatically travel. In addition, when the operator operates the automatic travel button 171 in the state where the guidance screen D1 is displayed on the operation terminal 17, and the automatic travel start condition is satisfied, the vehicle controller 11 causes the work machine 10 to automatically travel. Meanwhile, in the case where the operator operates the automatic travel button 171 in the state where the non-guidance screen is displayed on the operation terminal 17, the vehicle controller 11 does not cause the work machine 10 to automatically travel even when the automatic travel start condition is satisfied.

When the operator operates the automatic travel button 171 in the state where the guidance screen D1 is displayed on the operation terminal 17, the display processing unit 711 displays, on the guidance screen D1, information indicating that the automatic travel has been started (see FIG. 7). Meanwhile, when the operator operates the automatic travel button 171 in the state where the non-guidance screen is displayed on the operation terminal 17, the display processing unit 711 shifts the non-guidance screen to the guidance screen D1 (see FIG. 6).

Just as described, a different function is assigned to the automatic travel button 171 in accordance with a content of the display screen displayed on the operation terminal 17. In the above-described example, the automatic travel button 171 functions as a shortcut button for shifting the non-guidance screen (the UFO operation screen D3, the home screen D2, or the like) to the guidance screen D1 when the automatic travel button 171 is pressed in the state where the non-guidance screen is displayed. According to the above-described configuration, the operator can shift the non-guidance screen to the guidance screen D1 by pressing the automatic travel button 171, and can start the automatic travel by pressing the automatic travel button 171 again. Thus, it is possible to improve convenience of the operation unit (automatic travel button 171).

Here, after the automatic travel of the work machine 10 is started, the operator can shift the guidance screen D1 (see FIG. 7) to another setting screen during the automatic travel. For example, when the operator presses the home button K1 on the guidance screen D1 illustrated in FIG. 7 during the automatic travel, the display processing unit 711 displays the home screen D2 illustrated in FIG. 10. On the home screen D2 illustrated in FIG. 10, the display processing unit 711 displays the message indicating that the work machine 10 is automatically traveling (for example, "TRAVELING WITH STRAIGHT TRAVEL ASSIST"). In addition, when the operator presses an icon of "UFO OPERATION" on the home screen D2 illustrated in FIG. 10, the display processing unit 711 displays the UFO operation screen D3 illustrated in FIG. 11. On the UFO operation screen D3 illustrated in FIG. 11, the display processing unit 711 displays the message indicating that the work machine 10 is automatically traveling (for example, "TRAVELING WITH STRAIGHT TRAVEL ASSIST").

Just as described, the operator can switch the guidance screen D1 to another display screen while the work machine 10 is automatically traveling. In addition, even when the operator switches the guidance screen D1 while the work machine 10 is automatically traveling, the vehicle controller 11 causes the work machine 10 to continue the automatic travel. According to the above-described configuration, since the operator can perform the various operations by switching the display screen even during the automatic travel of the work machine 10, it is possible to improve the convenience.

In the case where the guidance screen D1 (see FIG. 7) is shifted to the non-guidance screen, and the operator does not perform an operation on the non-guidance screen for a predetermined consecutive period, the display processing unit 711 may automatically shift the non-guidance screen to the guidance screen D1 (see FIG. 7) or display a message for urging the operator to return to the guidance screen D1.

Figure 12:
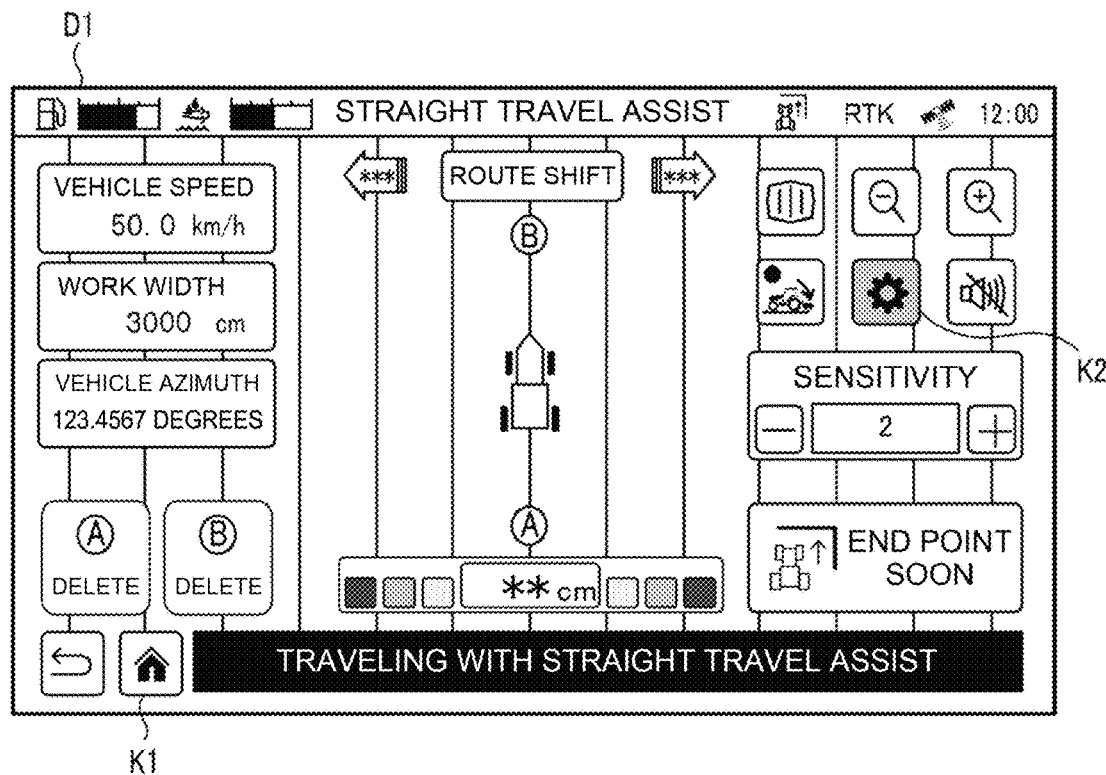
FIG. 12 is a view illustrating an example of the guidance screen displayed on the operation terminal according to the basic configuration of the present invention.

The functions that can be operated by the operator on the guidance screen D1 during the automatic travel of the work machine 10 may be limited. For example, a setting icon K2 displayed on the guidance screen D1 (see FIG. 12) is an operation button for a route setting related to the target route for the automatic travel. In consideration of safety, information on the route setting can be set and changed only when the work machine 10 is stopped, and the setting and the change are prohibited during the automatic travel. Thus, when the work machine 10 is automatically traveling, as illustrated in FIG. 12, the display processing unit 711 displays (grays out) the setting icon K2 on the guidance screen D1 in a non-selectable manner. In the case where the setting icon K2 is in the grayed-out state, the display processing unit 711 does not shift the guidance screen D1 to a setting screen (not illustrated) even when the operator presses the setting icon K2. In this case, the display processing unit 711 may display a message indicating that the setting icon K2 cannot be operated, that the setting icon K2 can be operated when the automatic travel is stopped, or the like.

Figure 13:
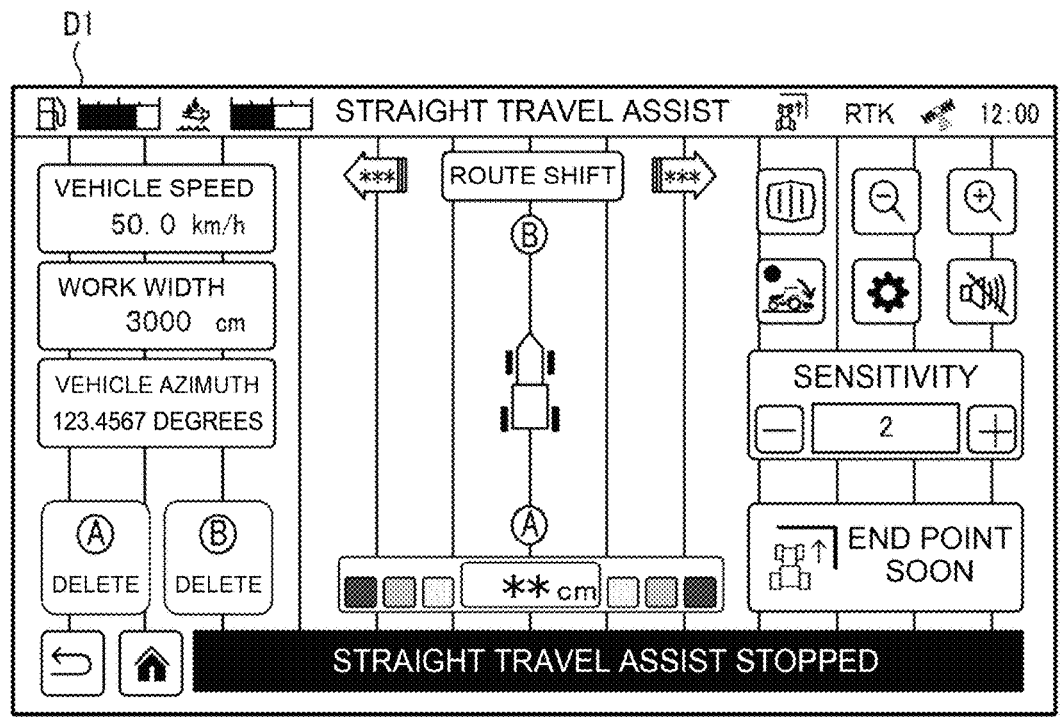
FIG. 13 is a view illustrating an example of the guidance screen displayed on the operation terminal according to the basic configuration of the present invention.

When stopping the automatic travel of the work machine 10 (automatic travel OFF), the operator performs an automatic travel stop operation. For example, the operator presses the automatic travel button 171 while the work machine 10 is automatically traveling. When accepting the automatic travel stop operation, the vehicle controller 11 stops and switches the automatic travel to the manual travel. For example, in a state where the guidance screen D1 illustrated in FIG. 7 is displayed on the operation terminal 17, when the operator presses the automatic travel button 171 while the work machine 10 is automatically traveling, the vehicle controller 11 stops the automatic travel. Then, as illustrated in FIG. 13, the display processing unit 711 displays, on the guidance screen D1, a message indicating that the automatic travel has been stopped (for example, "STRAIGHT TRAVEL ASSIST STOPPED").

Figure 10:
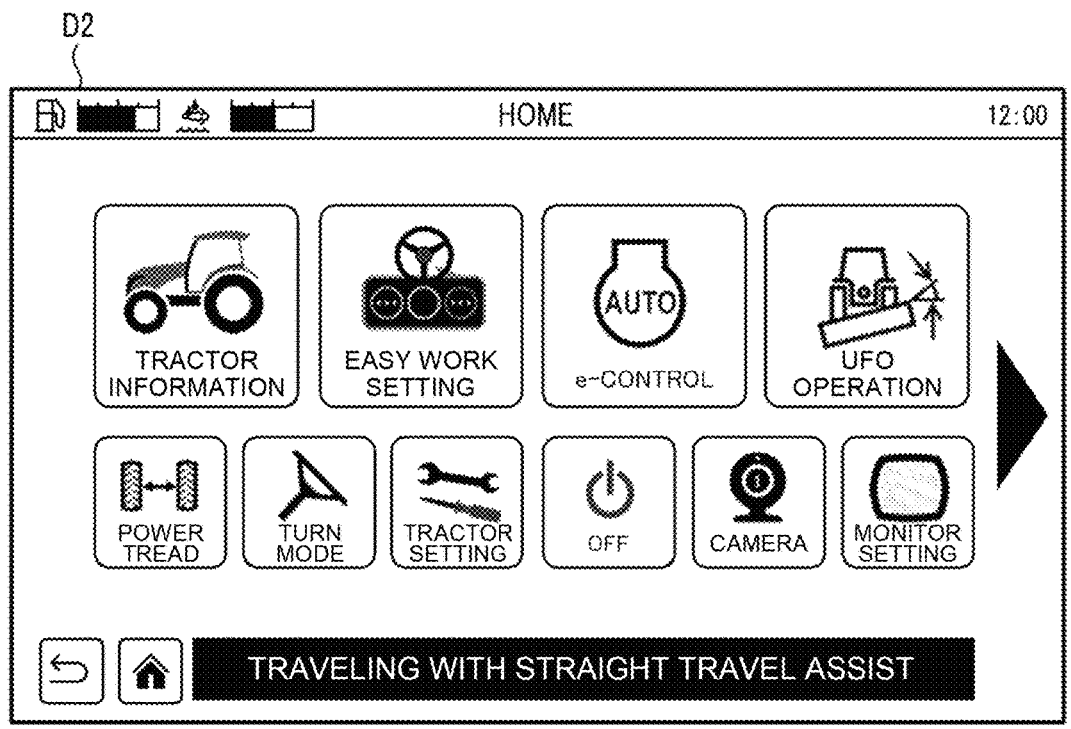
FIG. 10 is a view illustrating an example of the home screen displayed on the operation terminal according to the basic configuration of the present invention.
Figure 11:
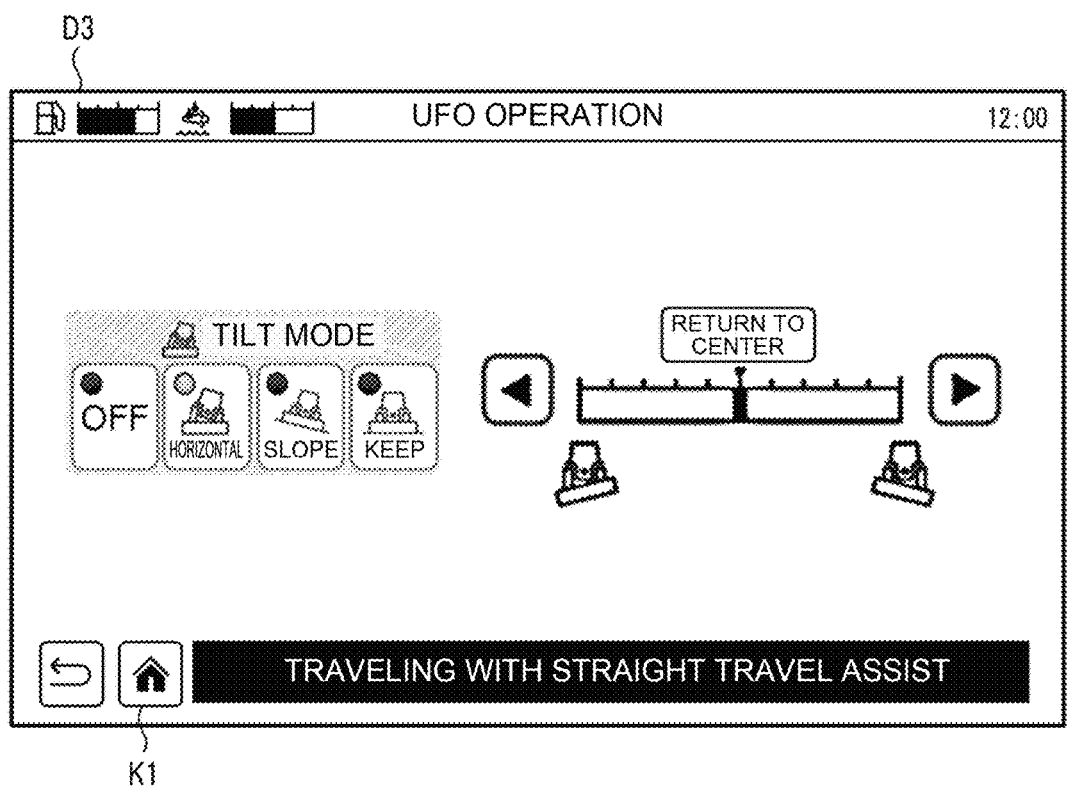
FIG. 11 is a view illustrating an example of the UFO operation screen displayed on the operation terminal according to the basic configuration of the present invention.

In addition, for example, in a state where the home screen D2 illustrated in FIG. 10 or the UFO operation screen D3 illustrated in FIG. 11 is displayed on the operation terminal 17, when the operator presses the automatic travel button 171 while the work machine 10 is automatically traveling, the vehicle controller 11 stops the automatic travel. Then, the display processing unit 711 shifts the display screen (non-guidance screen) to the guidance screen D1 illustrated in FIG. 13 and displays, on the guidance screen D1, the message indicating that the automatic travel has been stopped (for example, "STRAIGHT TRAVEL ASSIST STOPPED").

Just as described, in the state where the guidance screen D1 (see FIG. 7) related to the automatic travel of the work machine 10 is displayed on the operation terminal 17, when the operator operates the automatic travel button 171 while the work machine 10 is automatically traveling, the vehicle controller 11 stops the automatic travel of the work machine 10, and the display processing unit 711 displays, on the guidance screen D1, the information on the automatic travel ("STRAIGHT TRAVEL ASSIST STOPPED"). Meanwhile, in the state where the non-guidance screen different from the guidance screen D1 is displayed on the operation terminal 17, when the operator operates the automatic travel button 171 while the work machine 10 is automatically traveling, the vehicle controller 11 stops the automatic travel, and the display processing unit 711 shifts the non-guidance screen to the guidance screen D1.

In the above-described basic configuration, the automatic travel is started or stopped in response to the operation on the automatic travel button 171, and the display screen on the operation terminal 17 is switched. That is, the automatic travel button 171 is an example of the operation unit in the present invention. The operation unit in the present invention is not limited to the automatic travel button 171 and may be an operation unit capable of operating the work machine 10. For example, the operation unit in the present invention may be an operation unit that changes a posture of the work implement 14 between a working posture and a non-working posture. More specifically, the operation unit in the present invention may be the lifting-lowering lever 14L (see FIG. 3) that lifts or lowers the work implement 14.

Here, the operation control unit 71 of the operation terminal 17 may accept, from the operator, an operation to set whether to start the automatic travel of the work machine 10 in an interlocking manner with a change in the posture of the work implement 14. For example, on the guidance screen D1 (see FIG. 6 and the like), the operator can press the work implement interlock icon K3 to enable (turn ON) a function to start the automatic travel of the work machine 10 in the interlocking manner with the change in the posture of the work implement 14 (work implement interlock function). In the case where the work implement interlock function is set to ON, and, for example, the operator performs an operation to place the lifting-lowering lever 14L in the "lowering" position, the vehicle controller 11 lowers the work implement 14 to the work position and starts the automatic travel of the work machine 10 when the automatic travel start condition is satisfied. Thus, the operator can start the automatic travel and the work by performing an operation to move the work machine 10 to an automatic travel start position and lower the work implement 14. In addition, the pressing operation of the automatic travel button 171 can be omitted. Therefore, it is possible to improve the convenience.

In the case where the operator performs the operation to place the lifting-lowering lever 14L in the "lowering" position when the work implement interlock function is set to ON and the guidance screen D1 (see FIG. 6) is displayed on the operation terminal 17, as illustrated in FIG. 7, the display processing unit 711 displays, on the guidance screen D1, the message indicating that the work machine 10 is automatically traveling ("TRAVELING WITH STRAIGHT TRAVEL ASSIST").

In the case where the display screen (the non-guidance screen such as the home screen D2 (see FIG. 8) or the UFO operation screen D3 (see FIG. 9)) different from the guidance screen D1 is displayed on the operation terminal 17, the vehicle controller 11 does not start the automatic travel of the work machine 10 even when the work implement interlock function is set to ON and the operator performs the operation to place the lifting-lowering lever 14L in the "lowering" position. In this case, the vehicle controller 11 only executes an action of lowering the work implement 14 and does not execute an automatic travel action. In addition, when the operator performs the operation to place the lifting-lowering lever 14L in the "lowering" position in the state where the non-guidance screen is displayed, the display processing unit 711 does not shift the non-guidance screen to the guidance screen D1 (see FIG. 6) and maintains the display of the non-guidance screen. For example, in the case where the UFO operation screen D3 illustrated in FIG. 9 is displayed on the operation terminal 17, and the operator performs the operation to place the lifting-lowering lever 14L in the "lowering" position, the display processing unit 711 displays the UFO operation screen D3 as is. In this case, the display processing unit 711 may display, on the UFO operation screen D3, a message indicating that the operation of the lifting-lowering lever 14L has been accepted, that a lowering action of the work implement 14 is executed, or that the automatic travel action is not executed. Just as described, in the case where the operator performs the different operation (the lifting or lowering operation of the work implement 14) from the automatic travel instruction when the non-guidance screen, which displays the different information from the information on the automatic travel, is displayed, the operator's intention of the automatic travel start instruction is unclear. Thus, processing to start the automatic travel or processing to shift the non-guidance screen to the guidance screen D1 is not executed.

Meanwhile, in the case where the work implement interlock function is set to ON, and the operator stops the automatic travel, the operator performs an operation to place the lifting-lowering lever 14L in the "lifting" position. When the operator performs the operation to place the lifting-lowering lever 14L in the "lifting" position, the vehicle controller 11 lifts the work implement 14 up to the non-work position and stops the automatic travel of the work machine 10. Regardless of whether the guidance screen D1 or the non-guidance screen is displayed on the operation terminal 17, the vehicle controller 11 lifts the work implement 14 up to the non-work position in response to a lifting operation of the lifting-lowering lever 14L and stops the automatic travel of the work machine 10. Thus, the operator can stop the automatic travel and the work by performing the operation to lift the work implement 14. In addition, the pressing operation of the automatic travel button 171 can be omitted. Therefore, it is possible to improve the convenience.

In the case where the operator performs the operation to place the lifting-lowering lever 14L in the "lifting" position when the work implement interlock function is set to ON and the guidance screen D1 (see FIG. 7) is displayed on the operation terminal 17 (during the automatic travel), as illustrated in FIG. 13, the display processing unit 711 displays, on the guidance screen D1, a message indicating that the automatic travel has been stopped (for example, "STRAIGHT TRAVEL ASSIST STOPPED"). Similarly, in the case where the operator performs the operation to place the lifting-lowering lever 14L in the "lifting" position when the non-guidance screen (the home screen D2 (see FIG. 10) or the UFO operation screen D3 (see FIG. 11)) is displayed on the operation terminal 17 (during the automatic travel), the display processing unit 711 shifts the non-guidance screen to the guidance screen D1 and, as illustrated in FIG. 13, displays, on the guidance screen D1, the message indicating that the automatic travel has been stopped (for example, "STRAIGHT TRAVEL ASSIST STOPPED"). Just as described, even when the guidance screen D1 is displayed on the operation terminal 17, or the non-guidance screen is displayed on the operation terminal 17, the display processing unit 711 displays the guidance screen D1 in response to the lifting operation of the lifting-lowering lever 14L, and displays, on the guidance screen D1, the message indicating that the automatic travel has been stopped.

The operation to stop the automatic travel at the when the work machine 10 is automatically traveling is not limited to the operation of the automatic travel button 171 and the operation of the lifting-lowering lever 14L described above, and may be the steering operation, for example. More specifically, in the case where the operator who is on the work machine 10 rotates (steers) the steering wheel 137 by a predetermined angle or larger during the automatic travel of the work machine 10, the vehicle controller 11 stops the automatic travel. For example, in the case where the operator rotates the steering wheel 137 by the predetermined angle or larger when the work machine 10 is automatically traveling and the UFO operation screen D3 illustrated in FIG. 11 is displayed on the operation terminal 17, the vehicle controller 11 stops the automatic travel and the display processing unit 711 shifts the UFO operation screen D3 to the guidance screen D1 (see FIG. 13), and displays, on the guidance screen D1, the message indicating that the automatic travel has been stopped (for example, "STRAIGHT TRAVEL ASSIST STOPPED").

Figure 14:
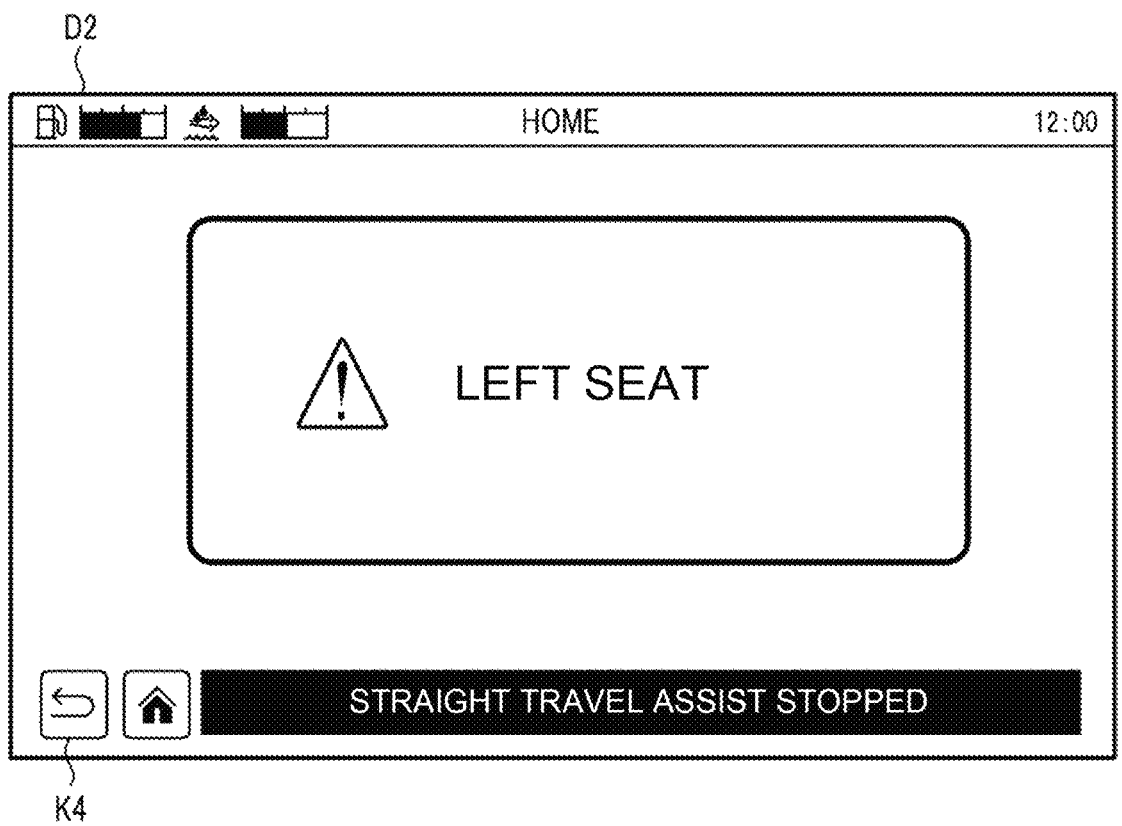
FIG. 14 is a view illustrating an example of the home screen displayed on the operation terminal according to the basic configuration of the present invention.

In the case where the work machine 10 is automatically traveling, the operation to stop the automatic travel may be, for example, an operation (action) in which the operator leaves a seat (cockpit) in the cabin 18. More specifically, when the operator who is on the work machine 10 stands up from the seat during the automatic travel of the work machine 10, the vehicle controller 11 stops the automatic travel. For example, in the case where the operator stands up from the seat when the work machine 10 is automatically traveling and the UFO operation screen D3 illustrated in FIG. 11 is displayed on the operation terminal 17, the vehicle controller 11 stops the automatic travel, and the display processing unit 711 shifts the UFO operation screen D3 to the home screen D2 (see FIG. 14) and displays, on the home screen D2, a warning message regarding a factor that has stopped the automatic travel (for example, "LEFT SEAT"). Then, when the operator presses a "back" button K4 on the home screen D2 illustrated in FIG. 14, the display processing unit 711 shifts the home screen D2 to the UFO operation screen D3 illustrated in FIG. 9. Here, when the operator stands up from the seat, the display processing unit 711 may shift the UFO operation screen D3 to the guidance screen D1 (see FIG. 13), and may display, on the guidance screen D1, the message indicating that the automatic travel has been stopped (for example, "STRAIGHT TRAVEL ASSIST STOPPED").

The factor that stops the automatic travel is not limited to each of the above cases, and includes, for example, a reduction in positioning accuracy (position accuracy) of the work machine 10, an action abnormality, and the like. The warning message described above includes a message indicating any of these factors.

[Operation Control Processing]

Figure 15:
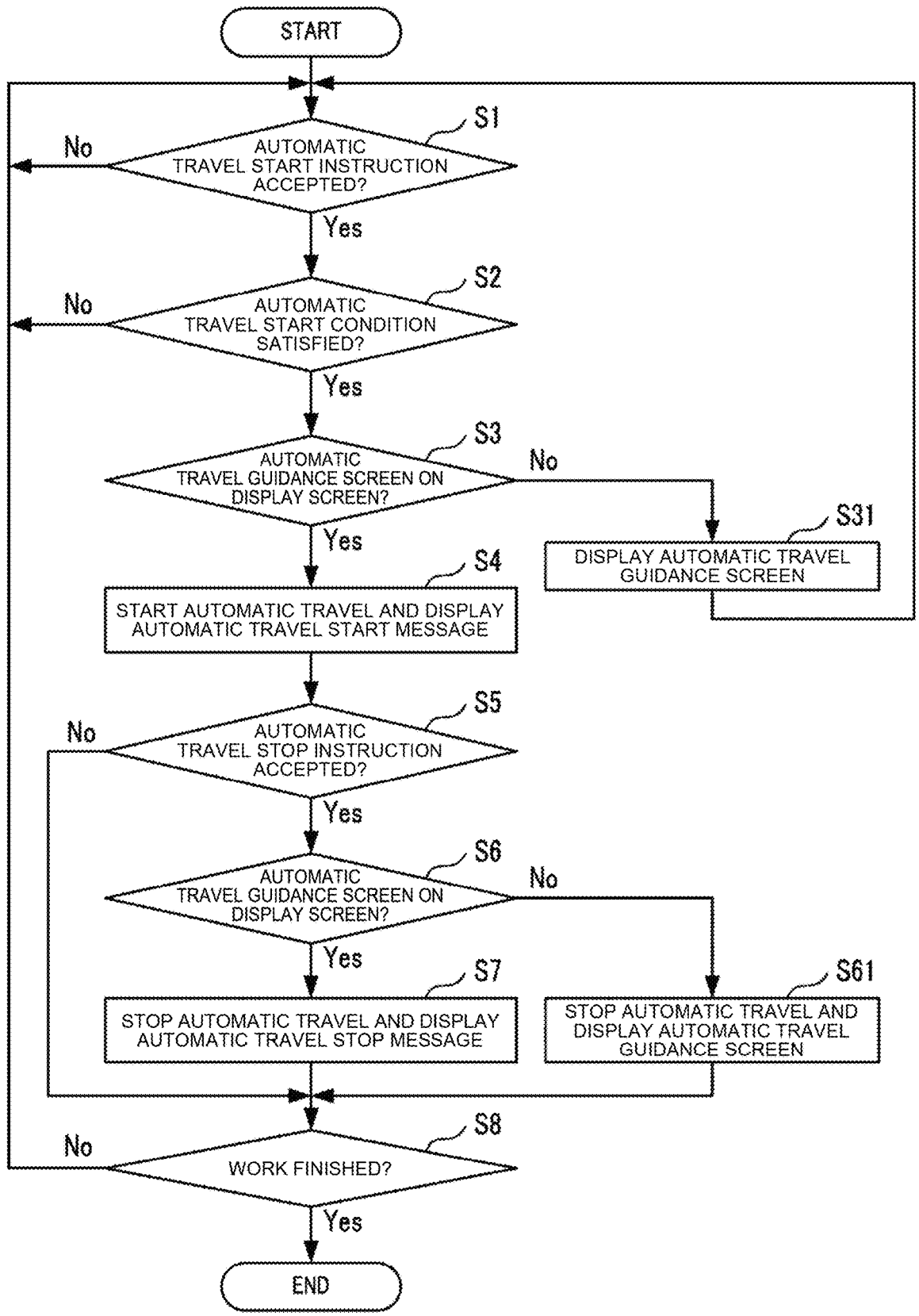
FIG. 15 is a flowchart illustrating an example of a procedure of operation control processing executed by the work machine according to the basic configuration of the present invention.

Hereinafter, a description will be made on an example of the operation control processing that is executed by the vehicle controller 11 and the operation terminal 17 (operation control unit 71) with reference to FIG. 15. The present invention may be comprehended as an invention of an operation control method in which the vehicle controller 11 and the operation terminal 17 execute part or all of the operation control processing, or an invention of the operation control program for causing the vehicle controller 11 and the operation terminal 17 to execute part or all of the operation control method. In addition, one or more processors may execute the operation control processing.

In step S1, the operation control unit 71 determines whether the automatic travel start instruction has been accepted from the operator. For example, the operator moves the work machine 10 to a work start position and presses the automatic travel button 171 (see FIG. 3). If the operation control unit 71 has accepted the automatic travel start instruction from the operator (S1: Yes), the processing proceeds to step S2. The operation control unit 71 waits until accepting the automatic travel start instruction from the operator (S1: No).

In step S2, the vehicle controller 11 determines whether the work machine 10 satisfies the automatic travel start condition. More specifically, the vehicle controller 11 determines whether the work machine 10 is positioned within a predetermined distance from the target route R and within a predetermined orientation with respect to the target route R. If the vehicle controller 11 determines that the work machine 10 satisfies the automatic travel start condition (S2: Yes), the processing proceeds to step S3. If the vehicle controller 11 determines that the work machine 10 does not satisfy the automatic travel start condition (S2: No), the processing returns to step S1.

In step S3, the operation control unit 71 determines whether the display screen displayed on the operation terminal 17 is the guidance screen D1 for the automatic travel (see FIG. 6). If the operation control unit 71 determines that the display screen displayed on the operation terminal 17 is the guidance screen D1 (S3: Yes), the processing proceeds to step S4. On the other hand, if the operation control unit 71 determines that the display screen displayed on the operation terminal 17 is the display screen (non-guidance screen) different from the guidance screen D1 (S3: No), the processing proceeds to step S31.

In the case where the work machine 10 satisfies the automatic travel start condition, the operation control unit 71 displays, on the guidance screen D1, the message indicating that the work machine 10 has been brought into the state capable of automatically traveling (for example, "READY FOR STRAIGHT TRAVEL ASSIST") (see FIG. 6).

In step S31, the operation control unit 71 shifts (makes the transition from) the non-guidance screen to the guidance screen D1. For example, in the case where the operator presses the automatic travel button 171 in the state where the UFO operation screen D3 illustrated in FIG. 9 is displayed on the operation terminal 17, the operation control unit 71 shifts the UFO operation screen D3 to the guidance screen D1 illustrated in FIG. 6. After the processing in step S31, the processing returns to step S1.

In step S4, the vehicle controller 11 causes the work machine 10 to start the automatic travel, and the operation control unit 71 displays, on the guidance screen D1, the message indicating that the work machine 10 is automatically traveling (for example, "TRAVELING WITH STRAIGHT TRAVEL ASSIST") (see FIG. 7).

In this way, for example, the work machine 10 performs the predetermined work (for example, the tillage work) while automatically traveling on the work route Ra1 (see FIG. 4).

Next, in step S5, the operation control unit 71 determines whether an automatic travel stop instruction has been accepted from the operator. For example, when the work machine 10 reaches the end point of the work route Ra1, the operator presses the automatic travel button 171 (see FIG. 3). If the operation control unit 71 has accepted the automatic travel stop instruction from the operator (S5: Yes), the processing proceeds to step S6. If the operation control unit 71 has not accepted the automatic travel stop instruction from the operator (S5: No), the processing proceeds to step S8.

In step S6, the operation control unit 71 determines whether the display screen displayed on the operation terminal 17 is the guidance screen D1 (see FIG. 7). If the operation control unit 71 determines that the display screen displayed on the operation terminal 17 is the guidance screen D1 (S6: Yes), the processing proceeds to step S7. On the other hand, if the operation control unit 71 determines that the display screen displayed on the operation terminal 17 is the display screen (non-guidance screen) different from the guidance screen D1 (S6: No), the processing proceeds to step S61.

In step S7, the vehicle controller 11 causes the work machine 10 to stop the automatic travel, and the operation control unit 71 displays, on the guidance screen D1, a message indicating that the automatic travel of the work machine 10 has been stopped (for example, "STRAIGHT TRAVEL ASSIST STOPPED") (see FIG. 13). After step S7, the processing proceeds to step S8.

In step S61, the vehicle controller 11 stops the automatic travel of the work machine 10, and the operation control unit 71 shifts (makes the transition of) the non-guidance screen to the guidance screen D1. For example, in the case where the operator presses the automatic travel button 171 in the state where the UFO operation screen D3 illustrated in FIG. 11 is displayed on the operation terminal 17, the vehicle controller 11 stops the automatic travel of the work machine 10, and the operation control unit 71 shifts the UFO operation screen D3 to the guidance screen D1 illustrated in FIG. 13, and displays, on the guidance screen D1, the message indicating that the automatic travel has been stopped (for example, "STRAIGHT TRAVEL ASSIST STOPPED"). After step S61, the processing proceeds to step S8.

In step S8, the vehicle controller 11 and the operation control unit 71 determine whether the work by the work machine 10 is finished. For example, in the case where the work machine 10 has reached an end point of the work route Ra12 included in the target route R, the vehicle controller 11 and the operation control unit 71 determine that the work by the work machine 10 is finished. If the work is finished (S8: Yes), the operation control processing is terminated. On the other hand, if the work is not finished (S8: No), the processing returns to step S1, and the vehicle controller 11 and the operation control unit 71 repeat the above-described processing.

As it has been described so far, in the case where the user (operator) operates the operation unit (the automatic travel button 171, the lifting-lowering lever 14L, or the like) capable of operating the work machine 10 in the state where the first display screen (guidance screen D1) related to the automatic travel of the work machine 10 is displayed on the operation terminal 17, the work machine 10 according to this basic configuration executes the first action (for example, the automatic travel). Meanwhile, in the case where the user operates the operation unit in the state where the second display screen (non-guidance screen) different from the first display screen is displayed on the operation terminal 17, the work machine 10 does not execute the first action.

According to the above configuration, in the case where the operator issues the automatic travel start instruction in the state where the guidance screen D1 related to the automatic travel is displayed on the operation terminal 17, the work machine 10 starts the automatic travel. On the other hand, in the case where the operator issues the automatic travel start instruction in the state where the guidance screen D1 related to the automatic travel is not displayed on the operation terminal 17, the work machine 10 does not start the automatic travel. Here, in the case where the operator issues the automatic travel start instruction when the guidance screen D1 related to the automatic travel is not displayed, there is a possibility that such an instruction is not intended by the operator. In this regard, according to the above configuration, it is possible to prevent the work machine 10 from starting the automatic travel due to the unintentional automatic travel start instruction from the operator.

In addition, in the case where the user (operator) operates the operation unit (automatic travel button 171 or the like) capable of operating the work machine 10 in the state where the first display screen (guidance screen D1) related to the automatic travel of the work machine 10 is displayed on the operation terminal 17, the work machine 10 according to this basic configuration displays the information on the automatic travel on the first display screen. Meanwhile, in the case where the user operates the operation unit in the state where the second display screen (non-guidance screen) different from the first display screen is displayed on the operation terminal 17, the work machine 10 according to this basic configuration shifts the second display screen to the display screen related to the automatic travel (for example, the guidance screen D1).

According to the above configuration, in the case where the operator issues the automatic travel start instruction in the state where the guidance screen D1 related to the automatic travel is displayed on the operation terminal 17, the information indicating that the automatic travel has been started is displayed on the guidance screen D1. On the other hand, in the case where the operator issues the automatic travel start instruction in the state where the guidance screen D1 related to the automatic travel is not displayed on the operation terminal 17, the screen is shifted to the guidance screen D1. Just as described, since a plurality of the functions (functions such as the automatic travel start instruction and the screen transition), each of which corresponds to the content of the display screen, is assigned to the single operation unit (for example, the automatic travel button 171), it is possible to improve convenience of the operation unit.

The operation unit of the present invention may be provided in the work machine 10 (for example, the automatic travel button 171, the lifting-lowering lever 14L, or the like), or may be provided outside the work machine 10. For example, the operation unit of the present invention may be provided in the operation terminal (the tablet terminal, the smartphone, or the like) communicable with the work machine 10. For example, the automatic travel button 171, which is the operation unit of the present invention, may be displayed as an icon image on the display screen (for example, the display screen different from the guidance screen D1) of the operation terminal 17, or may be provided as a physical switch on the operation terminal 17. In addition, the operation terminal 17 of the present invention may be configured that the operation terminal 17 can be brought into the work machine 10 and can be taken out from the work machine 10.

The present invention is not limited to the above-described embodiment. For example, the operation unit of the present invention may be an operation unit that accepts, from the user, an operation to change the position or an orientation of the target route of the work machine 10. More specifically, the operation unit of the present invention may be the shift button 172 (see FIG. 3) used to perform the correction operation (shift operation) to correct the positional deviation of the work machine 10 from the target route.

For example, when the operator operates the shift button 172 in the state where the work machine 10 is automatically traveling, the position or the orientation of the target route of the work machine 10 is changed. Meanwhile, when the operator operates the shift button 172 in the state where the work machine 10 is not automatically traveling, an action according to the display content of the operation terminal 17 is executed.

For example, in the case where the operator presses a right portion of the shift button 172 when the guidance screen D1 illustrated in FIG. 7 is displayed on the operation terminal 17 and the work machine 10 is automatically traveling, the vehicle controller 11 shifts the position of the target route of the work machine 10 to the right side.

On the contrary, in the case where the operator presses the right portion of the shift button 172 when the guidance screen D1 illustrated in FIG. 6 is displayed on the operation terminal 17 and the work machine 10 is not automatically traveling, the operation control unit 71 changes "SENSITIVITY" in the guidance screen D1 illustrated in FIG. 6 to a large value. The sensitivity indicates correction sensitivity at the time of returning the work machine 10 the target route in the case where the work machine 10 is displaced from the target route. That is, a function is assigned to the shift button 172 in such a manner that the right portion of the shift button 172 corresponds to a "+" button for "SENSITIVITY" on the guidance screen D1 and that a left portion of the shift button 172 corresponds to a "−" button for "SENSITIVITY" on the guidance screen D1.

In addition, in the case where the operator presses the right portion of the shift button 172 when the UFO operation screen D3 illustrated in FIG. 9 is displayed on the operation terminal 17 and the work machine 10 is not automatically traveling, the operation control unit 71 changes a degree of "TILT" in the UFO operation screen D3 illustrated in FIG. 9. That is, a function is assigned to the shift button 172 in such a manner that the right portion of the shift button 172 corresponds to a right arrow on the UFO operation screen D3, and the left portion of the shift button 172 corresponds to a left arrow on the UFO operation screen D3.

The operation to change the setting contents by the shift button 172 includes an operation to change an offset change amount. For example, in the case where the change amount (shift amount) of the target route at the time of pressing the right portion of the shift button 172 once is set to "X1", and the operator presses the shift button 172 during the automatic travel of the work machine 10, the target route is shifted by "X1". Meanwhile, in the case where the shift amount is set to "X1" and the operator presses the shift button 172 when the work machine 10 is not automatically traveling, the shift amount can be changed from "X1" to "X2". In the case where the shift amount is changed to "X2", and the operator presses the shift button 172 during the automatic travel of the work machine 10, the target route is shifted by "X2". Just as described, a function of changing the setting information ("shift amount" in the above example) related to the original function ("route shift" in the above example) of the operation unit may be assigned to the operation unit.

As it has been described so far, in the case where the operator operates the operation unit (for example, the shift button 172) in the state where the work machine 10 is not automatically traveling and the setting screen related to the work machine 10 is displayed on the operation terminal 17, the operation control unit 71 changes the setting content of the work machine 10. Thus, since a plurality of the functions is assigned to the operation unit, it is possible to improve the convenience of the operation unit.

Although the setting item of "SENSITIVITY" can be set on the guidance screen D1 illustrated in FIG. 6, the operator may be able to optionally register a setting item that can be set on the guidance screen D1. For example, the operation control unit 71 may display, on the guidance screen D1, a setting item of the shift amount, a setting item of the UFO, and the like in response to the registration operations by the operator.

As another embodiment of the present invention, the second display screen in the present invention may be a non-display screen (turned-off screen) in which the operation display unit 73 is turned off. For example, when the operator presses down an icon of "OFF" on the home screen D2 (see FIG. 8), the display processing unit 711 turns off the operation display unit 73. In addition, for example, when the operator does not operate the operation display unit 73 for a predetermined consecutive period, the display processing unit 711 turns off the operation display unit 73.

For example, when the operator operates the automatic travel button 171 to start the automatic travel (travel start instruction) in the state where the operation display unit 73 is in the turned-off screen state, the vehicle controller 11 does not start the automatic travel of the work machine 10, and the display processing unit 711 turns on the operation display unit 73 (turns on the screen) and displays the guidance screen D1 (shifts the tuned-off screen to the guidance screen D1). Meanwhile, when the operator operates the automatic travel button 171 to stop the automatic travel (travel stop instruction) in the state where the operation display unit 73 is in the turned-off screen state during the automatic travel of the work machine 10, the vehicle controller 11 stops the automatic travel of the work machine 10, and the display processing unit 711 turns on the operation display unit 73 (turns on the screen) and displays the guidance screen D1.

In the case where the work implement interlock function is set to ON, and the operation display unit 73 is the turned-off screen, the vehicle controller 11 does not start the automatic travel of the work machine 10 even when the operator performs the operation to place the lifting-lowering lever 14L in the "lowering" position. In this case, the vehicle controller 11 only executes the action to lower the work implement 14, and does not execute the automatic travel action. In addition, in this case, the display processing unit 711 turns on the operation display unit 73 (turns on the screen) and displays the display screen before turning off (does not shift the screen to the guidance screen D1).

In the case where the operator performs to operation to place the lifting-lowering lever 14L in the "lifting" position when the work implement interlock function is set to ON and the operation display unit 73 is the turned-off screen, the vehicle controller 11 lifts the work implement 14 to the non-work position and stops the automatic travel of the work machine 10, and the display processing unit 711 turns on the operation display unit 73 (turns on the screen) and displays the guidance screen D1 (shifts the turned-off screen to the guidance screen D1) to display the message indicating that the automatic travel has been stopped (for example, "STRAIGHT TRAVEL ASSIST STOPPED").

The operation control system in the present invention may include the operation terminal 17 alone or may include a server provided with each of the processing units included in the operation terminal 17. Alternatively, the operation control system may include the work machine 10 provided with the operation terminal 17.

First Embodiment

An automatic travel system 100A (an example of the operation control system) according to the present embodiment differs from the basic configuration mainly in the configurations of the operation control unit 71 and the vehicle controller 11 and the mode of the display screen displayed on the operation terminal 17. Hereinafter, the same components as those in the basic configuration will be denoted by the same reference signs, and the description thereon will appropriately be omitted.

[1] Configuration of Automatic Travel System

Figure 16:
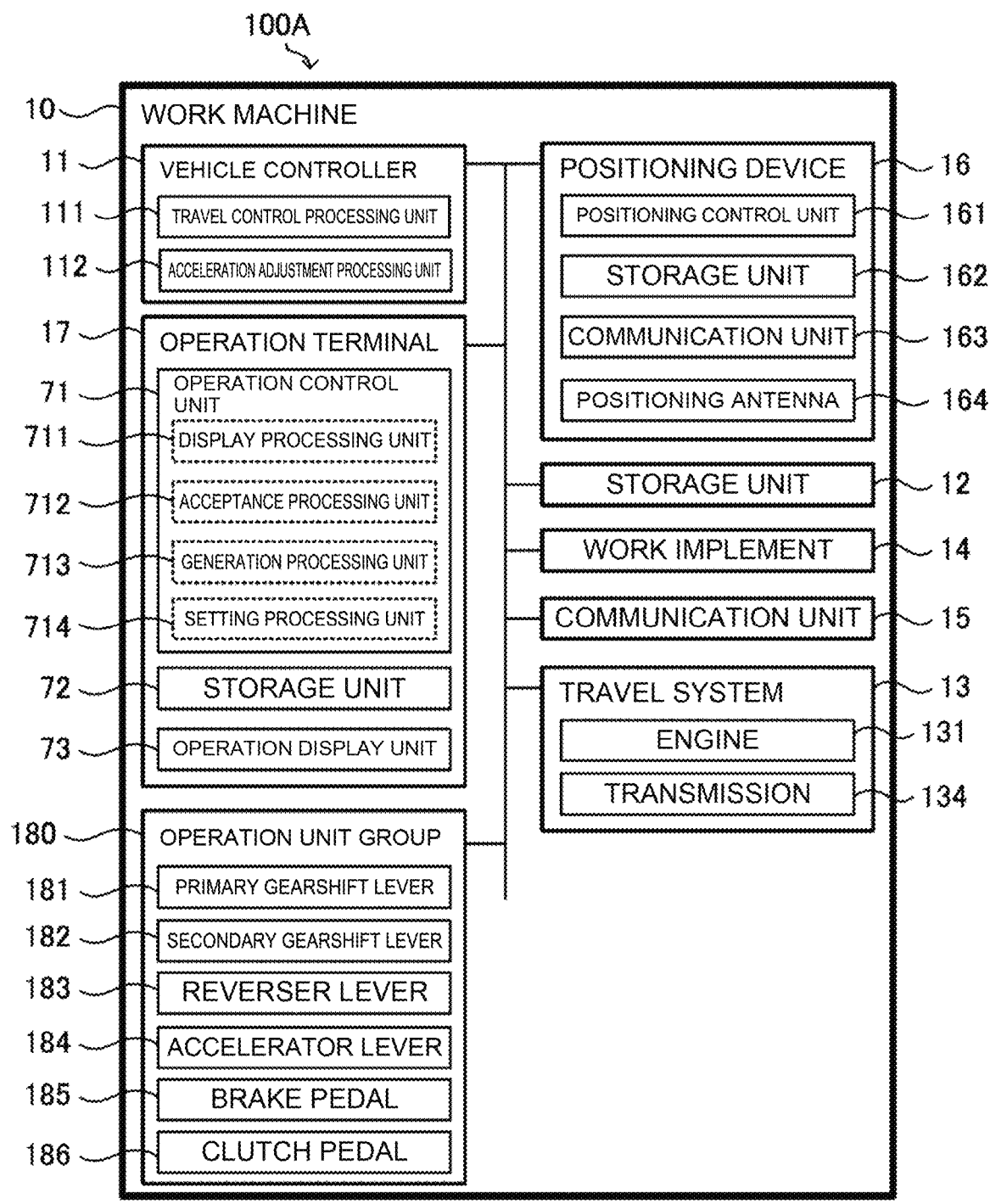
FIG. 16 is a block diagram illustrating a configuration of a work machine according to a first embodiment of the present invention.

In the automatic travel system 100A according to the present embodiment, as illustrated in FIG. 16, the operation control unit 71 of the operation terminal 17 includes a setting processing unit 714 in addition to the display processing unit 711, the acceptance processing unit 712, and the generation processing unit 713. The vehicle controller 11 of the work machine 10 includes a travel control processing unit 111 and an acceleration adjustment processing unit 112.

The setting processing unit 714 executes setting processing to make various settings in accordance with operations by the user (operator) on the various display screens displayed on the operation display unit 73. In the present embodiment, the setting processing unit 714 makes the settings on the horizontal control in accordance with the user's operation on control operation units (first operation elements K531, K532, and the like, see FIG. 50) that are at least included in a UFO (horizontal control) operation screen Dp5 (see FIG. 50).

The travel control processing unit 111 executes travel control related to the travel of the work machine 10. More specifically, for example, the travel control processing unit 111 adjusts a travel speed (vehicle speed) of the work machine 10 by controlling the transmission 134 in the travel system 13 in accordance with an operation of a primary speed change lever 181 by the user (operator). Furthermore, for example, the travel control processing unit 111 controls the speed of the engine 131 in the travel system 13 in accordance with an operation of an accelerator lever 184 by the user (operator).

The acceleration adjustment processing unit 112 makes acceleration adjustment for adjusting acceleration until time at which the travel speed (vehicle speed) of the work machine 10 reaches a target speed (target vehicle speed). The "acceleration" described in the present disclosure means a change rate (inclination) of the speed with respect to a time from a current speed, which is the current travel speed of the work machine 10, to the target speed in the case where the target speed different from the current speed is set. That is, as the acceleration is increased, the time required to reach the target speed from the current speed is reduced, but a speed change shock becomes significant. Meanwhile, as the acceleration is reduced, the time required to reach the target speed from the current speed is increased, but the speed change shock becomes less significant.

Furthermore, the acceleration during the speed increase of the work machine 10 is defined as positive (plus) acceleration, and the acceleration during the speed reduction of the work machine 10 is defined as negative (minus) acceleration. Thus, when the positive acceleration acts on the work machine 10 that is traveling at a certain travel speed (vehicle speed), the speed of the work machine 10 is increased, and the vehicle speed is changed to a high speed side. On the contrary, when the negative acceleration acts on the work machine 10, the speed of the work machine 10 is reduced, and the vehicle speed is changed to a low speed side. The negative acceleration is synonymous with "deceleration".

In the present embodiment, the acceleration adjustment processing unit 112 can at least adjust, in accordance with the user's operation, the acceleration (that is, the "negative acceleration") until the time at which the travel speed of the work machine 10 reaches the target vehicle speed during the speed reduction of the work machine 10. The acceleration adjustment processing unit 112 can also adjust, in accordance with the user's operation, the acceleration (that is, the "positive acceleration") until the time at which the travel speed of the work machine 10 reaches the target vehicle speed during the speed increase of the work machine 10.

In short, in the present embodiment, it is possible to adjust both of the acceleration during the speed reduction and the acceleration during the speed increase of the work machine 10, that is, both of the negative acceleration and the positive acceleration in accordance with the operation by the user (operator).

More specifically, for example, when the operator operates the primary speed change lever 181 to change the target speed, the travel control processing unit 111 controls the travel system 13 (transmission 134) and changes the travel speed of the work machine 10 in such a manner that the travel speed of the work machine 10 matches the changed target speed. Here, the travel control processing unit 111 determines the change rate of the travel speed of the work machine 10 on the basis of the acceleration that is adjusted by the acceleration adjustment processing unit 112. For example, when the acceleration is set to be low, the travel control processing unit 111 gently changes the travel speed of the work machine 10 by gradually changing the target speed. On the contrary, when the acceleration is set to be high, the travel control processing unit 111 rapidly changes the travel speed of the work machine 10 by rapidly changing the target speed.

FIG. 16 illustrates an operation unit group 180 that is arranged in the cabin 18 (see FIG. 2) as the boarding unit which the operator boards, and includes a plurality of operation units operated by the operator. The operation unit group 180 includes various operation units such as the primary speed change lever 181, a secondary speed change lever 182, a reverser lever 183, the accelerator lever 184, a brake pedal 185, and a clutch pedal 186. Although not illustrated in FIG. 16, the operation unit group 180 also includes the lifting-lowering lever 14L (see FIG. 3) and the like. However, the operation unit group 180 illustrated in FIG. 16 is merely one example, and the operation units included in the operation unit group 180 are not limited to the operation units exemplified in FIG. 16. For example, the operation unit group 180 may include an accelerator pedal in addition to or instead of the accelerator lever 184.

The primary speed change lever 181 accepts an operation (the speed increasing operation or the speed reducing operation) to increase/reduce the vehicle speed of the work machine 10 in a stepless manner. The secondary speed change lever 182 accepts an operation to switch a speed range of the work machine 10 among a plurality of the speed ranges. As an example, an auxiliary transmission has three speed ranges of a "C stage", a "first speed", and a "second speed". Each time the speed range of the auxiliary transmission is switched from the "C stage" to the "first speed" and further from the "first speed" to the "second speed" in response to the operation of the secondary speed change lever 182, the speed range of the work machine 10 becomes high (high speed). The "C stage" and the "first speed", which are low speed stages, are used for the work such as the tillage work, and the "second speed" is not used for the work. Here, the "C stage" means a "very low speed stage" even lower than the "first speed", and will be referred to as the "C stage" after an initial letter (C) of "Creep".

The reverser lever 183 accepts an operation to switch between the forward travel and the backward travel of the work machine 10. In the case where the reverser lever 183 is in "forward" or "backward", the vehicle speed of the work machine 10 does not become "0" even when the vehicle speed is minimized by the primary speed change lever 181, and the work machine 10 travels at a very low speed in the travel direction instructed by the reverser lever 183. When the reverser lever 183 is operated to a "neutral" position, the vehicle speed of the work machine 10 becomes "0", and the work machine 10 is stopped. The accelerator lever 184 accepts an operation to adjust the speed of the engine 131. The brake pedal 185 accepts an operation to brake the work machine 10. The clutch pedal 186 accepts an operation to connect/disconnect power of the engine 131.

[2] Display Screen

Hereinafter, a description will be made on the mode of the display screen displayed on the operation terminal 17 in the automatic travel system 100A according to the present embodiment with reference to FIGS. 17 to 52.

Figure 17:
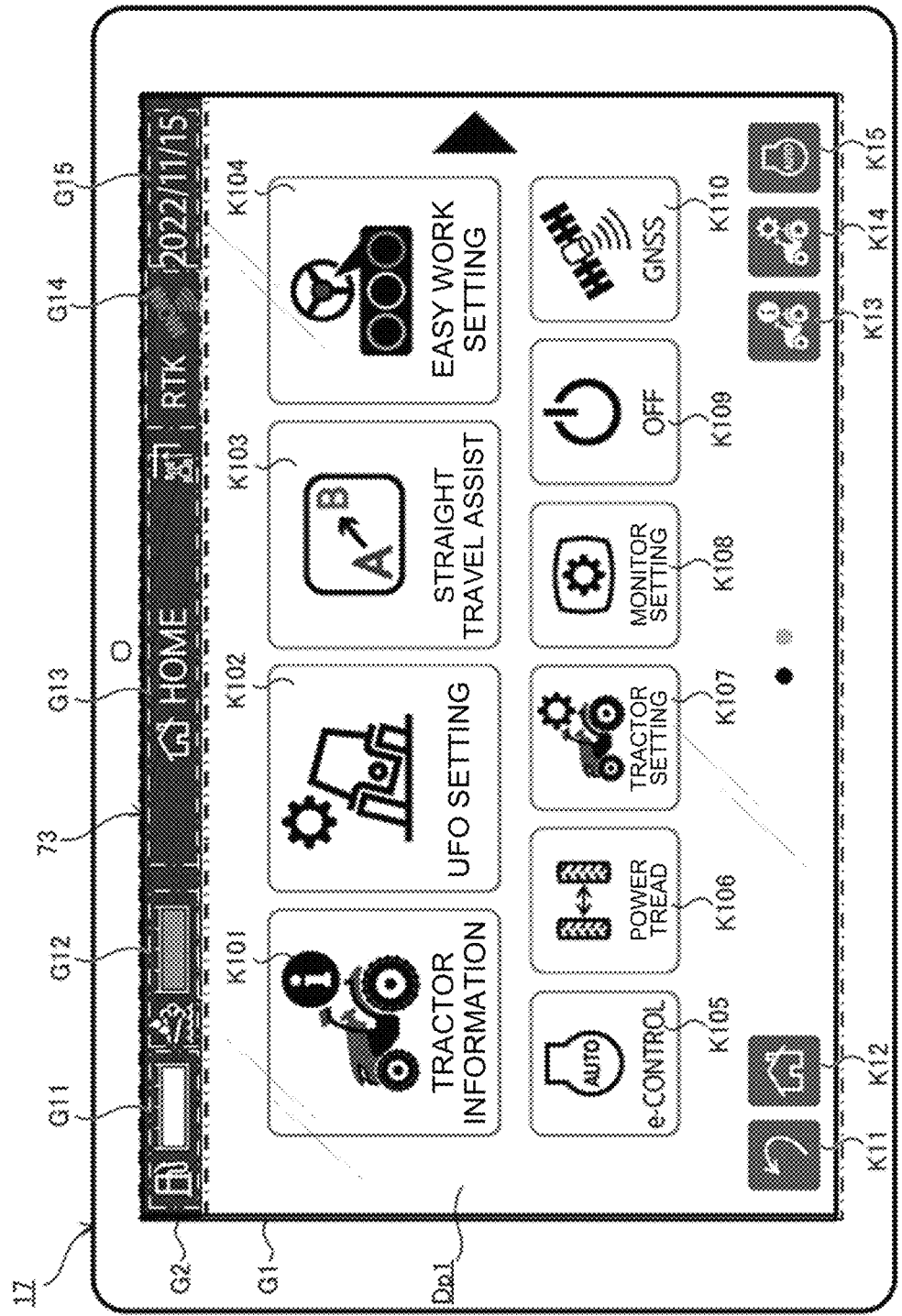
FIG. 17 is a view illustrating an example of a display screen that is displayed on an operation terminal by an operation control method according to the first embodiment of the present invention.

FIG. 17 and the like each illustrate a display screen that is displayed on the operation display unit 73 of the operation terminal 17 including a touch panel display. The "screen" such as the display screen described in the present disclosure means a video (image) displayed on the operation display unit 73 or the like, and includes a figure, a graphic, a photograph, text, a moving image, and the like. In other words, in the automatic travel system 100A, for example, the operation control unit 71 (display processing unit 711) of the operation terminal 17 can generate various display screens and display the display screens on the operation display unit 73. Here, when the display screen includes the moving image or the like, the display screen does not include a still image but a video that changes with every moment. In the drawings of FIG. 17 and the like, each of which illustrates the display screen displayed on the operation display unit 73, a one-dot chain line indicating an area, a lead line, and reference numerals are all provided merely for explanation and not actually displayed on the operation display unit 73.

In addition, design, arrangement, and a size of each object on the display screen, which will be described below, merely constitute one example and can appropriately be changed. The object or the area on the display screen may be or may not be clearly demarcated by a boundary line.

Here, in the case where a specific start operation, which is set in advance, for executing the operation control program is performed, the automatic travel system 100A (an example of the operation control system) executes processing related to the display of any of the various display screens in the operation control method. The start operation includes, for example, connection of the operation terminal 17 to the vehicle controller 11 of the work machine 10 (activation of the application software), login to a dedicated site that requires input of a user identification (ID) and a password, and the like. Meanwhile, when a specific end operation, which is set in advance, is performed on the operation terminal 17, the automatic travel system 100A terminates processing related to the display of any of the various display screens in the operation control method. The end operation includes, for example, logout, disconnection of the operation terminal 17 from the vehicle controller 11 of the work machine 10, and the like.

[2.1] Home Screen

Figure 18:
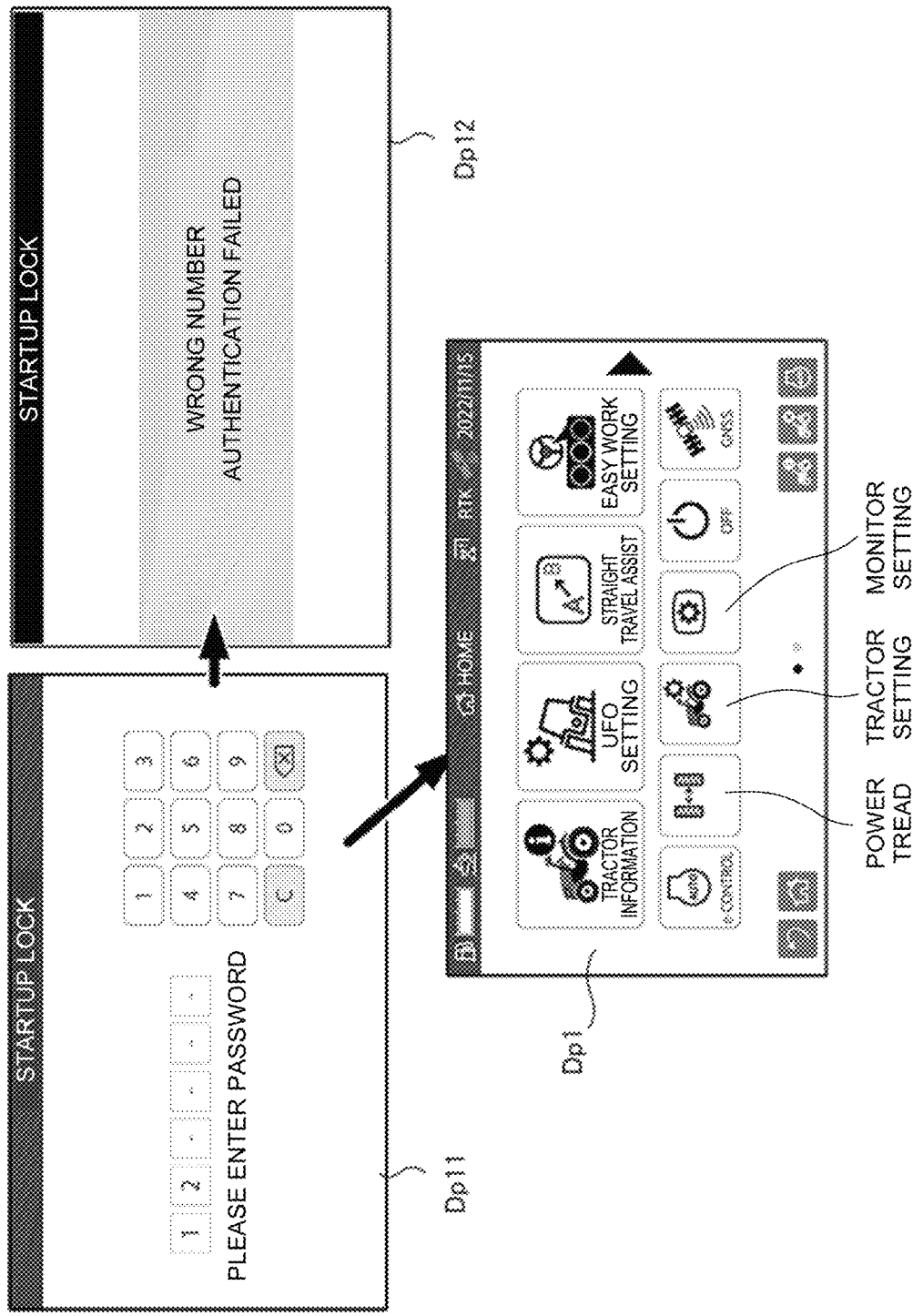
FIG. 18 includes views, each of which illustrates an example of the display screen displayed on the operation terminal by the operation control method according to the first embodiment of the present invention.
Figure 19:
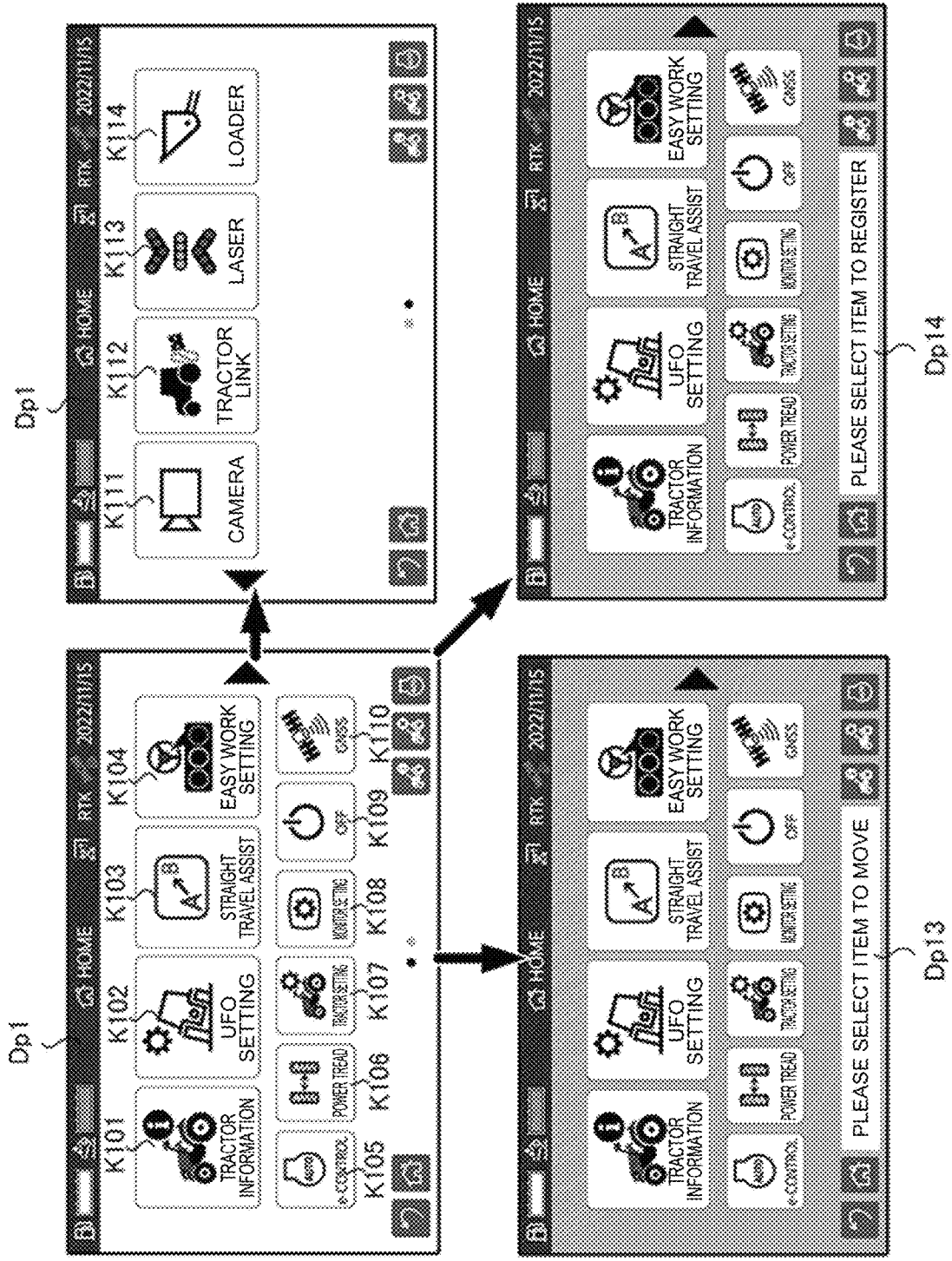
FIG. 19 includes views, each of which illustrates an example of the display screen displayed on the operation terminal by the operation control method according to the first embodiment of the present invention.

Here, a description will firstly be made on a home screen Dp1 displayed on the operation display unit 73 of the operation terminal 17 by the operation control method according to the present embodiment with reference to FIGS. 17, 18, and 19.

The home screen Dp1 is a basic display screen to be displayed on the operation display unit 73 by the operation control method. The display screen that is displayed on the operation display unit 73 including the touch panel display can be shifted from the home screen Dp1 to any of the various display screens including the operation screen (guidance screen D1) in accordance with the operation on the operation display unit 73. The home screen Dp1 corresponds to the home screen D2 (see FIG. 8) in the basic configuration.

As illustrated in FIG. 17, the home screen Dp1 includes a main area G1 and a strip area G2. More specifically, the home screen Dp1 is divided into two areas in a vertical direction (up-down direction). In addition, the main area G1 and the strip area G2 are arranged in an order of the strip area G2 and the main area G1 from top. While the main area G1 is an area that occupies most of the home screen Dp1, the strip area G2 is a strip-shaped area that is long in a horizontal direction (left-right direction) and only occupies an upper end portion of the home screen Dp1.

A plurality of home icons K101 to K110 is displayed in the main area G1 of the home screen Dp1. Each of the plural home icons K101 to K110 is an object that accepts an operation by the user (operator). An individual function is assigned to each of the plural home icons K101 to K110. For example, when the user (operator) operates the home icon K101 to which a function of "TRACTOR INFORMATION" is assigned, the home screen Dp1 is shifted to a tractor information screen Dp2 indicating "TRACTOR INFORMATION" (see FIG. 26). Meanwhile, when the user operates the home icon K107 to which a function of "TRACTOR SETTING" is assigned, the home screen Dp1 is shifted to a tractor setting screen Dp3 indicating "TRACTOR SETTING" (see FIG. 27).

Furthermore, a plurality of shortcut keys K11 to K15 is displayed in the main area G1 of the home screen Dp1. Each of the plural shortcut keys K11 to K15 is an object that accepts an operation by the user (operator). An individual function is assigned to each of the plural shortcut keys K11 to K15. For example, when the user (operator) operates the shortcut key K13 to which the function of "TRACTOR INFORMATION" is assigned, the home screen Dp1 is shifted to the tractor information screen Dp2 indicating "TRACTOR INFORMATION". Meanwhile, when the user (operator) operates the shortcut key K14 to which the function of "TRACTOR SETTING" is assigned, the home screen Dp1 is shifted to the tractor setting screen Dp3 indicating "TRACTOR SETTING".

These plural shortcut keys K11 to K15 are arranged in a lower end portion of the main area G1. For example, also on the display screens other than the home screen Dp1, such as the tractor information screen Dp2 and the tractor setting screen Dp3, the plural shortcut keys K11 to K15 are displayed at the same positions as those in the home screen Dp1. That is, the plurality of the shortcut keys K11 to K15 is basically and constantly displayed on the operation display unit 73 of the operation terminal 17.

Remaining fuel amount information G11, remaining urea water amount information G12, title information G13, antenna reception information G14, and date information G15 are displayed in the strip area G2 of the home screen Dp1. In the strip area G2, these pieces of the information are aligned to be displayed in an order of the remaining fuel amount information G11, the remaining urea water amount information G12, the title information G13, the antenna reception information G14, and the date information G15 from the left.

As the remaining fuel amount information G11, a graph indicating a remaining amount of the fuel (diesel oil) is displayed. As the remaining urea water amount information G12, a graph indicating a remaining amount of urea water is displayed. As the title information G13, a title of the current display screen ("HOME" in the case of the home screen Dp1) is displayed. The antenna reception information G14 indicates a reception status of the positioning antenna 164, and the date information G15 indicates a current date.

For example, also on the display screens other than the home screen Dp1, such as the tractor information screen Dp2 and the tractor setting screen Dp3, the strip area G2 is displayed at the same position as that in the home screen Dp1. That is, the strip area G2 is basically and constantly displayed on the operation display unit 73 of the operation terminal 17.

A display position of each piece of the information in the strip area G2 is fixedly determined. Thus, for example, for the work machine 10 that does not use the urea water, the title information G13 is displayed on the right of the remaining fuel amount information G11 with a space for displaying the remaining urea water amount information G12 being provided therebetween.

By the way, as illustrated in FIG. 18, such a home screen Dp1 is preferably displayed after a password (passcode) is entered on a startup lock screen Dp11. In other words, when the specific start operation is performed, the startup lock screen Dp11 is first displayed on the operation display unit 73. On the startup lock screen Dp11, for example, keys, such as a numeric keypad, for accepting an operation to enter the password are displayed. When a legitimate password is entered on the startup lock screen Dp11, the display screen is shifted from the startup lock screen Dp11 to the home screen Dp1. On the other hand, when a wrong password is entered on the startup lock screen Dp11, as illustrated in FIG. 18, the display screen is shifted from the startup lock screen Dp11 to an error screen Dp12.

In the present embodiment, as illustrated in FIG. 19, the home screen Dp1 includes a large number of home icons K101 to K114 that cannot be displayed on a single screen. In this case, when the home screen Dp1 is swiped in the left-right direction, or a left or right cursor is pressed on the home screen Dp1, as illustrated in an upper part of FIG. 19, a state where the home icons K101 to K110 are displayed in the main area G1 and a state where the home icons K111 to K114 are displayed in the main area G1 are alternately switched.

Furthermore, the home screen Dp1 can be customized. More specifically, when any of the plural home icons K101 to K114 is long-pressed on the home screen Dp1, the display screen is shifted from the home screen Dp1 to a customization screen Dp13 as illustrated in FIG. 19. On the customization screen Dp13, for example, a layout of the plural home icons K101 to K114 can be changed by moving any desired home icons K101 to K114 with a drag operation.

Similarly, when any of the plural shortcut keys K11 to K15 is long-pressed on the home screen Dp1, the display screen is shifted from the home screen Dp1 to a shortcut registration screen Dp14 as illustrated in FIG. 19. On the shortcut registration screen Dp14, the same functions as those of the home icons K101 to K114 can be assigned to the shortcut keys K11 to K15, for example, by an operation to select any desired home icons K101 to K114.

[2.2] Screen Shift Pattern

Next, a description will be made on a screen shift pattern of the display screens, each of which is displayed on the operation display unit 73 of the operation terminal 17, by the operation control method according to the present embodiment with reference to FIGS. 20 to 41.

Figure 20:
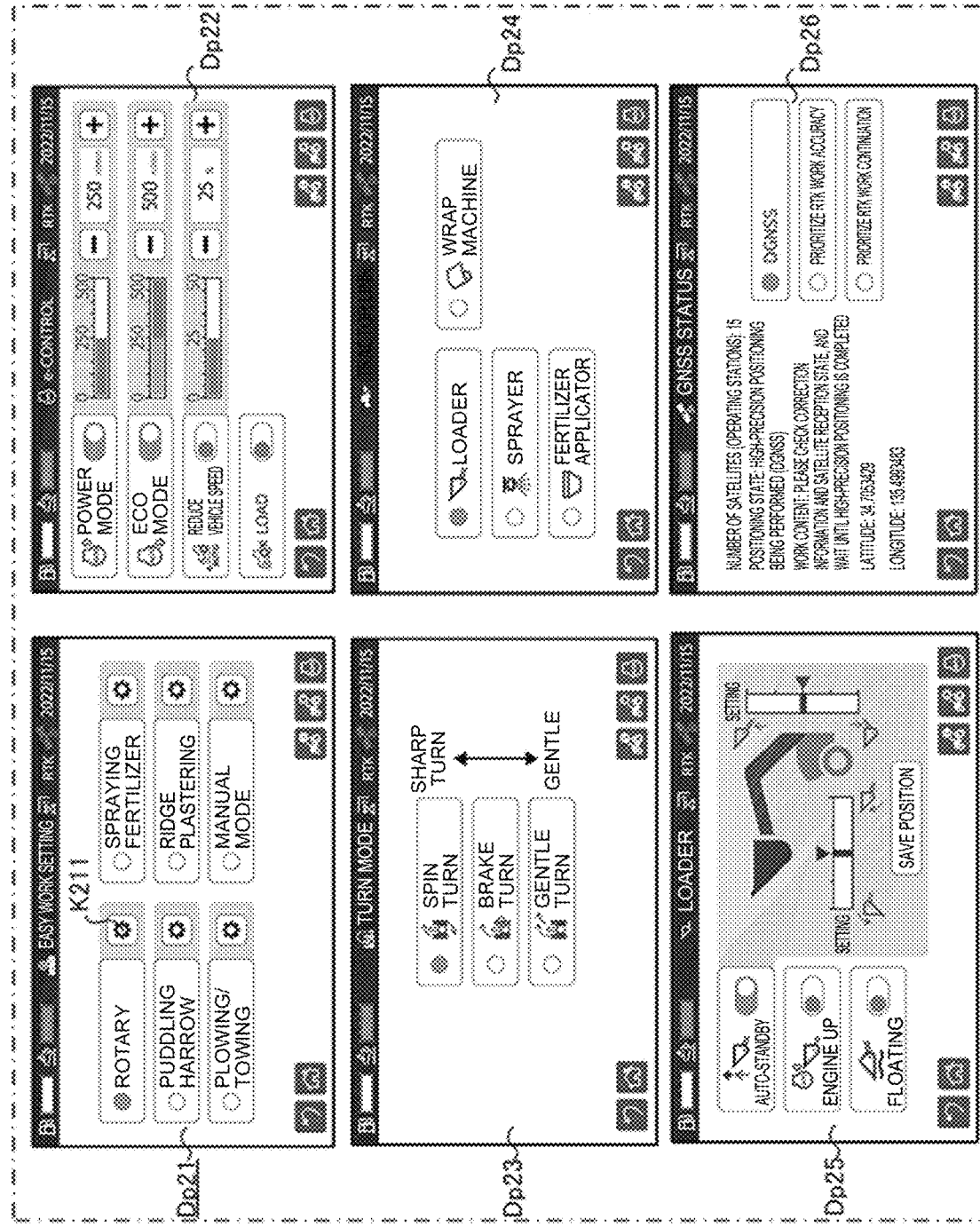
FIG. 20 includes views, each of which illustrates an example of the display screen displayed on the operation terminal by the operation control method according to the first embodiment of the present invention.

FIG. 20 illustrates an example of display screens, to which the home screen Dp1 can directly be shifted. A work setting screen Dp21 is a display screen for setting the work implement 14, and is displayed when the home icon K104 is operated on the home screen Dp1. An automatic work control screen Dp22 is a display screen for setting automatic work control for automatically controlling the speed of the engine 131 and the vehicle speed in accordance with a work load, and is displayed when the home icon K105 is operated on the home screen Dp1.

A turn setting screen Dp23 is a display screen for setting a turn mode of the work machine 10, and is displayed when a home icon (not illustrated), to which a function of "TURN MODE SETTING" is assigned, is operated on the home screen Dp1. A link setting screen Dp24 is a display screen for making a link setting between the work machine 10 and the external device, and is displayed when the home icon K112 is operated on the home screen Dp1.

A loader setting screen Dp25 is a display screen for making action settings on a (front) loader that is attached to the work machine 10, and is displayed when the home icon K114 is operated on the home screen Dp1. A GNSS setting screen is a display screen for setting the positioning device 16 of the work machine 10, and is displayed when the home icon K110 is operated on the home screen Dp1.

Figure 21:
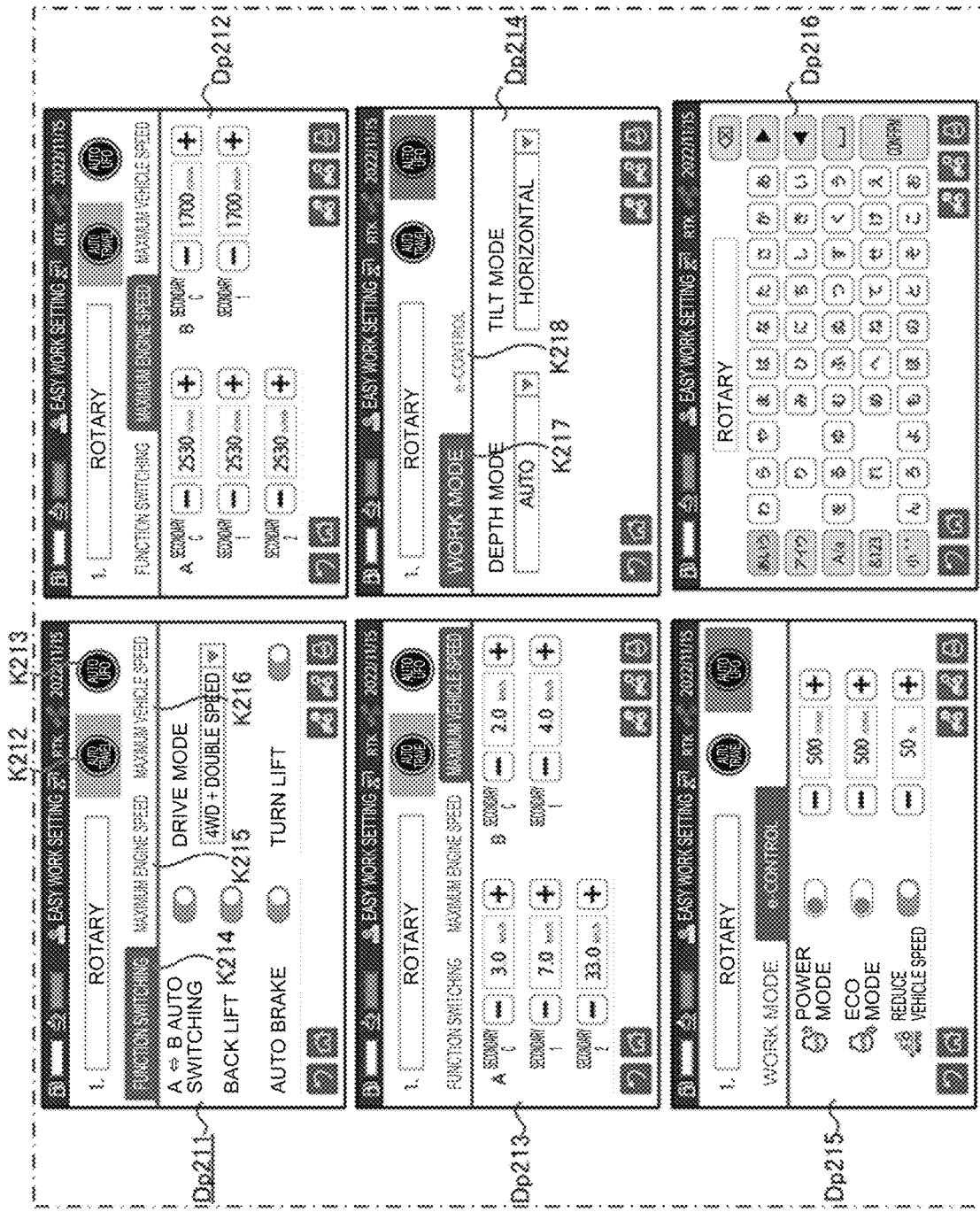
FIG. 21 includes views, each of which illustrates an example of the display screen displayed on the operation terminal by the operation control method according to the first embodiment of the present invention.

FIG. 21 illustrates an example of display screens, to which the work setting screen Dp21 can be shifted. Each of detail setting screens Dp211 to Dp215 is a display screen for setting details of the work to be performed by the work implement 14, and is displayed when a gear icon K211 (see FIG. 20) that corresponds to respective one of the work implements 14 is operated on the work setting screen Dp21.

Each of the detail setting screens Dp211 to Dp213 is a display screen for setting the "travel system" related to the automatic travel of the work machine 10, and each of the detail setting screens Dp214, Dp215 is a display screen for setting the "UFO system" related to the horizontal control of the work machine 10. These detail setting screens Dp211 to Dp213 and the detail setting screens Dp214, Dp215 are alternately switched by an operation of a travel system key K212 or a UFO system key K213 in the respective screen. That is, when the travel system key K212 is operated, the detail setting screens Dp211 to Dp213 for the "travel system" are displayed. When the UFO system key K213 is operated, the detail setting screens Dp214, Dp215 for the "UFO system" are displayed.

Each of the detail setting screens Dp211 to Dp213 includes three tabs K214 to K216, and the detail setting screens Dp211 to Dp213 are switched by a selection operation of the tabs K214 to K216. That is, when the tab K214 of "FUNCTION SWITCHING" is operated, the detail setting screen Dp211 for settings on function switching is displayed. When the tab K215 of "MAXIMUM ENGINE SPEED" is operated, the detail setting screen Dp212 for settings on a maximum speed of the engine 131 is displayed. When the tab K216 of "MAXIMUM VEHICLE SPEED" is operated, the detail setting screen Dp213 for settings on a maximum vehicle speed of the work machine 10 is displayed.

Each of the detail setting screens Dp214, Dp215 includes two tabs K217, K218, and the detail setting screens Dp214, Dp215 are switched by a selection operation of the tabs K217, K218. That is, when the tab K214 of "WORK MODE" is operated, the detail setting screen Dp214 for settings on a work mode is displayed. When the tab K215 of "e-CONTROL" is operated, the detail setting screen Dp215 for settings on the automatic work control is displayed.

When a text box for a work name is selected in each of the detail setting screens Dp211 to Dp215, a character entry screen Dp216 is displayed. The character entry screen Dp216 is a screen for accepting entry of text by the user (operator), and the text entered herein is entered into the text box in each of the detail setting screens Dp211 to Dp215.

Figure 22:
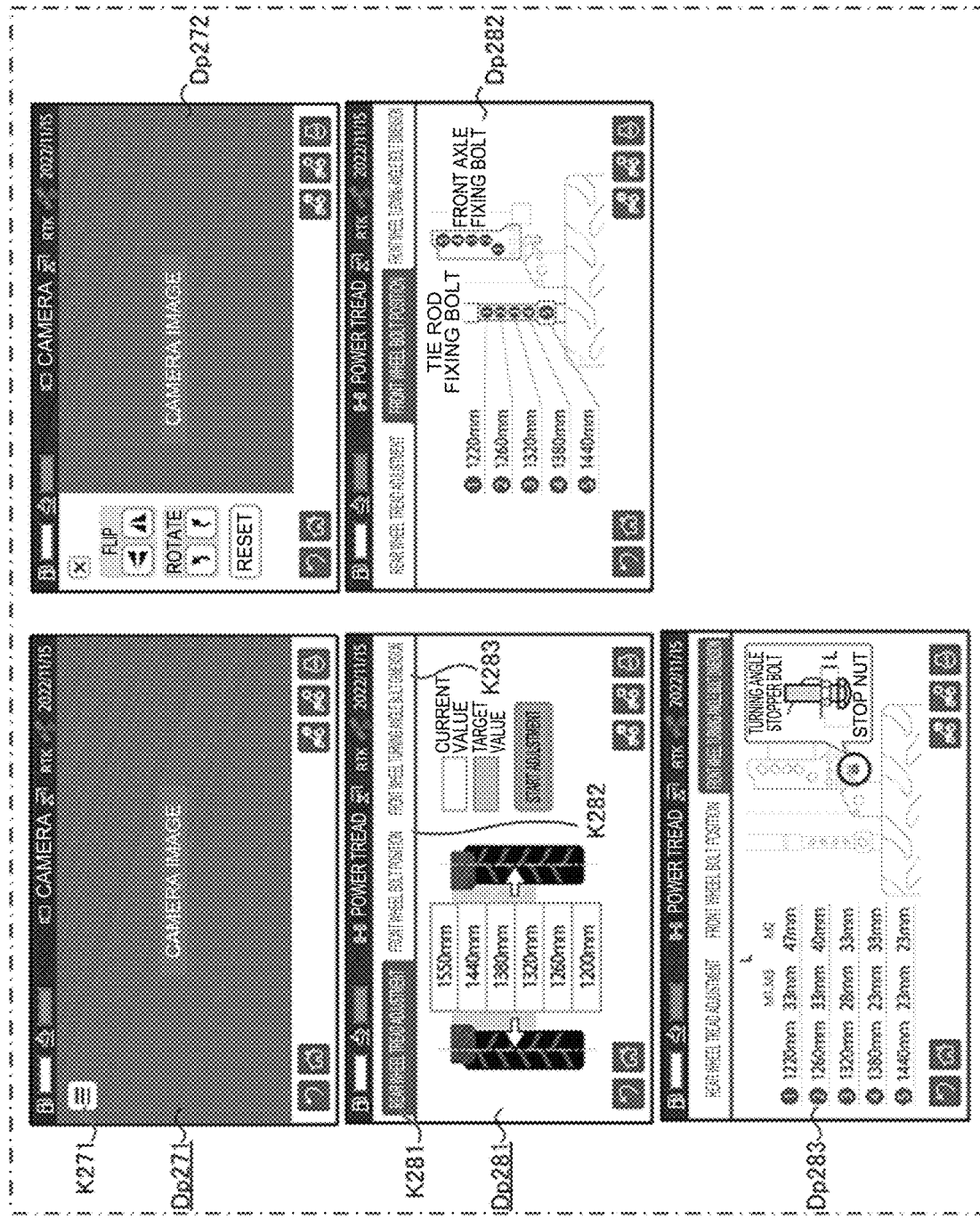
FIG. 22 includes views, each of which illustrates an example of the display screen displayed on the operation terminal by the operation control method according to the first embodiment of the present invention.

FIG. 22 illustrates an example of display screens, to which the home screen Dp1 can be shifted. A camera setting screen Dp271 is a display screen on which a captured image by a camera provided in the work machine 10 is displayed, and is displayed when the home icon K111 is operated on the home screen Dp1. Furthermore, when a menu icon K271 in the camera setting screen Dp271 is operated, the camera setting screen Dp271 is shifted to a camera setting screen Dp272. On the camera setting screen Dp272, it is possible to make settings on image processing on a camera video (for example, flip processing, rotation processing, and the like).

Each of power tread screens Dp281 to Dp283 is a display screen for setting a tread or the like of the travel system 13, and is displayed when the home icon K106 is operated on the home screen Dp1. Furthermore, each of the power tread screens Dp281 to Dp283 includes three tabs K281 to K283, and the power tread screens Dp281 to Dp283 are switched by a selection operation of the tabs K281 to K283. That is, when the tab K281 of "REAR WHEEL TREAD ADJUSTMENT" is operated, the power tread screen Dp281 for making settings on a rear-wheel tread is displayed. When the tab K282 of "FRONT WHEEL BOLT POSITION" is operated, the power tread screen Dp282 for making settings on a front-wheel bolt position is displayed. When the tab K283 of "FRONT WHEEL TURNING ANGLE BOLT DIMENSION" is operated, the power tread screen Dp283 for making settings on a maximum turning angle of the steered wheels (front wheels) of the work machine 10 is displayed.

Figure 23:
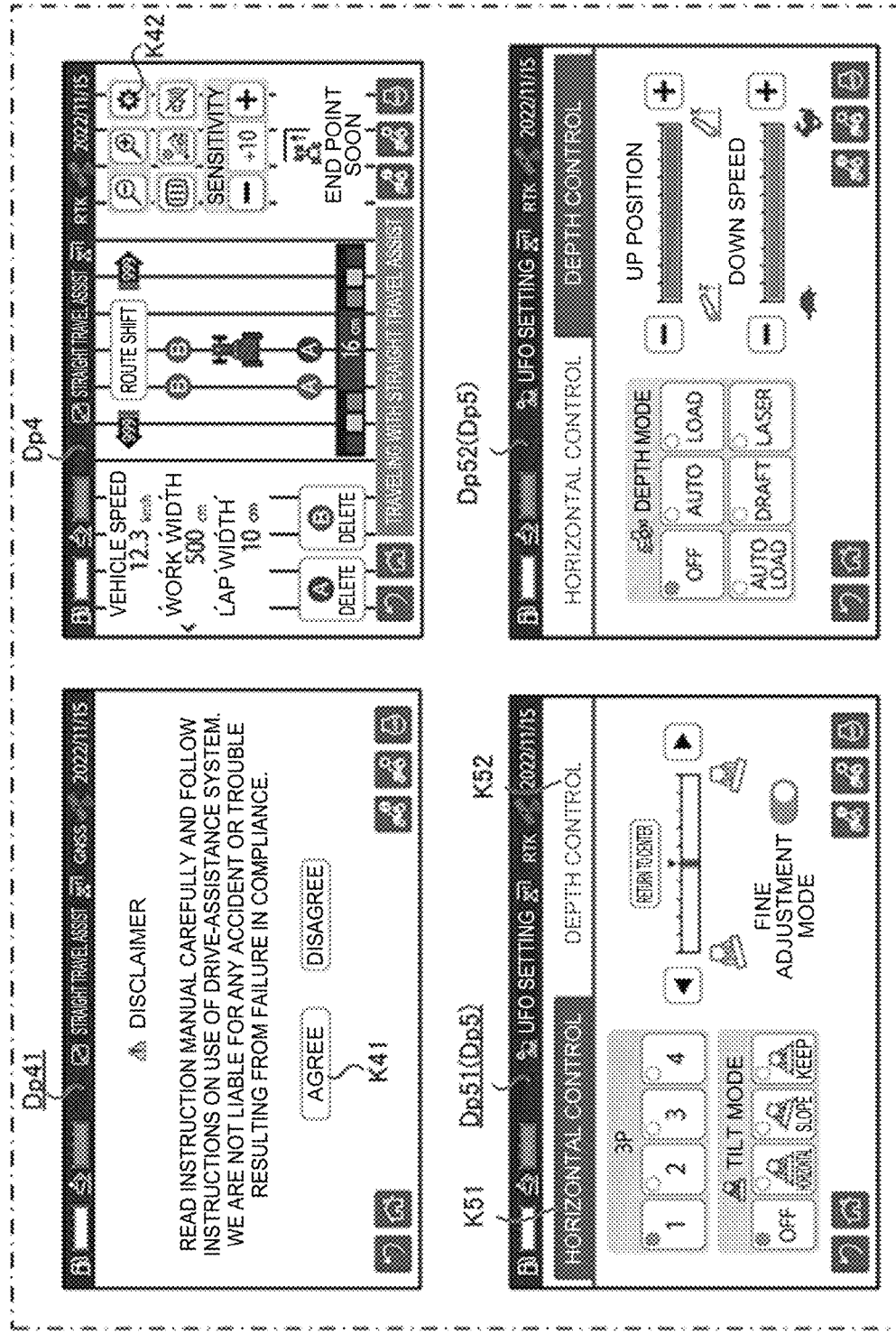
FIG. 23 includes views, each of which illustrates an example of the display screen displayed on the operation terminal by the operation control method according to the first embodiment of the present invention.

FIG. 23 illustrates an example of display screens, to which the home screen Dp1 can be shifted. A guidance screen Dp4 is a display screen for making settings on the straight travel assist, and is displayed when the home icon K103 is operated on the home screen Dp1. The guidance screen Dp4 corresponds to the guidance screen D1 (see FIG. 6) in the basic configuration. Here, in the case where the guidance screen Dp4 is displayed for the first time after the work machine 10 is started (or after the operation terminal 17 is started), a disclaimer confirmation screen Dp41 is displayed prior to the display of the guidance screen Dp4. The disclaimer confirmation screen Dp41 is a display screen for requesting consent for disclaimers related to use of a drive-assistance system such as the straight travel assist. When an agreement key K41 is operated, the disclaimer confirmation screen Dp41 is shifted to the guidance screen Dp4. The guidance screen Dp4 will be described in detail in the section of "[2.4] Guidance Screen Dp4".

The UFO operation screen Dp5 is a display screen for setting the horizontal control of the work implement 14, and is displayed when the home icon K102 is operated on the home screen Dp1. The UFO operation screen Dp5 corresponds to the UFO operation screen D3 (see FIG. 9) in the basic configuration. The UFO operation screen Dp5 includes the UFO operation screen Dp51 related to the horizontal control and a UFO operation screen Dp52 related to depth control. Each of the UFO operation screens Dp51, Dp52 includes two tabs K51, K52, and the UFO operation screens Dp51, Dp52 are switched by a selection operation of the tabs K51, K52. That is, when the tab K51 of "HORIZONTAL CONTROL" is operated, the UFO operation screen Dp51 for setting the horizontal control is displayed. When the tab K52 of "DEPTH CONTROL" is operated, the UFO operation screen Dp52 for making settings on the depth control is displayed. The UFO operation screen Dp5 will be described in detail in the section of "[2.5] UFO Operation Screen Dp5".

Figure 24:
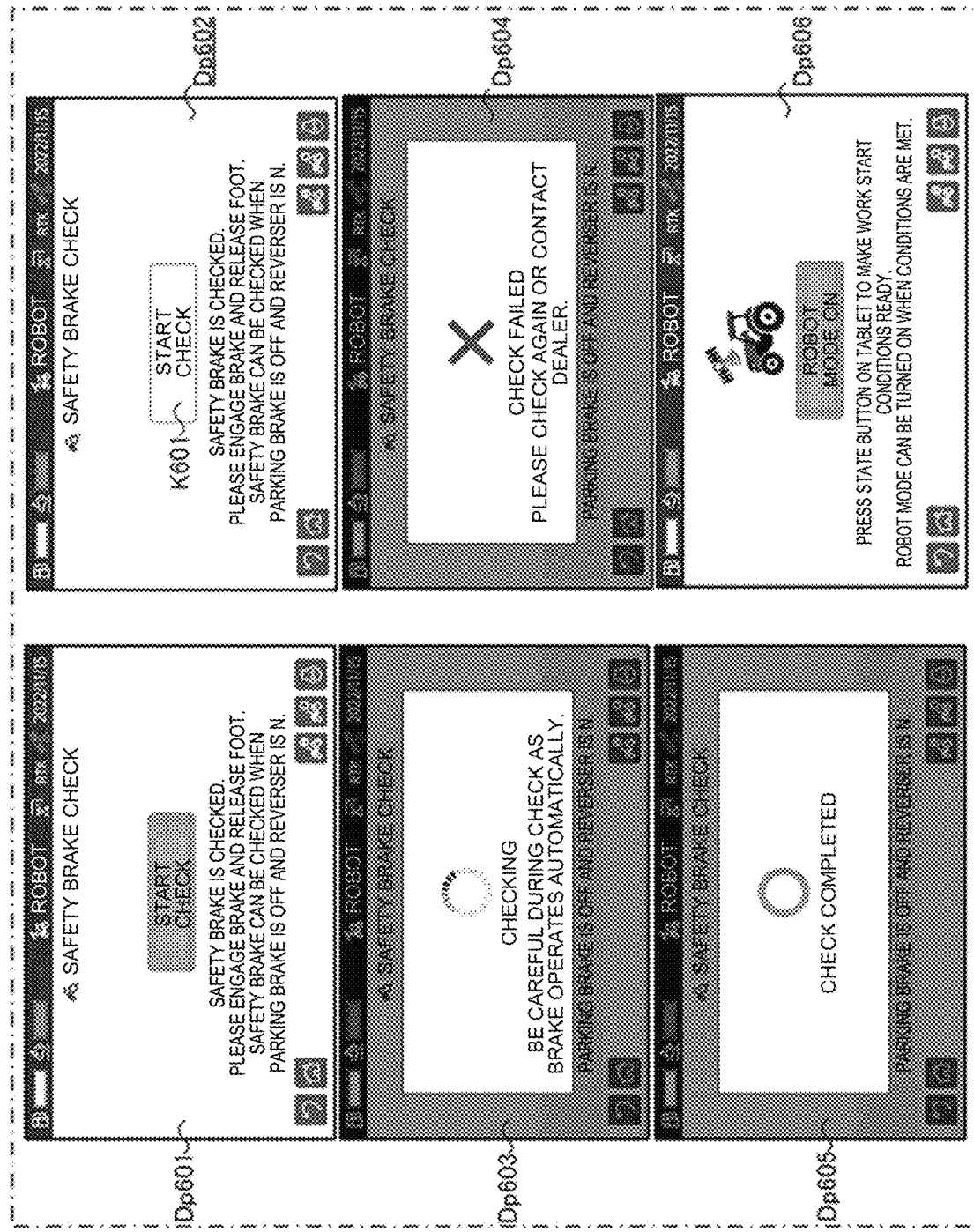
FIG. 24 includes views, each of which illustrates an example of the control method according to the first embodiment of the present invention.
Figure 25:
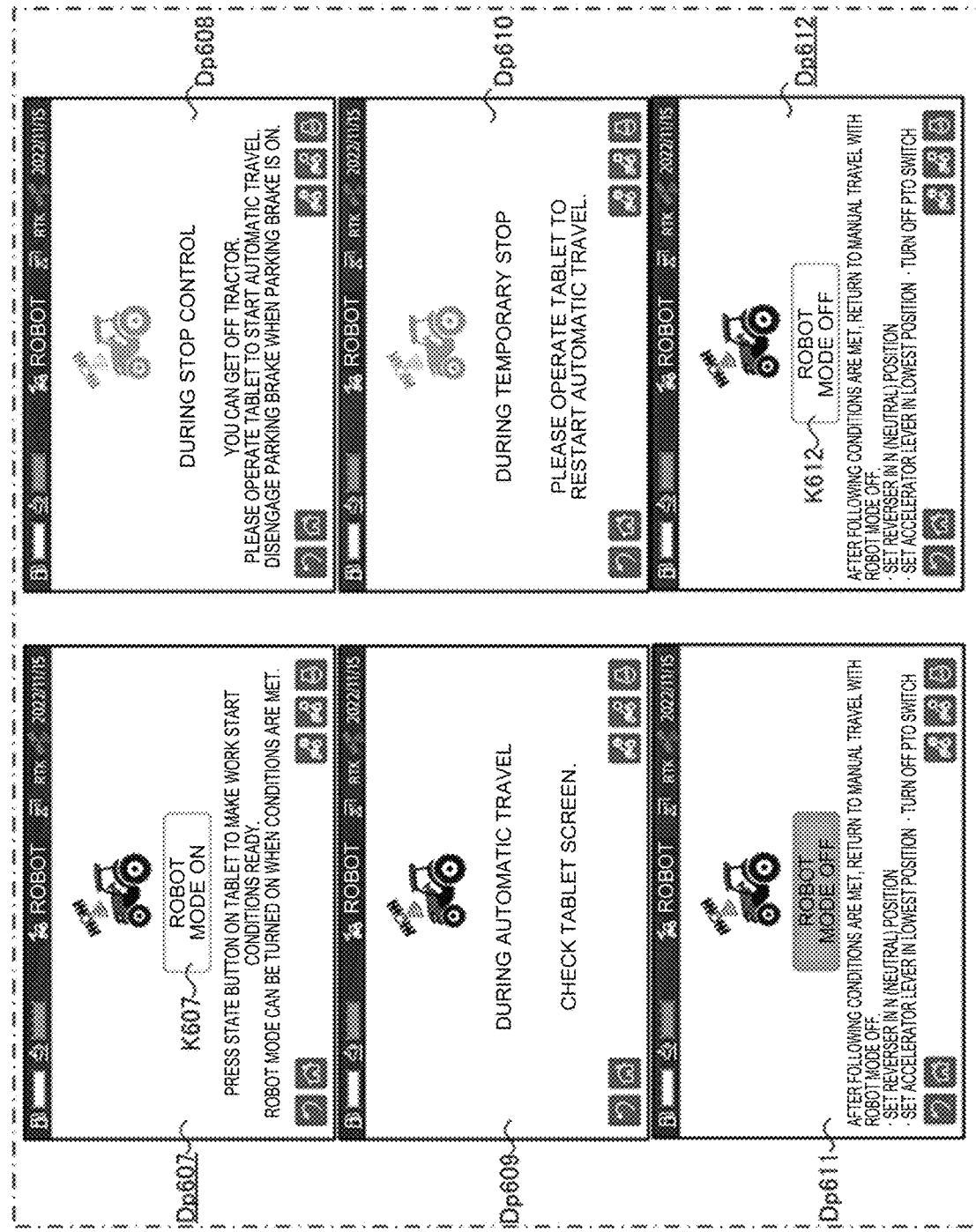
FIG. 25 includes views, each of which illustrates an example of the display screen displayed on the operation terminal by the operation control method according to the first embodiment of the present invention.

FIGS. 24 and 25 each illustrate an example of display screens, to which the home screen Dp1 can be shifted. Each of robot setting screens Dp601 to Dp612 is a display screen for making settings on a robot tractor mode in which the work machine 10 automatically travels (autonomously travels) in a state where the operator is not on the work machine 10 (that is, an unmanned state), and is displayed when a home icon (not illustrated) that corresponds to the robot tractor mode is operated on the home screen Dp1.

More specifically, when a safety brake has not been checked in a predetermined period (for example, on the day), first, the robot setting screen Dp601 of the robot setting screens Dp601 to Dp612 is displayed. During the display of the robot setting screen Dp601, when such a condition that a parking brake is OFF and the reverser lever 183 is at the "neutral" position is satisfied, the robot setting screen Dp601 is shifted to the robot setting screen Dp602. During the display of the robot setting screen Dp602, when a check start key K601 is operated, the robot setting screen Dp602 is shifted to the robot setting screen Dp603. During the display of the robot setting screen Dp603, a brake device is automatically controlled, and an action of the safety brake is checked. At this time, if the operation check fails, the screen transitions to a robot setting screen Dp604 indicating a check failure. On the other hand, when the action check is successful, the robot setting screen Dp603 is shifted to the robot setting screen Dp605 indicating success of the check.

In addition, when the safety brake is checked in a predetermined period (for example, on the day), or when a predetermined time elapses after shifting to the robot setting screen Dp605, the screen is shifted to the robot setting screen Dp606.

During the display of the robot setting screen Dp606, when a status button of the remote operation terminal (tablet) for the remote operation in the robot tractor mode is pressed, and a work start condition of being ready is satisfied, the robot setting screen Dp606 is shifted to the robot setting screen Dp607. During the display of the robot setting screen Dp607, when a robot mode start key K607 is operated, the robot setting screen Dp607 is shifted to the robot setting screen Dp608. In this state, the work machine 10 still remains stopped and does not start the automatic travel.

During the display of the robot setting screen Dp608, when an automatic travel start operation is performed on the remote operation terminal, the robot setting screen Dp608 is shifted to the robot setting screen Dp609. During the display of the robot setting screen Dp609, the work machine 10 automatically travels (autonomously travels). During the display of the robot setting screen Dp609, when a temporary stop operation is performed on the remote operation terminal, the robot setting screen Dp609 is shifted to the robot setting screen Dp610. During the display of the robot setting screen Dp610, the work machine 10 remains stopped. Then, when a restart operation is performed on the remote operation terminal, the robot setting screen Dp610 is shifted to the robot setting screen Dp609.

During the display of any of the robot setting screens Dp608 to Dp610, when abnormality occurs to the function related to the automatic travel of the work machine 10, or when the operator directly operates the work machine 10, the screen is shifted to the robot setting screen Dp611. The robot setting screens Dp609 is also shifted to the robot setting screen Dp611 when the work by the work machine 10 is completed or when an emergency stop operation is performed on the remote operation terminal during the display of the robot setting screens Dp609.

During the display of the robot setting screen Dp611, when such conditions are satisfied that the reverser lever 183 is in the "neutral" position, that the accelerator lever 184 is in a minimum position, and that the PTO switch is turned OFF, the robot setting screen Dp611 is shifted to the robot setting screen Dp612. During the display of the robot setting screen Dp612, when a robot mode end key K612 is operated, the robot setting screen Dp612 is shifted to the robot setting screen Dp606. At this time, the robot tractor mode is terminated, and the work machine 10 returns to the manual travel.

Figure 26:
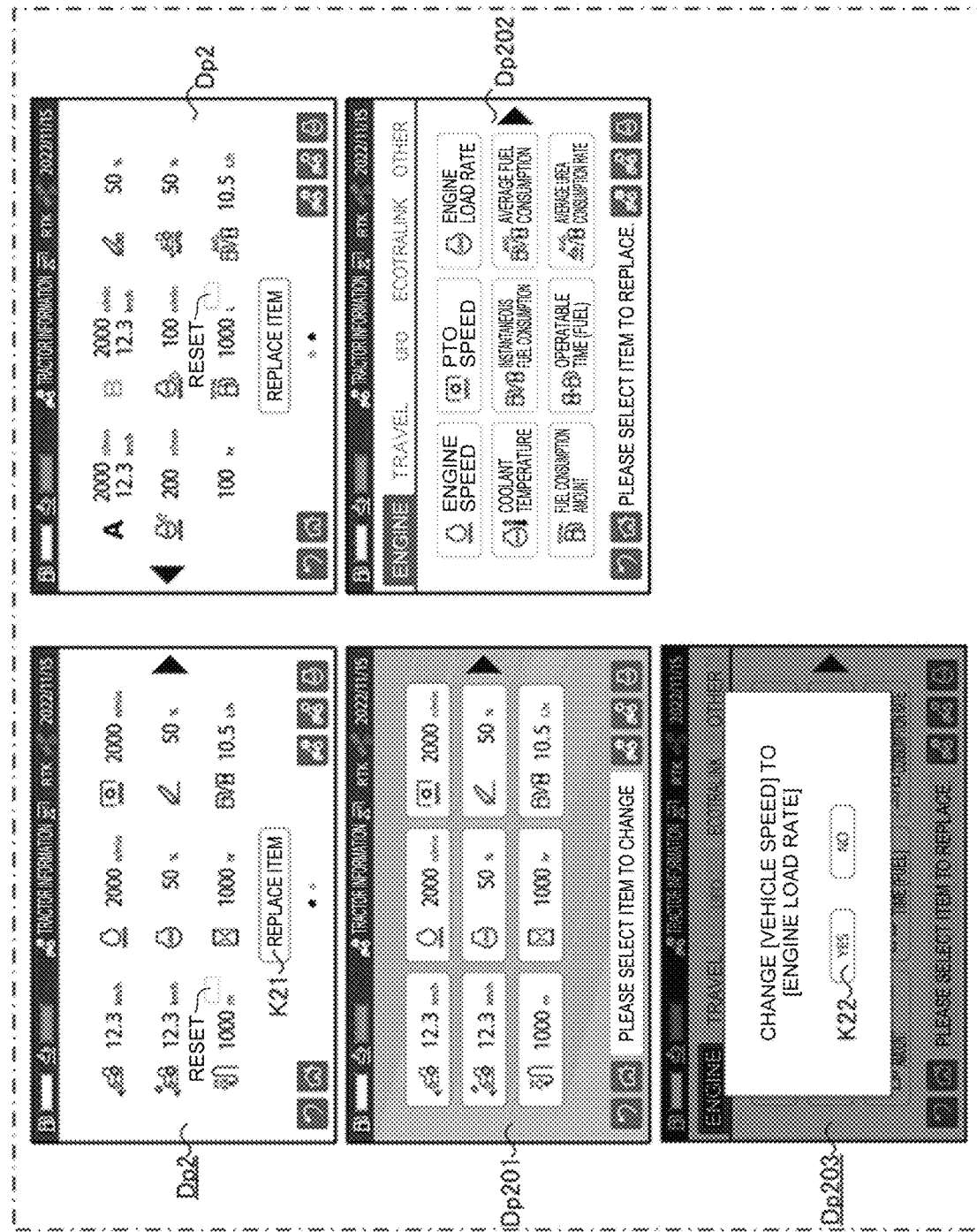
FIG. 26 includes views, each of which illustrates an example of the display screen displayed on the operation terminal by the operation control method according to the first embodiment of the present invention.

FIG. 26 illustrates an example of display screens, to which the home screen Dp1 can be shifted. The tractor information screen Dp2 is a display screen for displaying each piece of setting information on the work machine 10, and is displayed when the home icon K101 is operated on the home screen Dp1.

In the present embodiment, as illustrated in FIG. 26, the tractor information screen Dp2 includes a large number of items, such as the vehicle speed and the speed of the engine 131, that cannot be displayed on a single screen. In this case, when the tractor information screen Dp2 is swiped in the left-right direction, or the left or right cursor is pressed on the tractor information screen Dp2, the displayed items are alternately switched as illustrated in the uppermost part of FIG. 26.

Furthermore, the tractor information screen Dp2 can be customized. More specifically, when an item replacement key K21 is operated on the tractor information screen Dp2, the display screen is shifted from the tractor information screen Dp2 to a customization screen Dp201 as illustrated in FIG. 26. When any desired item to be changed is selected on the customization screen Dp201, the customization screen Dp201 is shifted to a customization screen Dp202. On the customization screen Dp202, when an item to be replaced with the item to be changed, which is selected in the customization screen Dp201, is selected, the customization screen Dp202 is shifted to a change confirmation screen Dp203. On the change confirmation screen Dp203, when a YES key K22 is operated, the item to be changed (for example, "VEHICLE SPEED") on the tractor information screen Dp2 is replaced with another item (for example, "ENGINE LOAD RATE"), and the change confirmation screen Dp203 is shifted to the tractor information screen Dp2.

Figure 27:
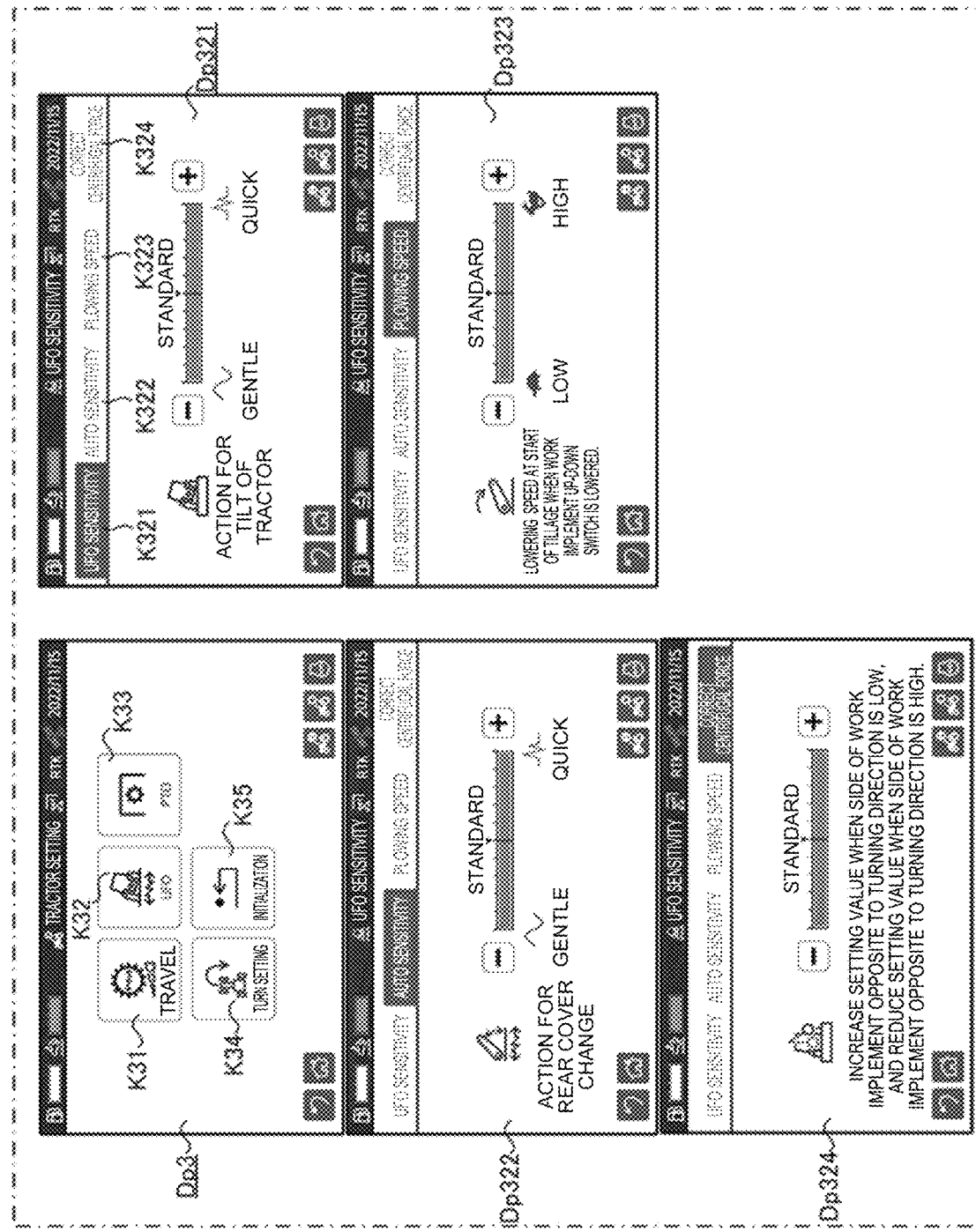
FIG. 27 includes views, each of which illustrates an example of the display screen displayed on the operation terminal by the operation control method according to the first embodiment of the present invention.

FIG. 27 illustrates an example of display screens, to which the home screen Dp1 can be shifted. The tractor setting screen Dp3 is a display screen for making each of the settings on the work machine 10, and is displayed when the home icon K107 is operated on the home screen Dp1. A plurality of setting icons K31 to K35 is displayed on the tractor setting screen Dp3.

Each of UFO sensitivity setting screens Dp321 to Dp324 is a display screen for making settings on the sensitivity of the horizontal control of the work implement 14, and is displayed when the setting icon K32 associated with the UFO sensitivity is operated on the tractor setting screen Dp3.

Each of the UFO sensitivity setting screens Dp321 to Dp324 includes four tabs K321 to K324, and the UFO sensitivity setting screens Dp321 to Dp324 are switched by a selection operation of the tabs K321 to K324. That is, when the tab K321 of "UFO SENSITIVITY" is operated, the UFO sensitivity setting screen Dp321 for making the setting on the sensitivity of the horizontal control with respect to the tilt of the work machine 10 is displayed. When the tab K322 of "AUTO SENSITIVITY" is operated, the UFO sensitivity setting screen Dp322 for setting an action for a change in a rear cover is displayed. When the tab K323 of "PLOWING SPEED" is operated, the UFO sensitivity setting screen Dp323 for setting a lowering speed of the work implement 14 at the start of tilling is displayed. When a tab K324 of "CORRECT CENTRIFUGAL FORCE" is operated, the UFO sensitivity setting screen Dp324 for setting a centrifugal force correction is displayed.

Figure 28:
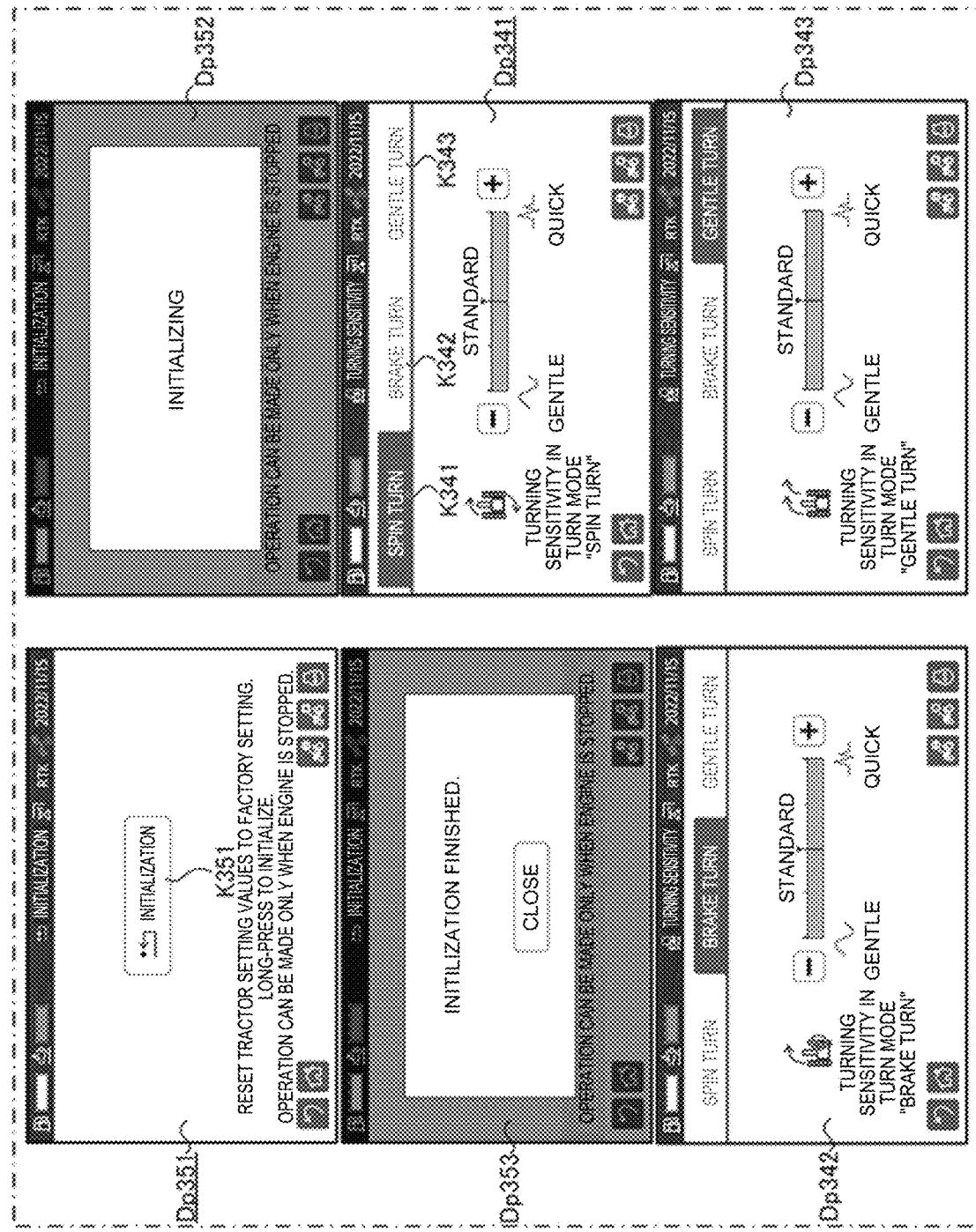
FIG. 28 includes views, each of which illustrates an example of the display screen displayed on the operation terminal by the operation control method according to the first embodiment of the present invention.

FIG. 28 illustrates examples of the display screens, to which the tractor setting screen Dp3 can be shifted. Each of initialization screens Dp351 to Dp353 is a display screen for initializing the settings on the work machine 10, and is displayed when the setting icon K35, which is associated with the initialization, is operated on the tractor setting screen Dp3. On the initialization screen Dp351, when an initialization key K351 is long-pressed, the initialization screen Dp351 is shifted to the initialization screen Dp352, and initialization processing is executed for each of the setting values that have been set. When the initialization processing is terminated, the initialization screen Dp352 is shifted to the initialization screen Dp353.

Each of turning sensitivity setting screens Dp341 to Dp343 is a display screen for setting turning sensitivity of the work machine 10, and is displayed when a setting icon (not illustrated) associated with the turning sensitivity is operated on the tractor setting screen Dp3.

Each of the turning sensitivity setting screens Dp341 to Dp343 includes three tabs K341 to K343, and the turning sensitivity setting screens Dp341 to Dp343 are switched by a selection operation of the tabs K341 to K343. That is, when the tab K341 of "SPIN TURN" is operated, the turning sensitivity setting screen Dp341 for setting the turning sensitivity during a spin turn of the work machine 10 is displayed. When the tab K342 of "BRAKE TURN" is operated, the turning sensitivity setting screen Dp342 for setting the turning sensitivity during a brake turn of the work machine 10 is displayed. When the tab K343 of "GENTLE TURN" is operated, the turning sensitivity setting screen Dp343 for setting the turning sensitivity during a gentle turn of the work machine 10 is displayed.

Figure 29:
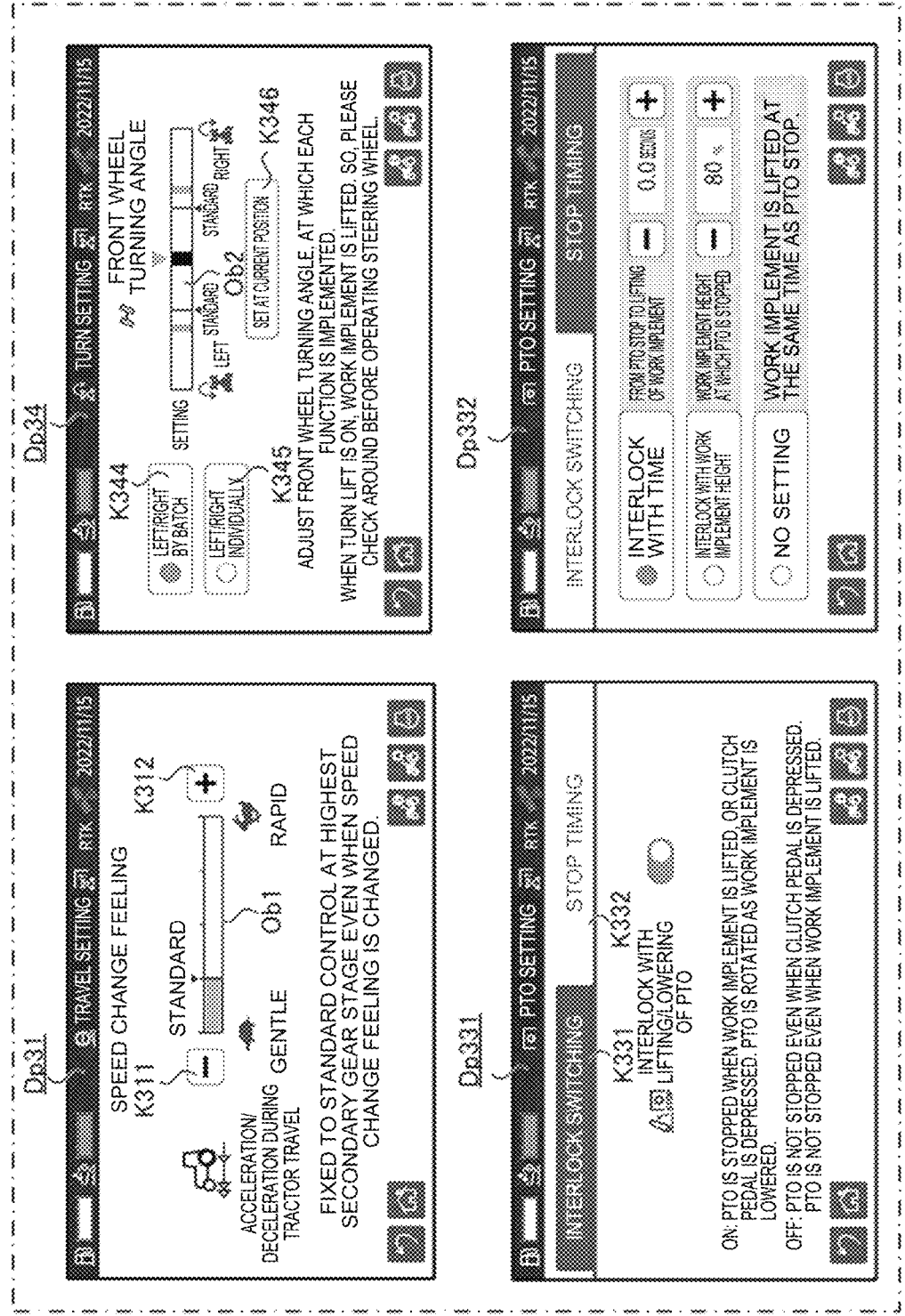
FIG. 29 includes views, each of which illustrates an example of the display screen displayed on the operation terminal by the operation control method according to the first embodiment of the present invention.

FIG. 29 illustrates an example of display screens, to which the tractor setting screen Dp3 can be shifted. A travel setting screen Dp31 is a display screen for making settings on speed change feeling (acceleration) of the travel system 13, and is displayed when the setting icon K31 associated with travel setting is operated on the tractor setting screen Dp3. A turning sensitivity setting screen Dp34 is a display screen for setting the maximum turning angle of the steered wheels (front wheels) of the work machine 10, and is displayed when the setting icon K34 associated with the turning setting is operated on the tractor setting screen Dp3. The settings on the speed change feeling (acceleration) will be described in detail in the section "[2.3] Acceleration Adjustment Function".

Each of PTO setting screens Dp331, Dp332 is a display screens for setting the PTO, and is displayed when the setting icon K33 associated with the PTO setting is operated on the tractor setting screen Dp3.

Each of the PTO setting screens Dp331, Dp332 includes two tabs K331, K332, and the PTO setting screens Dp331, Dp332 are switched by a selection operation of the tabs K331, K332. That is, when the tab K331 of the "INTERLOCK SWITCHING" is operated, the PTO setting screen Dp331 for making a setting on the PTO related to the interlock with a lifting-lowering action of the work implement 14 is displayed. When the tab K332 of "STOP TIMING" is operated, the PTO setting screen Dp332 for making settings on the stop of the PTO is displayed.

Figure 30:
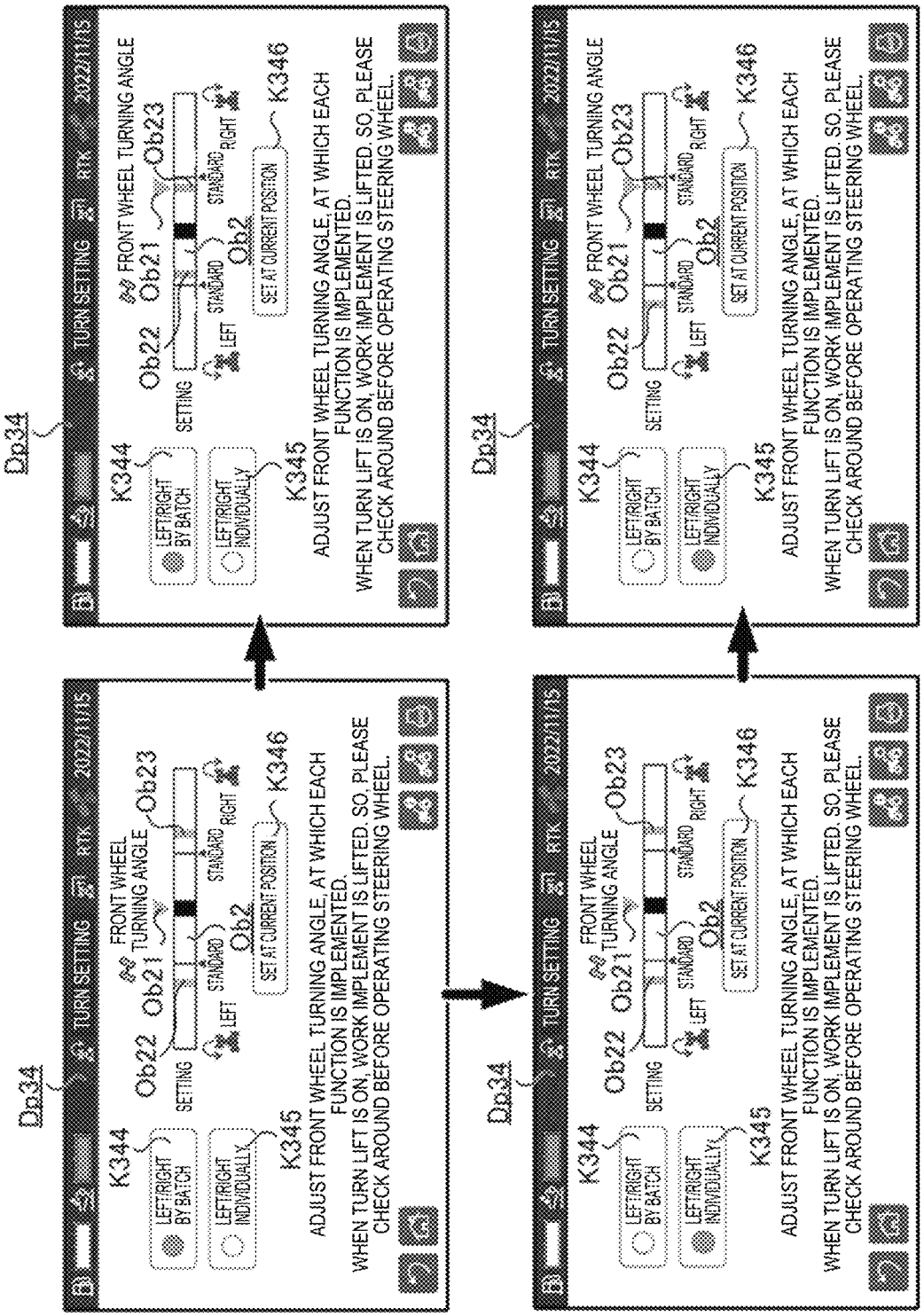
FIG. 30 includes views, each of which illustrates an example of the display screen displayed on the operation terminal by the operation control method according to the first embodiment of the present invention.

FIG. 30 illustrates details of the turning sensitivity setting screen Dp34. The turning sensitivity setting screen Dp34 includes a batch key K344, an individual key K345, a setting key K346, and a turning angle object Ob2. The turning angle object Ob2 includes a cursor Ob21 that moves in conjunction with the steering wheel 137, a cursor Ob22 representing the currently set maximum turning angle on the left side, and a cursor Ob23 representing the currently set maximum turning angle on the right side. On the turning sensitivity setting screen Dp34, the batch key K344 and the individual key K345 can alternatively be selected.

Then, on the turning sensitivity setting screen Dp34, when the setting key K346 is pressed in a state where the batch key K344 is selected and a state where the steered wheels (front wheels) are turned to any one side by the operation of the steering wheel 137, the maximum turning angles on both the left side and the right side are collectively set to the steering angle at the time. That is, as an example, as illustrated in the upper right of FIG. 30, when the setting key K346 is pressed in a state where the steered wheels are turned to the right by the operation of the steering wheel 137, not only the cursor Ob23 representing the maximum turning angle on the right side but also the cursor Ob22 representing the maximum turning angle on the left side is updated in accordance with the position of the cursor Ob21.

Meanwhile, on the turning sensitivity setting screen Dp34, when the individual key K345 is selected as illustrated in the lower left of FIG. 30, and when the setting key K346 is pressed in a state where the steered wheels (front wheels) are turned to any one side by the operation of the steering wheel 137, the maximum turning angle on the side where the steered wheels are actually turned between the left side and the right side is set to the steering angle at the time. That is, as an example, as illustrated in the lower right of FIG. 30, when the setting key K346 is pressed in a state where the steered wheels are turned to the right by the operation of the steering wheel 137, only the cursor Ob23 representing the maximum turning angle on the right side is updated to the position of the cursor Ob21.

Figure 31:
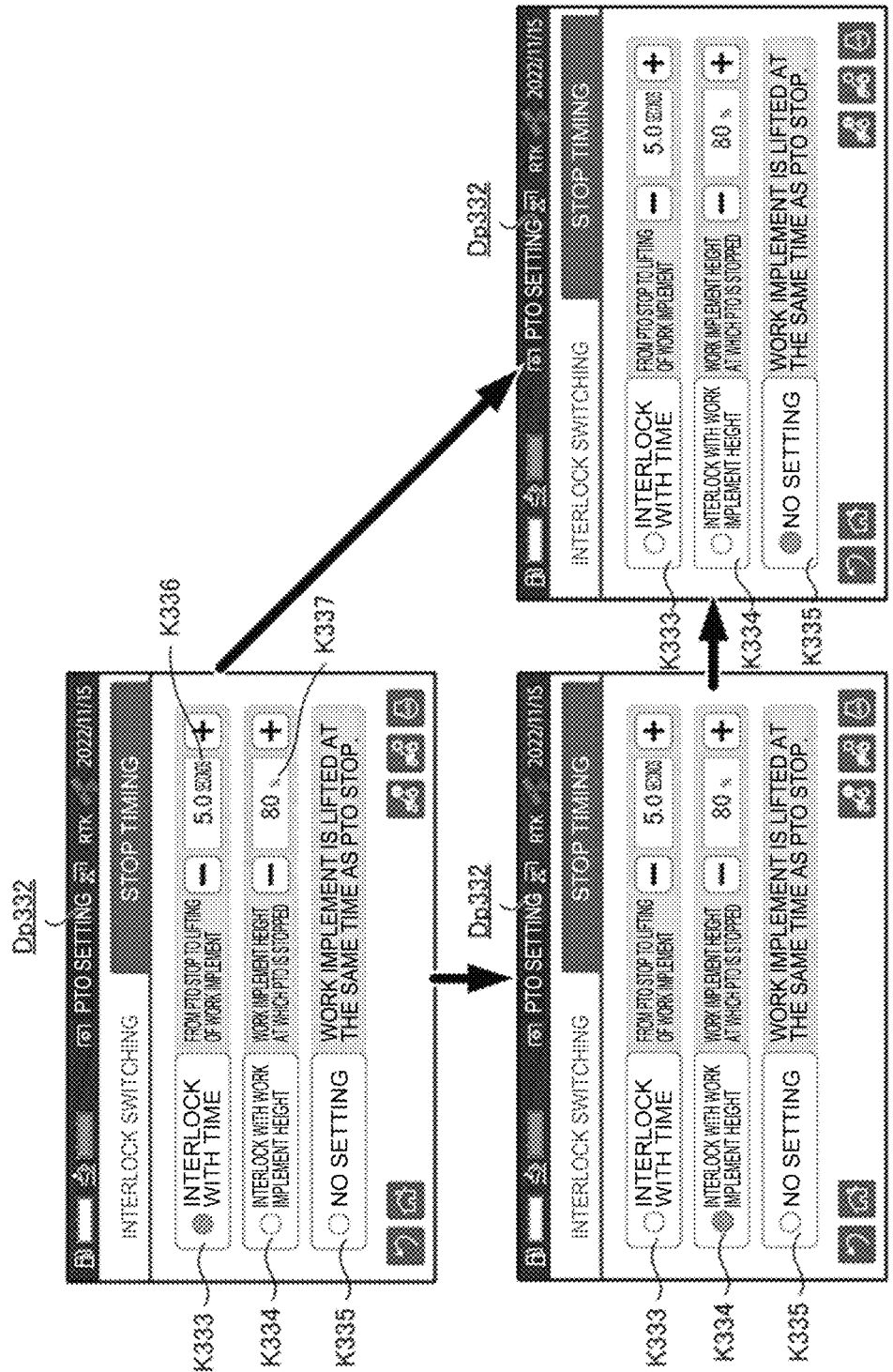
FIG. 31 includes views, each of which illustrates an example of the display screen displayed on the operation terminal by the operation control method according to the first embodiment of the present invention.

FIG. 31 illustrates details of the PTO setting screen Dp332. The PTO setting screen Dp332 includes a time interlock key K333, a height interlock key K334, and a no-setting key K335. The PTO setting screen Dp332 further includes a time designation field K336 and a height designation field K337. On the PTO setting screen Dp332, the time interlock key K333, the height interlock key K334, and the no-setting key K335 can alternatively be selected. A value in each of the time designation field K336 and the height designation field K337 can be adjusted by a plus button and a minus button.

Then, on the PTO setting screen Dp332, as illustrated in the upper part of FIG. 31, in a state where the time interlock key K333 is selected, a delay time from the stop of the PTO to the lifting of the work implement 14 is set to a time designated in the time designation field K336 ("5.0 seconds" in the example of FIG. 31). In addition, on the PTO setting screen Dp332, as illustrated in the lower left of FIG. 31, in a state where the height interlock key K334 is selected, the height of the work implement 14 at the time of stopping the PTO is set to a height designated in the height designation field K337 ("80%" in the example of FIG. 31). Meanwhile, on the PTO setting screen Dp332, as illustrated in the lower right of FIG. 31, in a state where the no-setting key K335 is selected, the setting is made such that the work implement 14 is lifted simultaneously with the stop of the PTO regardless of the values in the time designation field K336 and the height designation field K337.

Figure 32:
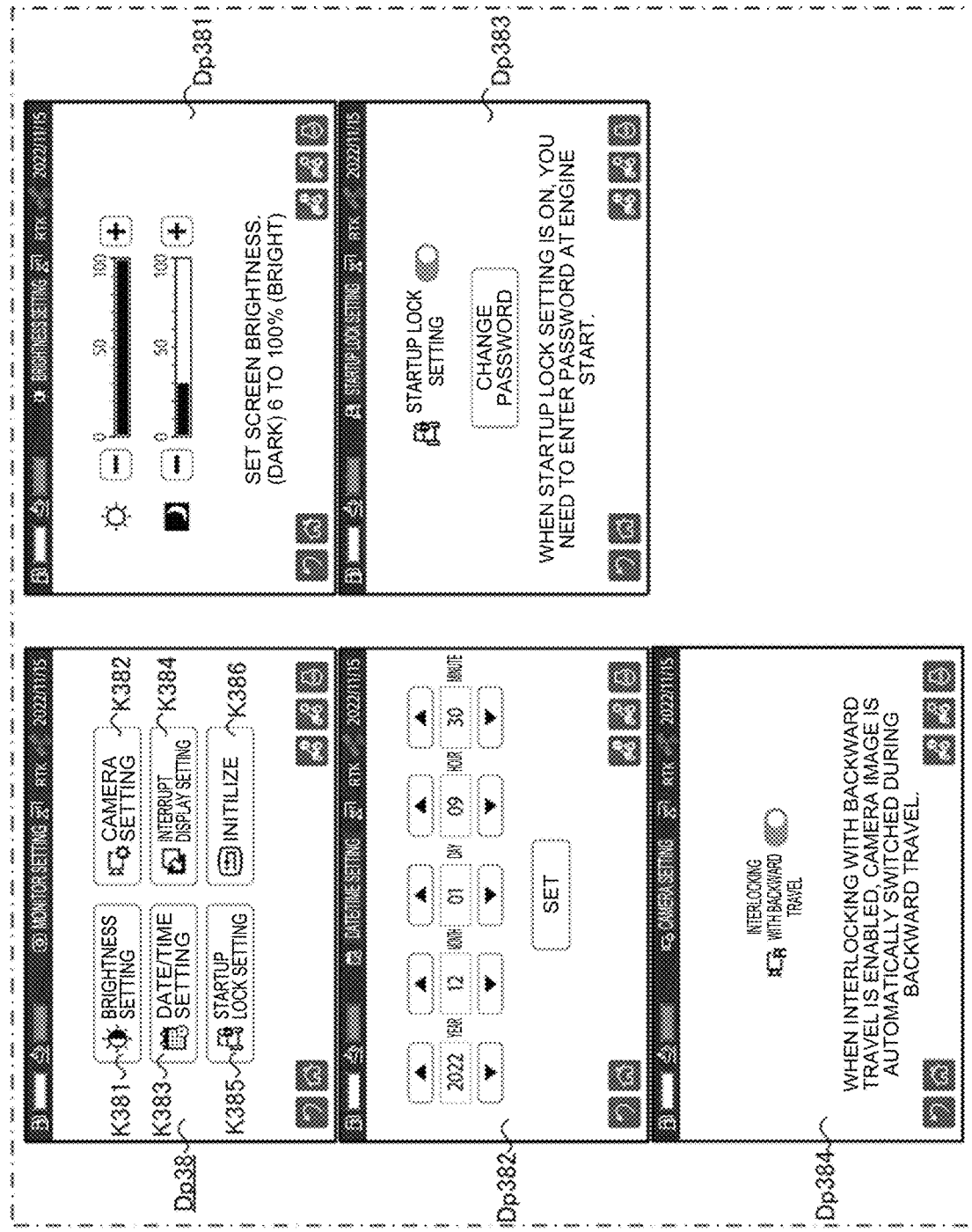
FIG. 32 includes views, each of which illustrates an example of the control method according to the first embodiment of the present invention.
Figure 33:
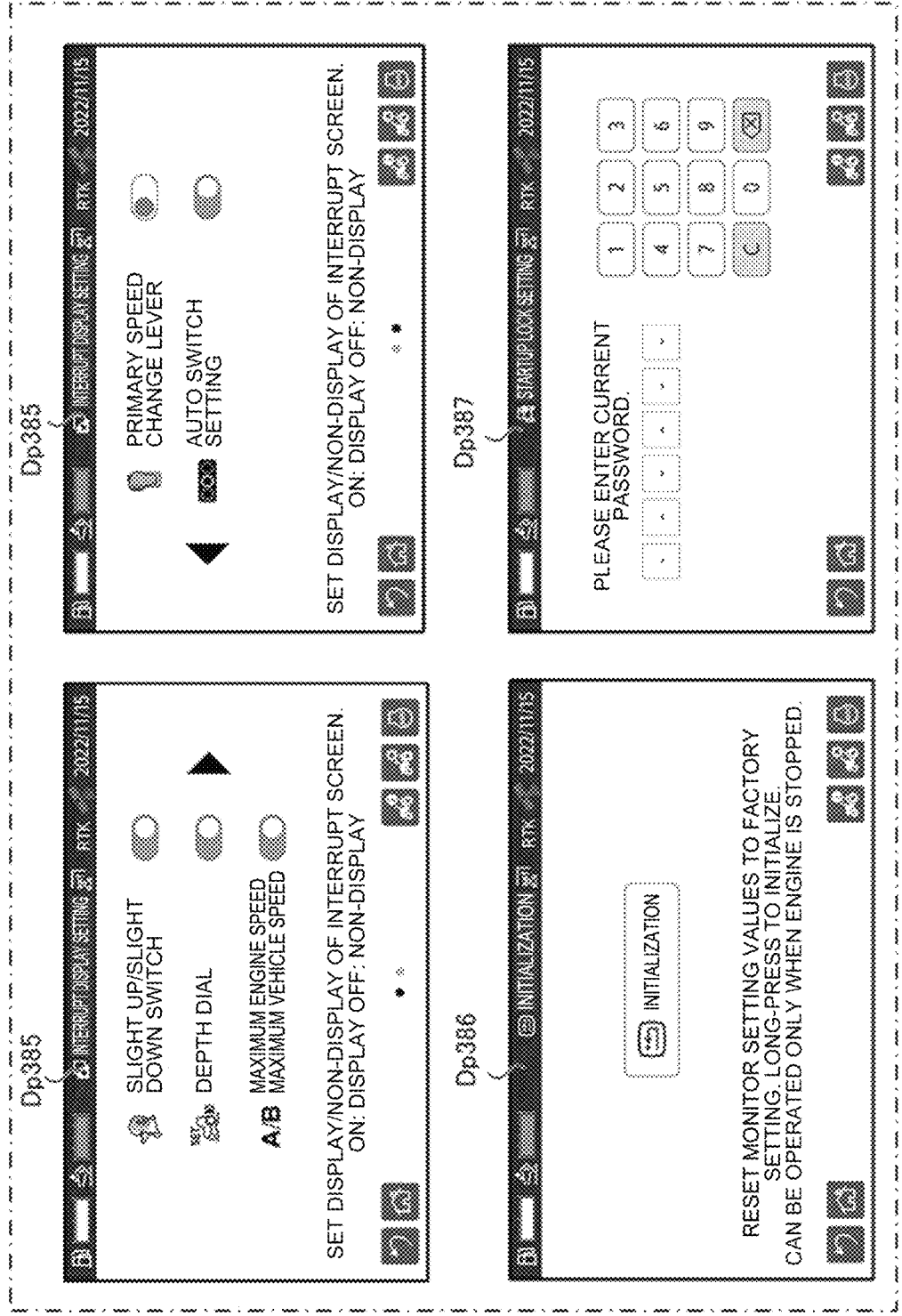
FIG. 33 includes views, each of which illustrates an example of the display screen displayed on the operation terminal by the operation control method according to the first embodiment of the present invention.

FIGS. 32 and 33 illustrate an example of a monitor setting screen Dp38, to which the home screen Dp1 can be shifted, and display screens, to which the monitor setting screen Dp38 can further be shifted. The monitor setting screen Dp38 is a display screen for making settings on the operation display unit 73 of the operation terminal 17, and is displayed when the home icon K108 is operated on the home screen Dp1. A plurality of setting icons K381 to K386 is displayed on the monitor setting screen Dp38.

A brightness setting screen Dp381 is a display screen for setting brightness of the operation display unit 73, and is displayed when the setting icon K381 associated with the brightness setting is operated on the monitor setting screen Dp38. On the brightness setting screen Dp381, for example, the brightness in cases of ON and OFF of headlights of the work machine 10 is separately displayed by two bar graphs. A date setting screen Dp382 is a display screen for setting the date (and time) to be displayed on the operation display unit 73, and is displayed when the setting icon K383 associated with the date setting is operated on the monitor setting screen Dp38.

A startup lock setting screen Dp383 is a display screen for setting the lock (password or the like) at the start of the operation display unit 73, and is displayed when the setting icon K385 associated with the startup lock setting is operated on the monitor setting screen Dp38. A camera setting screen Dp384 is a display screen for making settings on the camera video to be displayed on the operation display unit 73, and is displayed when the setting icon K382 associated with the camera settings is operated on the monitor setting screen Dp38.

An interrupt display setting screen Dp385 is a display screen for making settings on interrupt display on the operation display unit 73, and is displayed when the setting icon K384 associated with the interrupt display settings is operated on the monitor setting screen Dp38. In the present embodiment, as illustrated in FIG. 33, the interrupt display setting screen Dp385 includes a large number of items, such as a depth dial and the maximum vehicle speed, that cannot be displayed on a single screen. In this case, when the interrupt display setting screen Dp385 is swiped in the left-right direction, or a left or right cursor is pressed on the interrupt display setting screen Dp385, the displayed items are alternately switched as illustrated in the upper part of FIG. 33.

An initialization screen Dp386 is a display screen for initializing the setting values related to the display setting, and is displayed when the setting icon K386 associated with the initialization setting is operated on the monitor setting screen Dp38. In the case where a startup lock is set for the initialization on the initialization screen Dp386, as illustrated in FIG. 33, a password entry screen Dp387 for requesting entry of the password is displayed.

Figure 34:
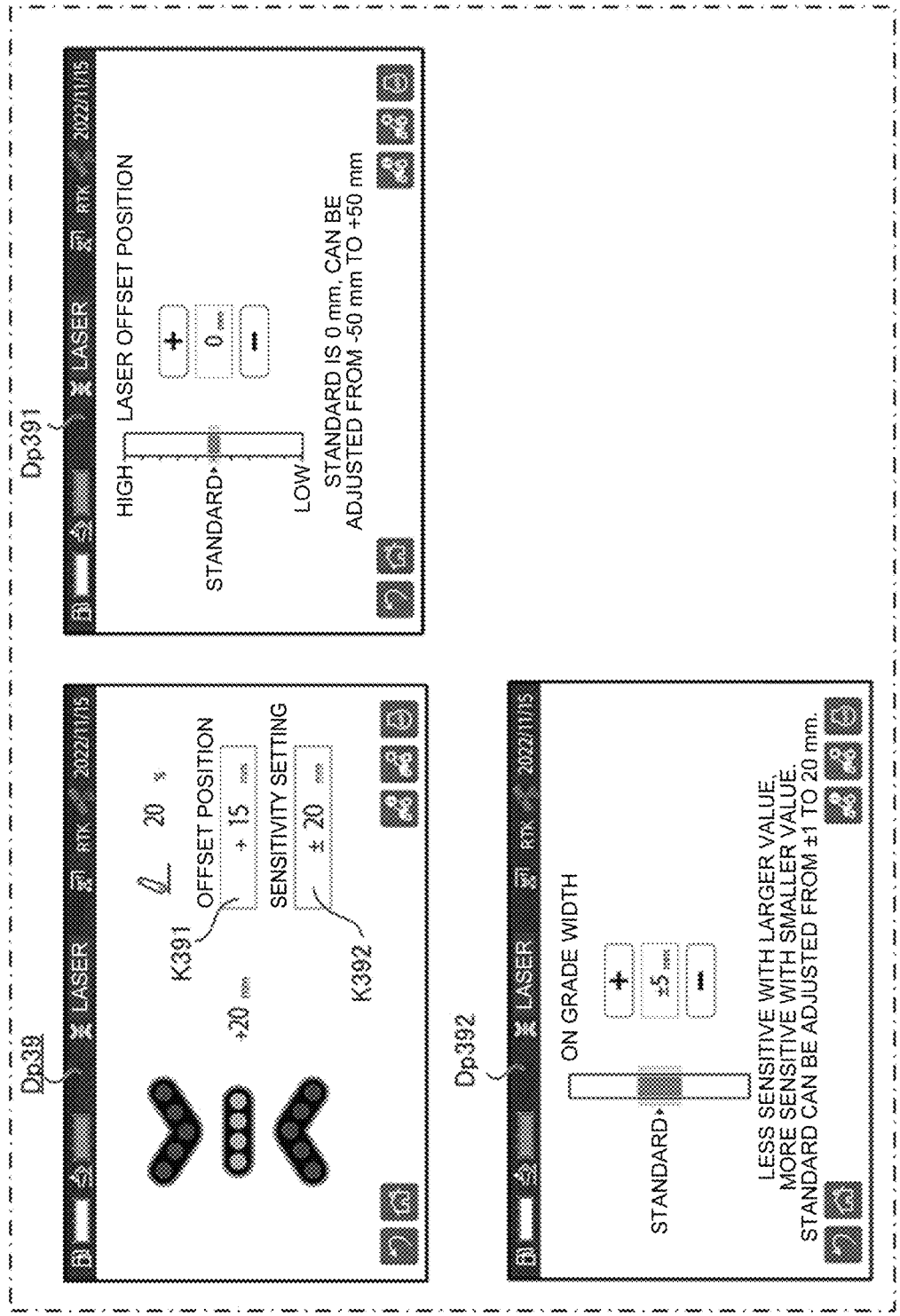
FIG. 34 includes views, each of which illustrates an example of the display screen displayed on the operation terminal by the operation control method according to the first embodiment of the present invention.

FIG. 34 illustrates an example of a laser setting screen Dp39, to which the home screen Dp1 can be shifted, and display screens, to which the laser setting screen Dp39 can further be shifted. The laser setting screen Dp39 is a display screen for making settings on a laser, and is displayed when the home icon K113 is operated on the home screen Dp1. A plurality of setting icons K391, K392 is displayed on the laser setting screen Dp39.

An offset setting screen Dp391 is a display screen for setting a laser offset position, and is displayed when the setting icon K391 associated with the offset setting is operated on the laser setting screen Dp39. A sensitivity setting screen Dp392 is a display screen for setting laser sensitivity, and is displayed when the setting icon K392 associated with the sensitivity setting is operated on the laser setting screen Dp39.

Next, a description will be made on display screens, to which the guidance screen Dp4 can be shifted.

Figure 35:
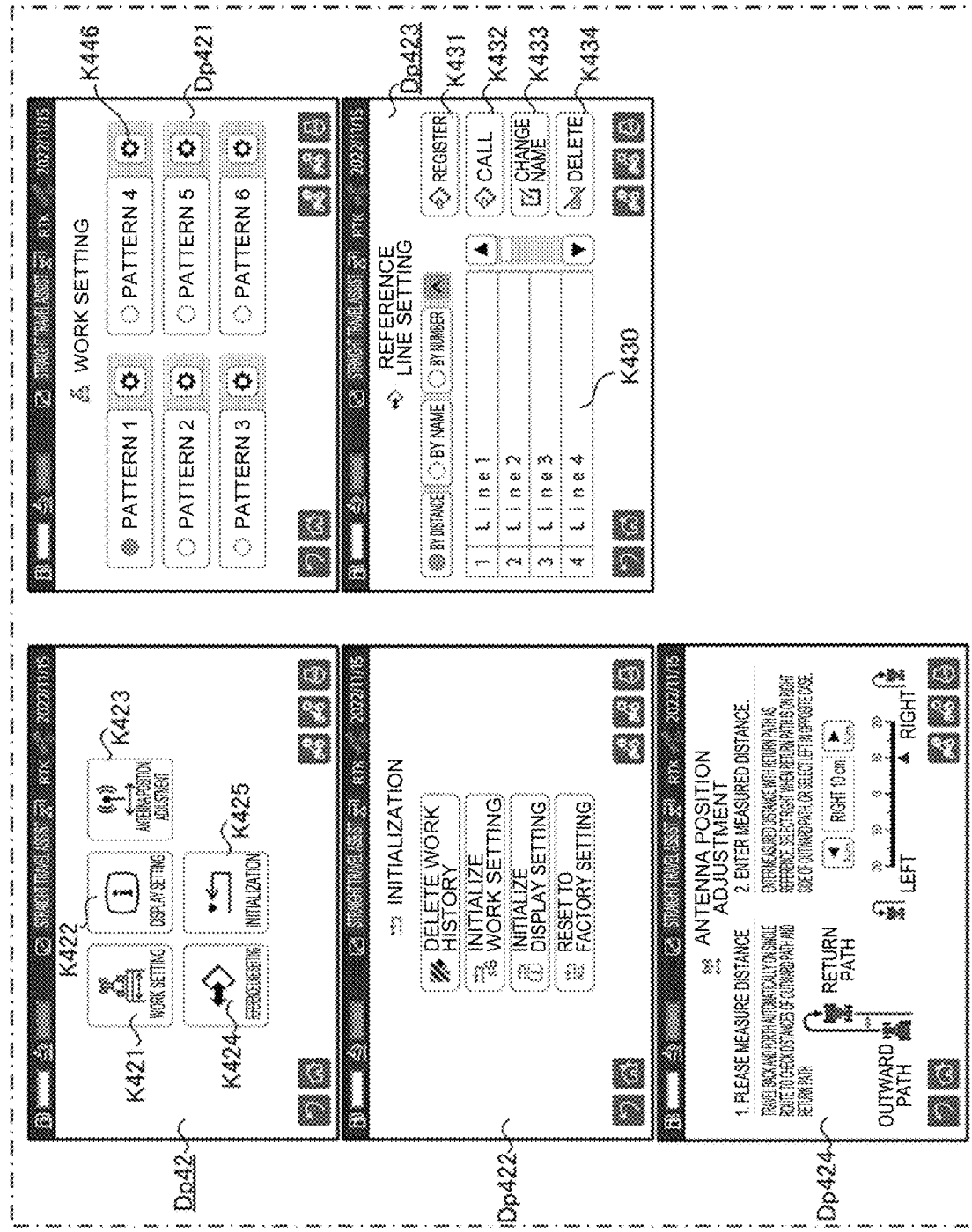
FIG. 35 includes views, each of which illustrates an example of the display screen displayed on the operation terminal by the operation control method according to the first embodiment of the present invention.

FIG. 35 illustrates an example of a straight travel assist setting screen Dp42, to which the guidance screen Dp4 can be shifted, and display screens, to which the straight travel assist setting screen Dp42 can further be shifted. A straight travel assist setting screen Dp42 is a display screen for making various settings on the straight travel assist, and is displayed when a setting icon K42 (see FIG. 23) is operated on the guidance screen Dp4. The setting icon K42 corresponds to the setting icon K2 (see FIG. 12) in the basic configuration. A plurality of setting icons K421 to K425 is displayed on the straight travel assist setting screen Dp42.

A work setting screen Dp421 is a display screen for making settings on the work implement 14 related to the straight travel assist, and is displayed when the setting icon K421 associated with the work settings is operated on the straight travel assist setting screen Dp42. An initialization screen Dp422 is a display screen for initializing the setting values for the straight travel assist, and is displayed when the setting icon K425 associated with the initialization setting is operated on the straight travel assist setting screen Dp42.

A reference line setting screen Dp423 is a display screen for setting a reference line used for the straight travel assist, and is displayed when the setting icon K424 associated with the reference line setting is operated on the straight travel assist setting screen Dp42. An antenna setting screen Dp424 is a display screen for making a setting on antenna position adjustment, and is displayed when the setting icon K423 associated with the antenna position adjustment is operated on the straight travel assist setting screen Dp42.

By the way, the reference line setting screen Dp423 has a screen configuration in which a display list of a plurality of the reference lines and processing for the reference lines are integrated into one screen. More specifically, the reference line setting screen Dp423 includes: a reference line list K430 that displays a list of the plurality of the reference lines, such as "Line1", "Line2", . . . ; and a plurality of instruction keys K431 to K434. In the reference line list K430, any desired one of the plural reference lines can be selected. Then, in a state where any one of the reference lines is selected in the reference line list K430, it is possible to execute the processing that is instructed by any of the instruction keys K431 to K434 on the reference line.

For example, when the operator presses the instruction key K432 of "CALL" in a state where "Line 2" is selected in the reference line list K430, "Line 2" can be called. Meanwhile, when the operator presses the instruction key K431 of "REGISTER" in a state where "Line 4" is selected in the reference line list K430, a new reference line can be registered by updating "Line 4". The instruction key K433 is a key for instructing a name change of the reference line, and the instruction key K434 is a key for instructing deletion of the reference line.

The screen configuration in which the display list of the plural pieces of data and the processing for the data are integrated into one screen can be applied to an element other than the reference line. For example, in the case where data on a plurality of fields is registered, a display list of these plural fields and processing for the fields may be integrated into one screen.

Figure 36:
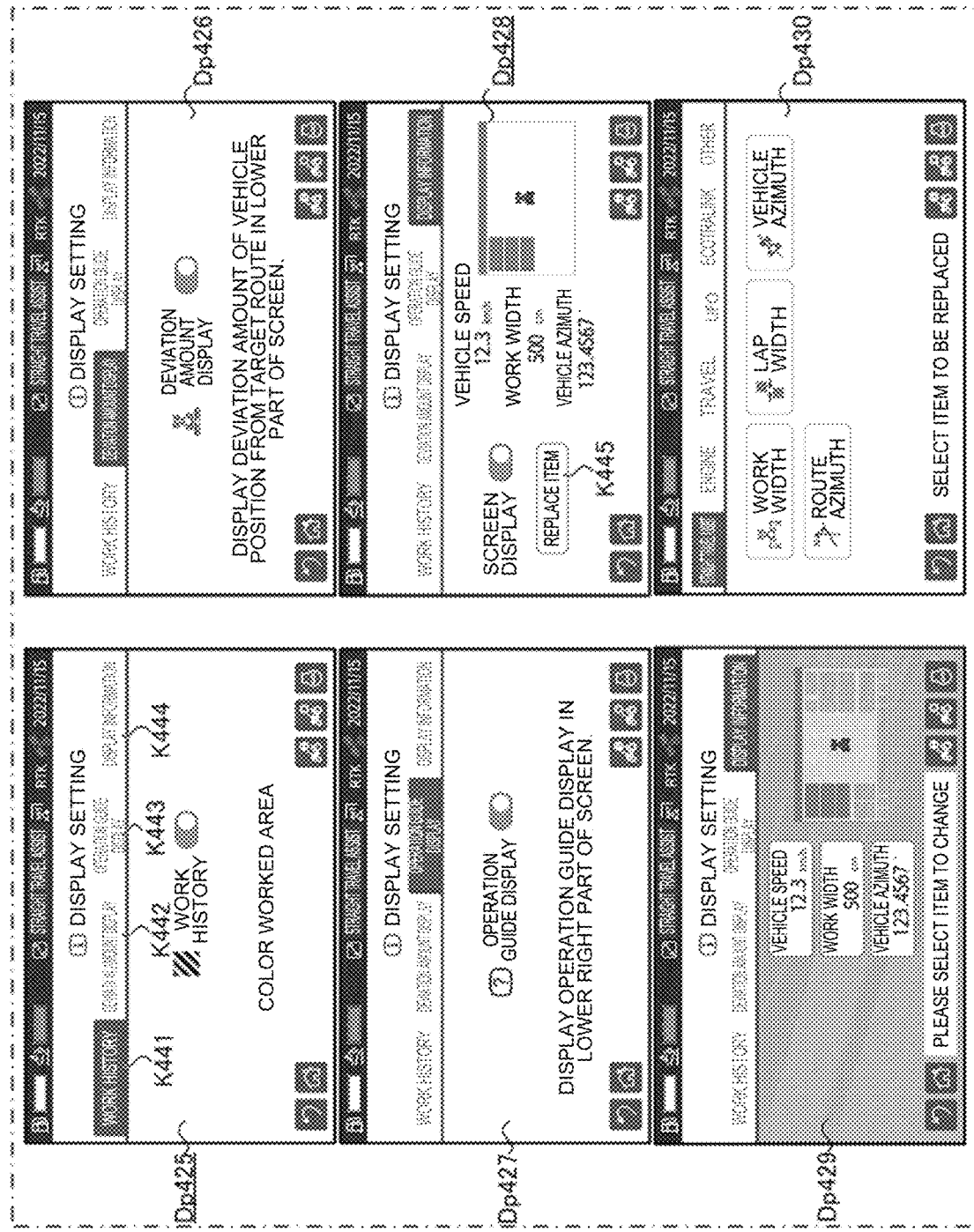
FIG. 36 includes views, each of which illustrates an example of the display screen displayed on the operation terminal by the operation control method according to the first embodiment of the present invention.

FIG. 36 illustrates an example of display screens, to which the straight travel assist setting screen Dp42 can be shifted. Each of display setting screens Dp425 to Dp428 is a display screen for making a display setting on the straight travel assist, and is displayed when the setting icon K422 associated with the display setting is operated on the straight travel assist setting screen Dp42.

Each of the display setting screens Dp425 to Dp428 includes four tabs K441 to K444, and the display setting screens Dp425 to Dp428 are switched by a selection operation of the tabs K441 to K444. That is, when the tab K441 of "WORK HISTORY" is operated, the display setting screen Dp425 for setting whether to color a worked area is displayed. When the tab K442 of "DEVIATION AMOUNT DISPLAY" is operated, the display setting screen Dp426 for setting whether to display the deviation amount between the target route and the position of the work machine 10 is displayed. When the tab K443 of "OPERATION GUIDE DISPLAY" is operated, the display setting screen Dp427 for setting whether to display the operation guidance on the screen is displayed. When the tab K444 of "DISPLAY INFORMATION" is operated, the display setting screen Dp428 for setting information to be displayed on the guidance screen Dp4 is displayed.

Furthermore, when an item replacement key K445 is operated on the display setting screen Dp428, the display screen is shifted to a customization screen Dp429. When any desired item to be changed is selected on the customization screen Dp429, the customization screen Dp429 is shifted to a customization screen Dp430. On the customization screen Dp430, when an item to be replaced with the item to be changed, which is selected in the customization screen Dp429, is selected, the item is replaced.

Figure 37:
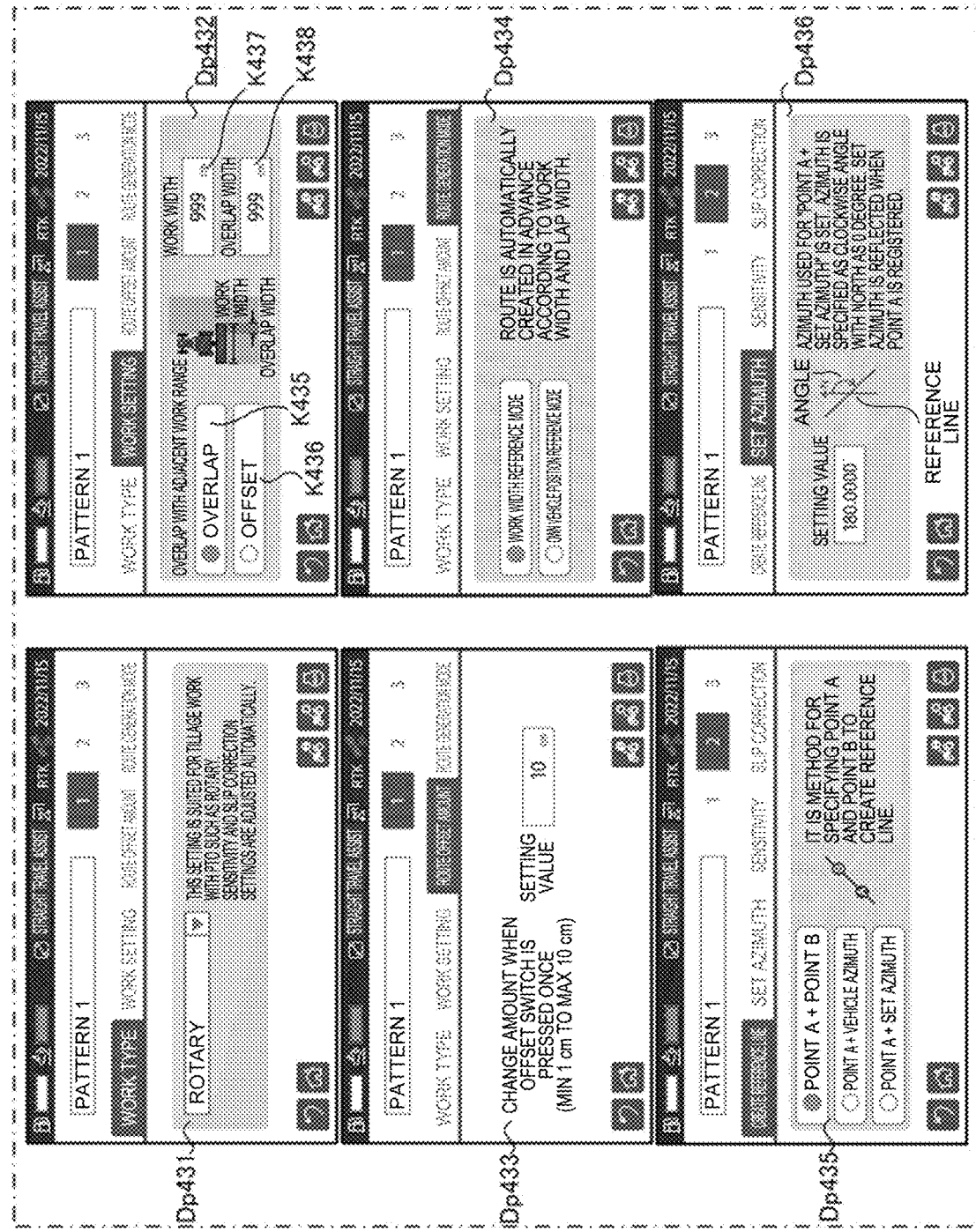
FIG. 37 includes views, each of which illustrates an example of the display screen displayed on the operation terminal by the operation control method according to the first embodiment of the present invention.
Figure 38:
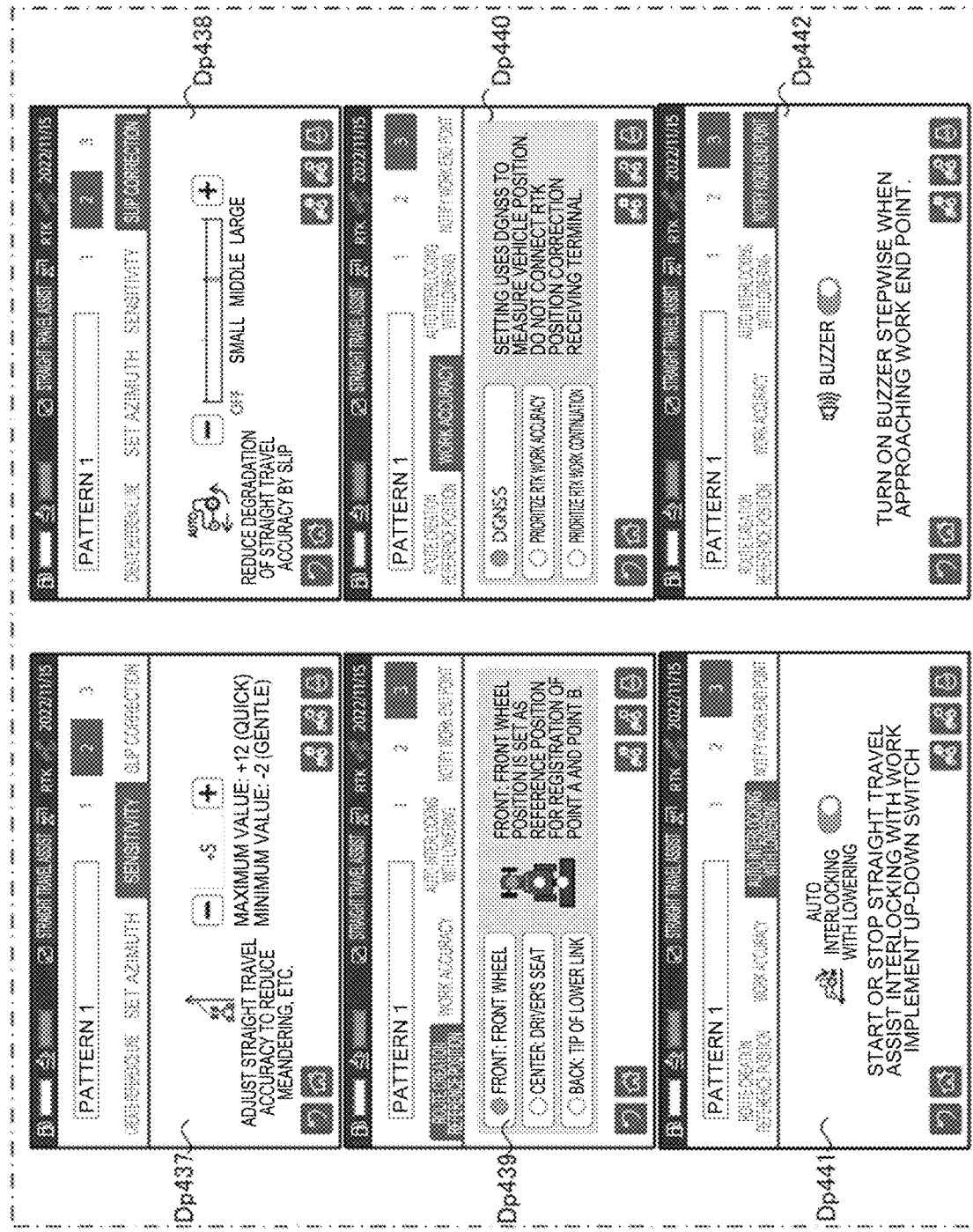
FIG. 38 includes views, each of which illustrates an example of the display screen displayed on the operation terminal by the operation control method according to the first embodiment of the present invention.

FIGS. 37 and 38 illustrate an example of display screens, to which the work setting screen Dp421 can be shifted. Each of detail setting screens Dp431 to Dp442 is a display screen for setting the details of the work to be performed by the work implement 14, and is displayed when a gear icon K446 (see FIG. 35) associated with each work pattern is operated on the work setting screen Dp421.

Each of the detail setting screens Dp431 to Dp442 includes a plurality (12 herein) of tabs, and the detail setting screens Dp431 to Dp442 are switched by a tab selection operation. Furthermore, not all of the plural tabs are displayed on the same screen, but all the tabs are displayed by page switching.

By the way, the detail setting screen Dp432 has a screen configuration in which the setting of the width (work width) of the work implement 14 and the setting of the width (lap width) in which the adjacent work areas overlap each other in the straight travel assist are integrated into one screen. In other words, the detail setting screen Dp432 includes an overlap button K435 and an offset button K436. In a state where the overlap button K435 is selected, on the detail setting screen Dp432, as illustrated in FIG. 37, the work width is input to a work width input field K437, the lap width is input to a lap width input field K438, and the lap width is thereby defined. That is, when the work width and the lap width are designated, the offset amount of the work implement 14 is also determined naturally, and thus the offset amount does not have to be input. Here, when the work width input field K437 or the lap width input field K438 is pressed, a numeric keypad for inputting the work width or the lap width is popped up and displayed.

Next, a description will be made on other shiftable display screens.

Figure 39:
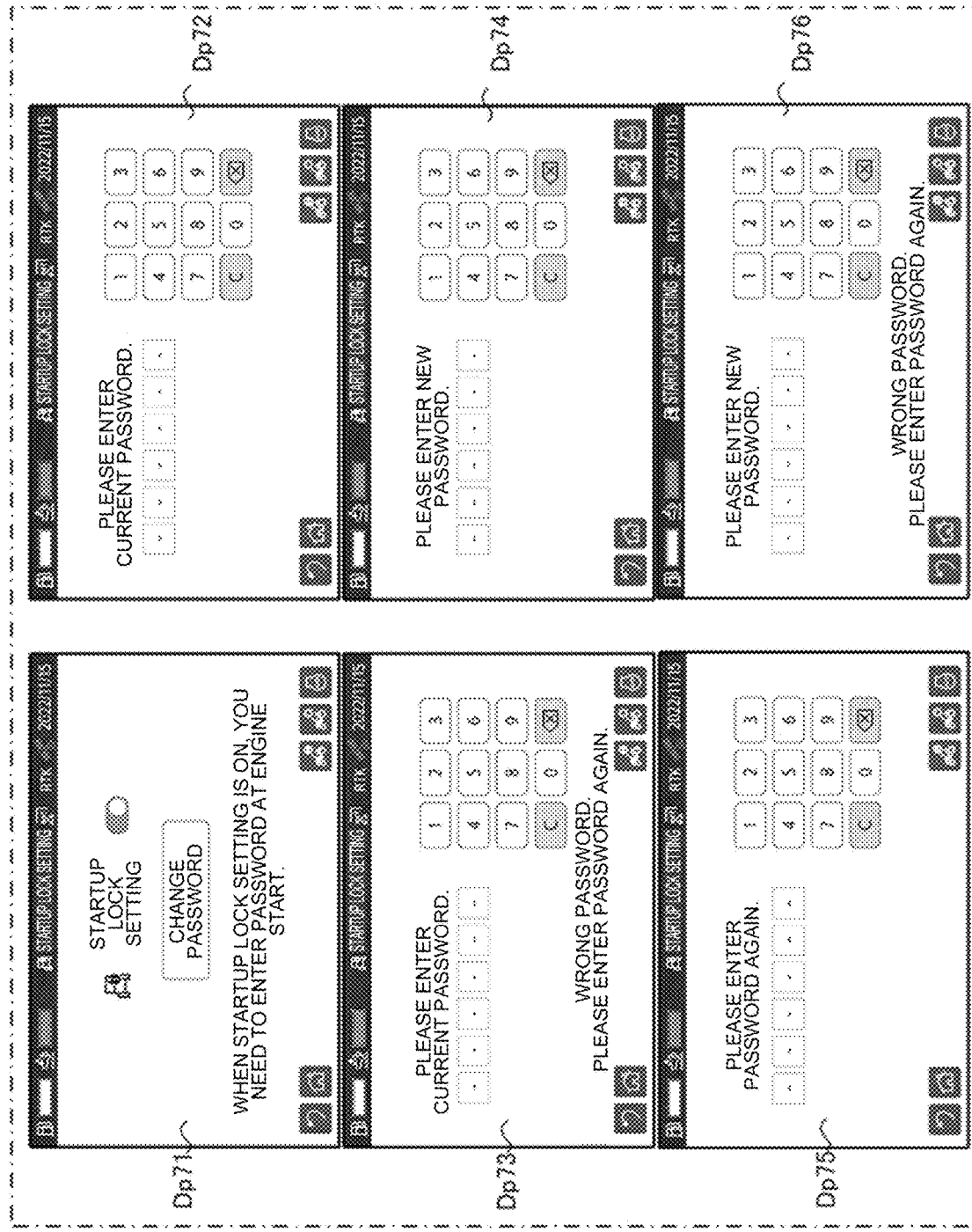
FIG. 39 includes views, each of which illustrates an example of the display screen displayed on the operation terminal by the operation control method according to the first embodiment of the present invention.

FIG. 39 illustrates an example of startup lock setting screens Dp71 to Dp76. On the startup lock setting screens Dp71 to Dp76, the password for canceling the startup lock can be changed. More specifically, when an operation to start the password change is accepted on the startup lock setting screen Dp71, the entry of the current password is requested on the startup lock setting screen Dp72. In the case where the entered current password is incorrect, the startup lock setting screen Dp72 is shifted to the startup lock setting screen Dp73, and the entry of the current password is requested again. In the case where the entered current password is correct, the startup lock setting screen Dp72 is shifted to the startup lock setting screen Dp74, and entry of a password to be newly set is requested. Furthermore, the startup lock setting screen Dp74 is shifted to the startup lock setting screen Dp75, and the entry of the password to be newly set is requested again. At this time, in the case where the password that has been entered again is incorrect, the startup lock setting screen Dp75 is shifted to the startup lock setting screen Dp76, and the entry of the password to be newly set is requested again.

Figure 40:
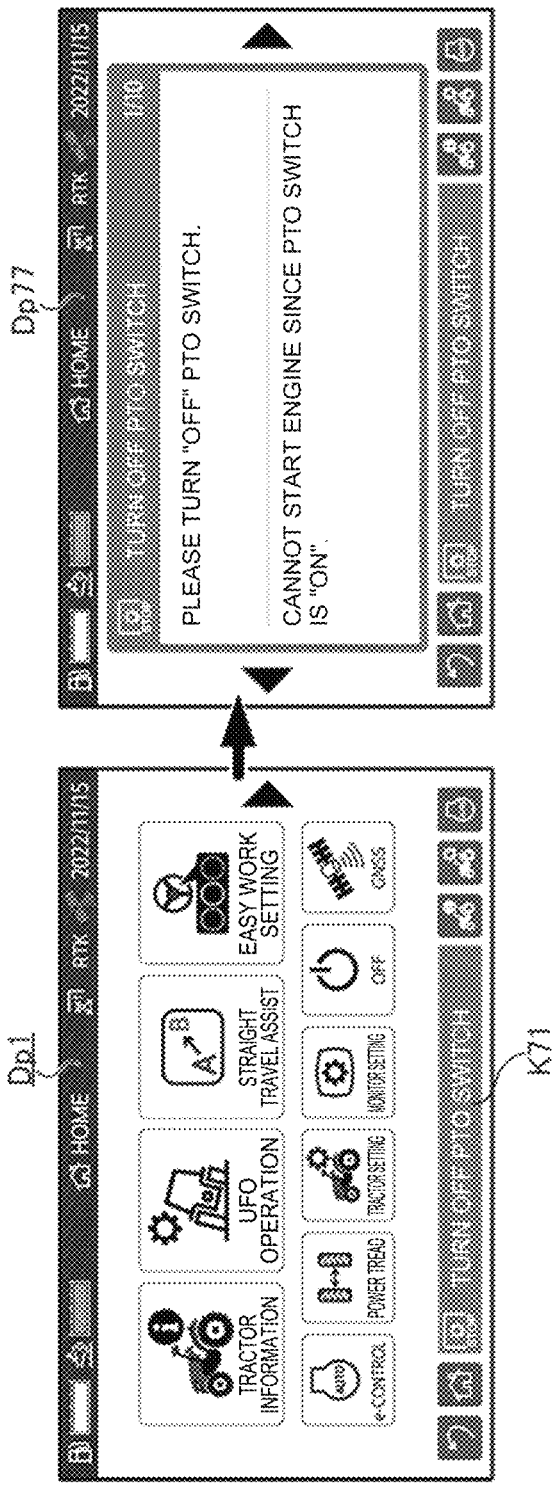
FIG. 40 includes views, each of which illustrates an example of the control method according to the first embodiment of the present invention.

FIG. 40 illustrates an example of the screen shift at the time when a warning or an error occurs. More specifically, for example, when a warning or an error occurs to the work machine 10 during the display of the home screen Dp1, first, as illustrated on the left side of FIG. 40, an error message K71 is displayed in the lower portion of the home screen Dp1. The error message K71 only indicates a message with a high priority. When the error message K71 is pressed in this state, the home screen Dp1 is shifted to a warning screen Dp77 as illustrated on the right side of FIG. 40. The warning screen Dp77 is a display screen on which all the messages related to the currently occurring warnings or errors can be checked. A background color of the warning screen Dp77 is preferably changed in accordance with the content of the message.

Figure 41:
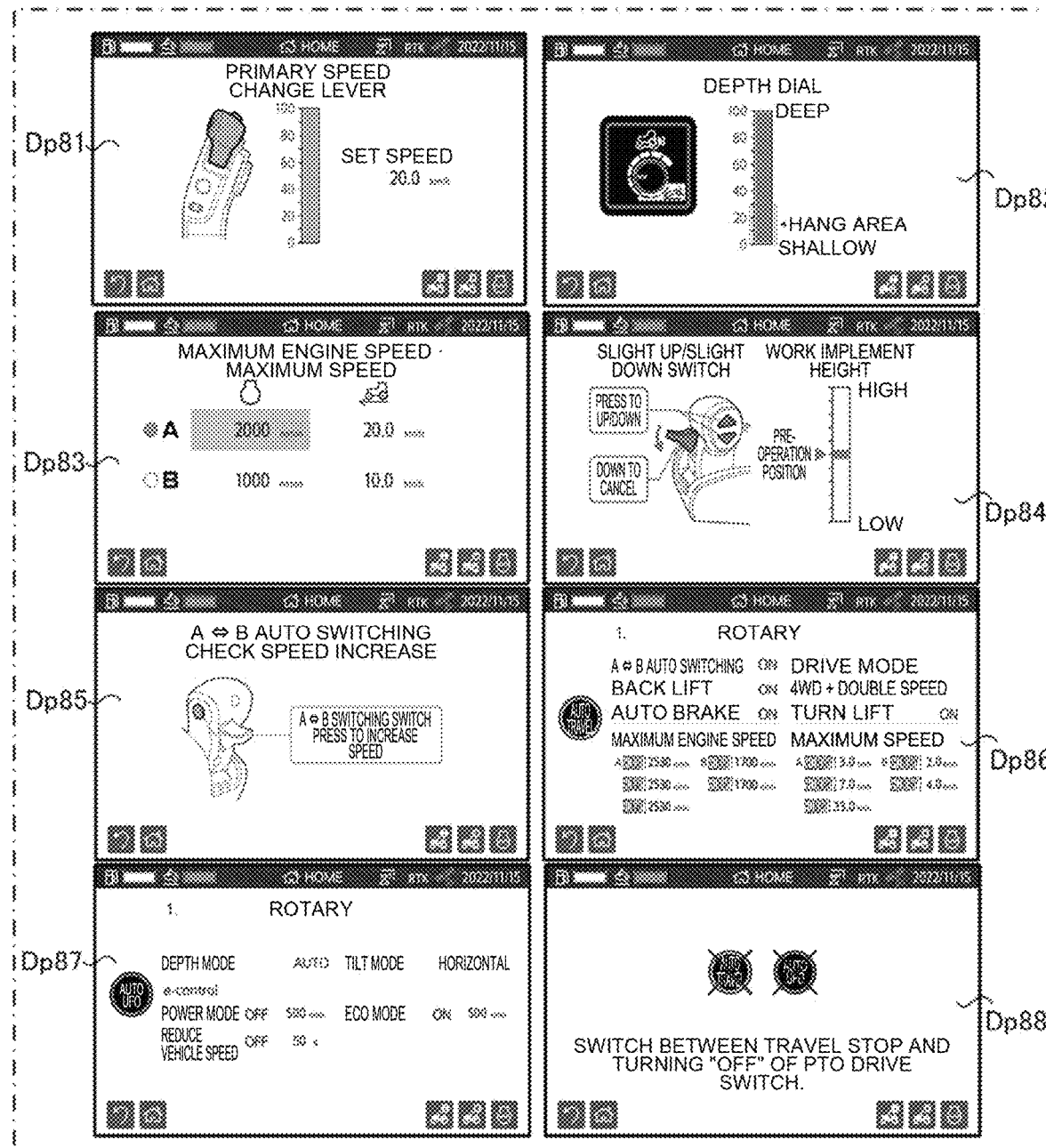
FIG. 41 includes views, each of which illustrates an example of the display screen displayed on the operation terminal by the operation control method according to the first embodiment of the present invention.

FIG. 41 illustrates an example of interrupt screens Dp81 to Dp88. The interrupt screen Dp81 is a display screen related to the set speed by the primary speed change lever 181. The interrupt screen Dp82 is a display screen related to the depth dial. The interrupt screen Dp83 is a display screen related to the maximum engine speed and the maximum vehicle speed. The interrupt screen Dp84 is a display screen related to the height adjustment of the work implement 14. The interrupt screen Dp85 is a display screen related to a speed increase check. The interrupt screen Dp86 is a display screen related to an automatic travel switch. The interrupt screen Dp87 is a display screen related to a UFO automatic switch. The interrupt screen Dp88 is a display screen related to automatic switch prohibition.

As it has been described so far, since the tab division is adopted for the display screens such as the detail setting screens Dp211 to Dp213, it is possible to suppress the amount of the information to be displayed per screen and to enhance visibility of each piece of the information. Furthermore, by appropriately displaying the pull-down list, the text box, the numeric keypad, and the like, it is possible to assist the operator with input of the option, the text, the number, and the like.

[2.3] Acceleration Adjustment Function

Next, a description will be made on the settings that are related to the speed change feeling (acceleration) of the travel system 13 and made on the travel setting screen Dp31 with reference to FIGS. 42 to 45.

In other words, in the present embodiment, as described above, it is possible to make the settings on the speed change feeling (acceleration) of the travel system 13 on the travel setting screen Dp31. More specifically, when the operator performs an operation to designate the acceleration (speed change feeling) on the travel setting screen Dp31, the acceleration adjustment processing unit 112 performs the acceleration adjustment so as to obtain the designated acceleration.

Figure 42:
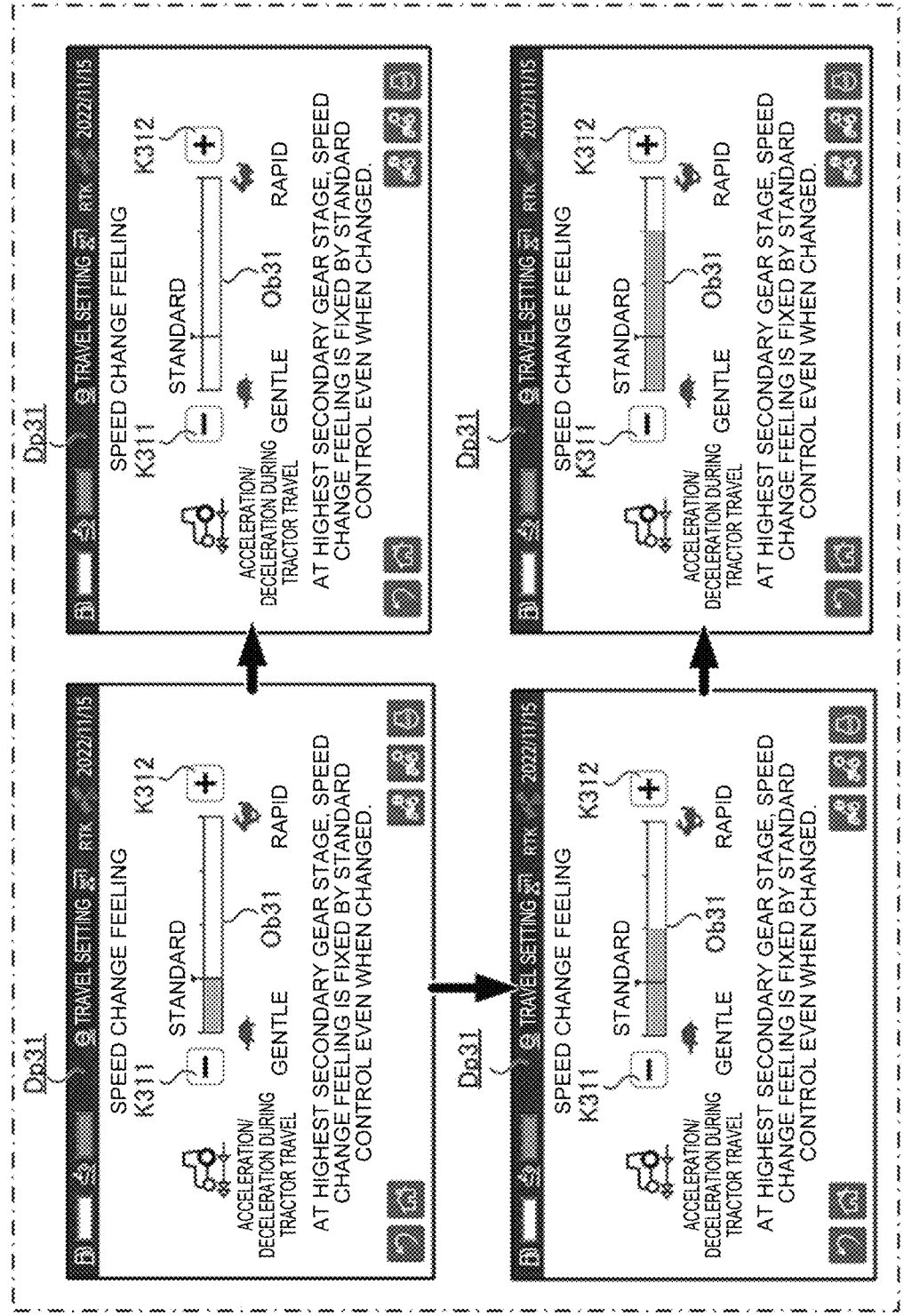
FIG. 42 includes views, each of which illustrates an example of the display screen displayed on the operation terminal by the operation control method according to the first embodiment of the present invention.

FIG. 42 illustrates details of the travel setting screen Dp31. The travel setting screen Dp31 includes a minus key K311, a plus key K312, and an acceleration object Ob31. The acceleration object Ob31 is a bar graph representing the currently set acceleration and, as an example, indicates that an absolute value of the acceleration is increased as the graph extends (to the right). Furthermore, standard acceleration is indicated as a guide in the acceleration object Ob31.

When the operator presses the minus key K311 on the travel setting screen Dp31, the acceleration indicated by the acceleration object Ob31 is reduced as illustrated in the upper right of FIG. 42. Meanwhile, when the operator presses the plus key K312 on the travel setting screen Dp31, the acceleration indicated by the acceleration object Ob31 is increased as illustrated in the lower left of FIG. 42. Then, when the operator further presses the plus key K312, the acceleration indicated by the object Ob31 is further increased as illustrated in the lower right of FIG. 42. In the present embodiment, as an example, the acceleration can be adjusted in steps (for example, five steps). However, the present invention is not limited to this example, and the acceleration may be adjusted in the stepless manner.

Figure 43:
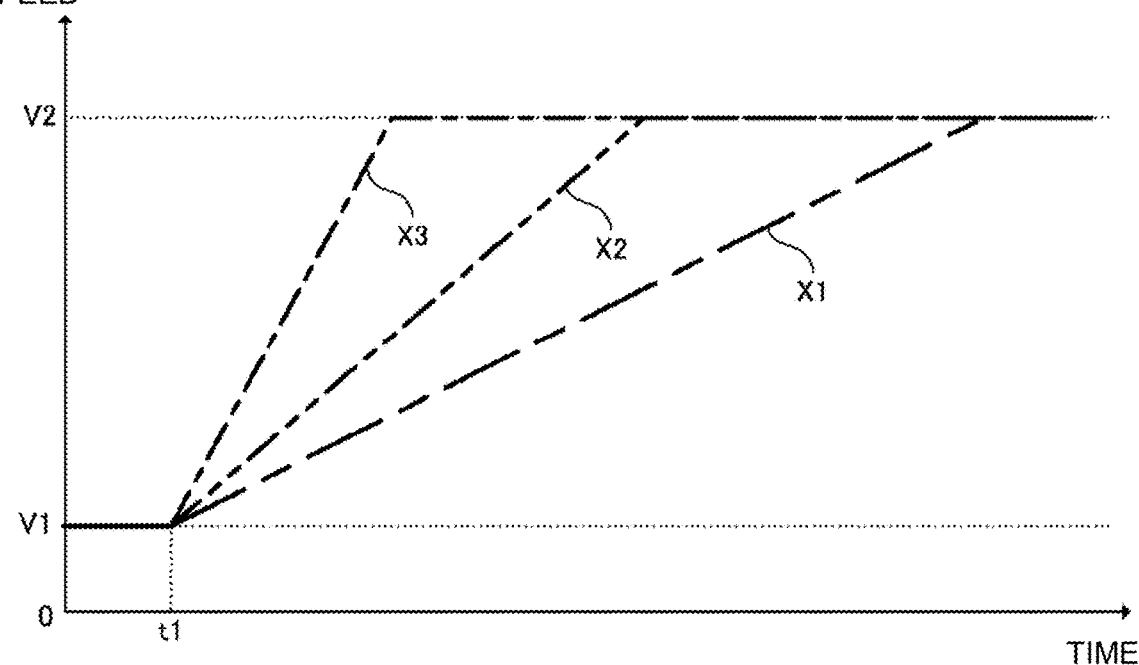
FIG. 43 is a graph illustrating an example of a vehicle speed that is controlled by the operation control method according to the first embodiment of the present invention.

When the acceleration is adjusted on the travel setting screen Dp31, the acceleration adjustment processing unit 112 adjusts, in accordance with the acceleration, the change rate (inclination) of the speed with respect to the time from the current speed to the target speed. That is, as illustrated in FIG. 43, the change rate of the speed from a current speed V1 to a target speed V2 (>V1) is determined by the adjusted acceleration. In FIG. 43, a horizontal axis represents time, and a vertical axis represents the travel speed (vehicle speed) of the work machine 10. FIG. 43 illustrates a speed change in the case where the target speed is switched from "V1" to "V2" at a time point t. In other words, in the example of FIG. 43, (an absolute value of) acceleration "X1" is the lowest, and (an absolute value of) acceleration "X3" is the highest. Thus, as the acceleration is increased, the time required to reach the target speed V2 from the current speed V1 is reduced, but the speed change shock becomes more significant. On the contrary, as the acceleration is reduced, the time required to reach the target speed V2 from the current speed V1 is increased, but the speed change shock becomes less significant.

By the way, in the operation control method according to the present embodiment, it is possible to at least adjust the acceleration (that is, the "negative acceleration") until the time at which the travel speed of the work machine 10 reaches the target vehicle speed during the speed reduction of the work machine 10 in accordance with the operation by the user (operator).

Thus, in the operation control method according to the present embodiment, for example, in the case where the forward travel and the backward travel of the work machine 10 are switched little by little, it is possible to suppress an impact from being applied to the work machine 10 during the speed reduction due to the sudden speed reduction of the work machine 10. In other words, when (the absolute value of) the negative acceleration is adjusted to be low, it is possible to gently reduce the speed of the work machine 10 during the speed reduction thereof, and it is thus easy to alleviate the impact applied to the work machine 10 during the speed reduction. As a result, such an advantage can be achieved that it is possible to avoid degradation of work accuracy of the work implement 14 and transmission of the shock to the operator during the speed reduction, which are caused by the impact applied to the work machine 10 during the speed reduction.

In the operation control method according to the present embodiment, it is also possible to adjust, in accordance with the operation by the user (operator), the acceleration (that is, the "positive acceleration") until the time at which the travel speed of the work machine 10 reaches the target vehicle speed during the speed increase of the work machine 10. Accordingly, for example, in the case where the forward travel and the backward travel of the work machine 10 are switched little by little, or the like, it is also possible to suppress the impact from being applied to the work machine 10 during the acceleration due to the sudden acceleration of the work machine 10. In other words, when (the absolute value of) the positive acceleration is adjusted to be low, it is possible to gently accelerate the work machine 10 during the acceleration, and it is also easy to alleviate the impact applied to the work machine 10 during the acceleration.

Here, the acceleration during the speed reduction and the acceleration during the speed increase are collectively adjusted. That is, the acceleration that is adjusted on the travel setting screen Dp31 is not divided into the acceleration during the speed reduction (negative acceleration) and the acceleration during the speed increase (positive acceleration), and the negative acceleration and the positive acceleration are collectively adjusted. As an example, when the acceleration is adjusted to the lowest level "0" on the travel setting screen Dp31, (the absolute value of) the acceleration becomes the lowest in the level "0" during both of the speed reduction and the speed increase. Accordingly, the speed change feeling during the speed reduction and the speed change feeling during the speed increase can match each other, which allows the operator to hardly have a sense of discomfort and thus to improve operability.

Figure 44:
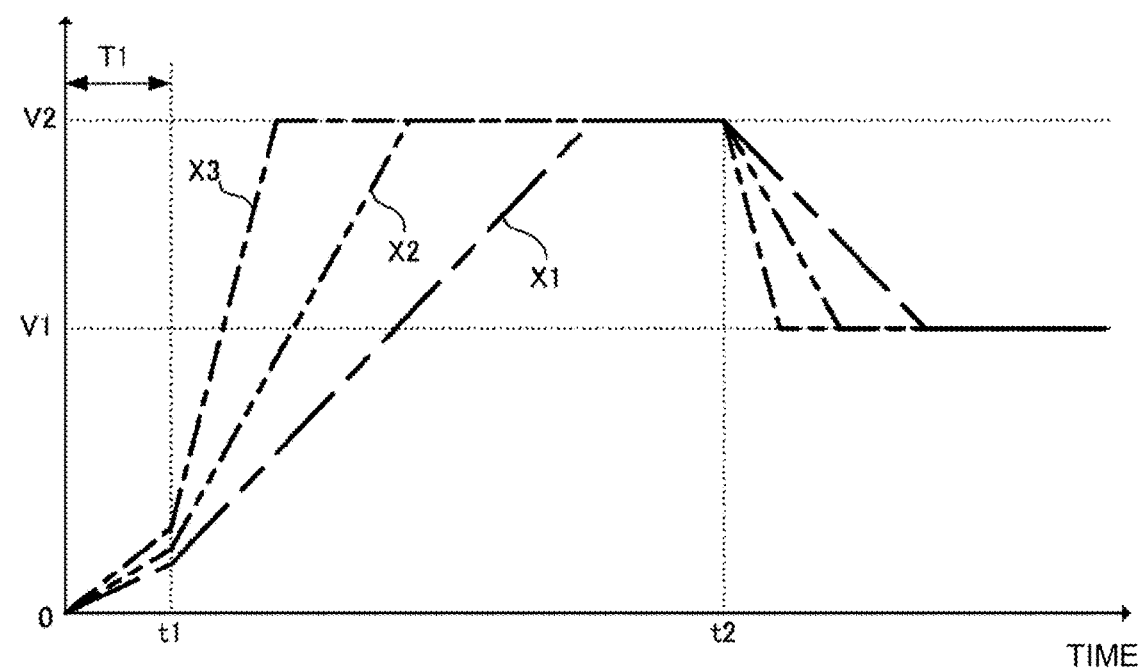
FIG. 44 is a graph illustrating an example of the vehicle speed that is controlled by the operation control method according to the first embodiment of the present invention.

Furthermore, the operation control method according to the present embodiment includes suppressing the acceleration in a start period T1, in which the speed of the work machine 10 is increased from the stopped state, to be lower than the acceleration other than that in the start period T1. That is, as illustrated in FIG. 44, in the start period T1 in which the work machine 10 is started from the stopped state with the vehicle speed being "0", the acceleration is suppressed to be lower than that during normal time. In FIG. 44, a horizontal axis represents time, and a vertical axis represents the travel speed (vehicle speed) of the work machine 10. FIG. 44 illustrates a speed change in the case where the target speed is switched from "V2" to "V1" (<V2) at a time point t2. In the example of FIG. 44, the acceleration is suppressed to be lower during in the start period t1 that is a certain period (for example, several hundred milliseconds) from the stopped state to the time point t1.

Accordingly, particularly, at the start from the stopped state where the impact is likely to be applied to the work machine 10, the acceleration is suppressed to be low, and an effect of alleviating the impact applied to the work machine 10 is enhanced. In addition, since the start period T1 is only provided, the delay time until the target speed is hardly noticeable to the operator, and is unlikely to lead to the reduction in the workability.

In detail, the operation control method according to the present embodiment further include setting the target speed in accordance with the operation of the first operation unit. When the target speed is changed in accordance with the operation of the first operation unit, the acceleration until the time at which the travel speed of the work machine 10 reaches the changed target speed is adjusted in accordance with the user's operation. The "first operation unit" described herein includes at least one of the primary speed change lever 181, the secondary speed change lever 182, and the reverser lever 183. That is, even when the user (operator) operates the first operation unit, such as the primary speed change lever 181, without being particularly aware of the first operation unit, the adjusted acceleration is applied to the actual change in the travel speed of the work machine 10. This leads to the improvement in the operability.

The operation control method according to the present embodiment further includes reducing the target speed in accordance with the operation of the second operation unit, which differs from the first operation unit. Then, when the target speed is reduced in accordance with the operation of the second operation unit, the acceleration until the time at which the travel speed of the work machine 10 reaches the reduced target speed is adjusted in accordance with the user's operation. The "second operation unit" described herein includes at least one of the brake pedal 185 and the clutch pedal 186. That is, the adjusted acceleration is applied not only when the user (operator) operates the first operation unit, such as the primary speed change lever 181, to reduce the target speed, but also when the user operates the second operation unit, such as the brake pedal 185. This leads to the improvement in the operability.

The work machine 10 further includes the auxiliary transmission capable of switching the speed range of the work machine 10 among the plurality of speed ranges. Here, the acceleration can only be adjusted in accordance with the user's operation only when the speed of the work machine 10 falls within a part of the plural speed ranges. That is, the adjusted acceleration is applied only when the speed range of the auxiliary transmission is the specific speed range. Thus, the adjusted acceleration is not applied when the speed range of the auxiliary transmission is the speed range other than the above. As an example, it is assumed that the acceleration can be adjusted in accordance with the user's operation only when the speed range of the auxiliary transmission is the "C stage" or the "first speed", which is used for the work such as the tillage work, in accordance with the operation of the secondary speed change lever 182. That is, when the speed range of the auxiliary transmission is the "second speed", the fixedly determined acceleration is applied instead of the value adjusted by the operator. However, this case does not apply to the start period T1.

With this configuration, the acceleration can be adjusted only in a certain situation such as the speed range for the work, for example. Thus, this leads to the improvement in the operability of the work machine 10.

However, the "part of the plural speed ranges" to which the adjusted acceleration is applied are not limited to the "C stage" and the "first speed" for the work, but may be any one or two of the speed ranges including the "C stage", the "first speed", and the "second speed". For example, the "part of the plural speed ranges" to which the adjusted acceleration may be the "second speed" for the travel (on a road or the like). In this case, the acceleration can be adjusted in accordance with the user's operation only when the speed range of the auxiliary transmission is the "second speed" in accordance with the operation of the secondary speed change lever 182.

In the present embodiment, the acceleration can be adjusted in accordance with the user's operation even when the work machine 10 is moving. That is, the travel setting screen Dp31 can be displayed even when the work machine 10 is moving (traveling), and the acceleration can be adjusted on the travel setting screen Dp31 during movement of the work machine 10. In this way, there is no need to stop the work machine 10 for adjusting the acceleration, and it is thus possible to suppress the reduction in the work efficiency.

Here, the operation control method according to the present embodiment includes displaying the travel setting screen Dp31 for adjusting the acceleration as described above. The acceleration can be adjusted in accordance with the user's operation on the acceleration operation unit that is included in the travel setting screen Dp31. The "acceleration operation unit" described herein includes the minus key K311 and the plus key K312, for example. That is, the user (operator) can adjust the acceleration on the display screen, which facilitates the adjustment of the parameter, that is, the acceleration that cannot visually be recognized in a normal situation.

In the present embodiment, the operation control method according to the present embodiment further includes causing the work machine 10 to autonomously travel. The adjustment of the acceleration is disabled during the autonomous travel of the work machine 10. That is, the acceleration adjusted by the operator is not applied during the autonomous travel in which at least the vehicle speed and the like are automatically controlled. The acceleration adjusted by the operator is applied only during the manual travel or the semi-automatic travel in which the vehicle speed and the like are controlled by the operator. For this reason, the acceleration adjusted by the operator is less likely to affect the work efficiency during the autonomous travel.

Figure 45:
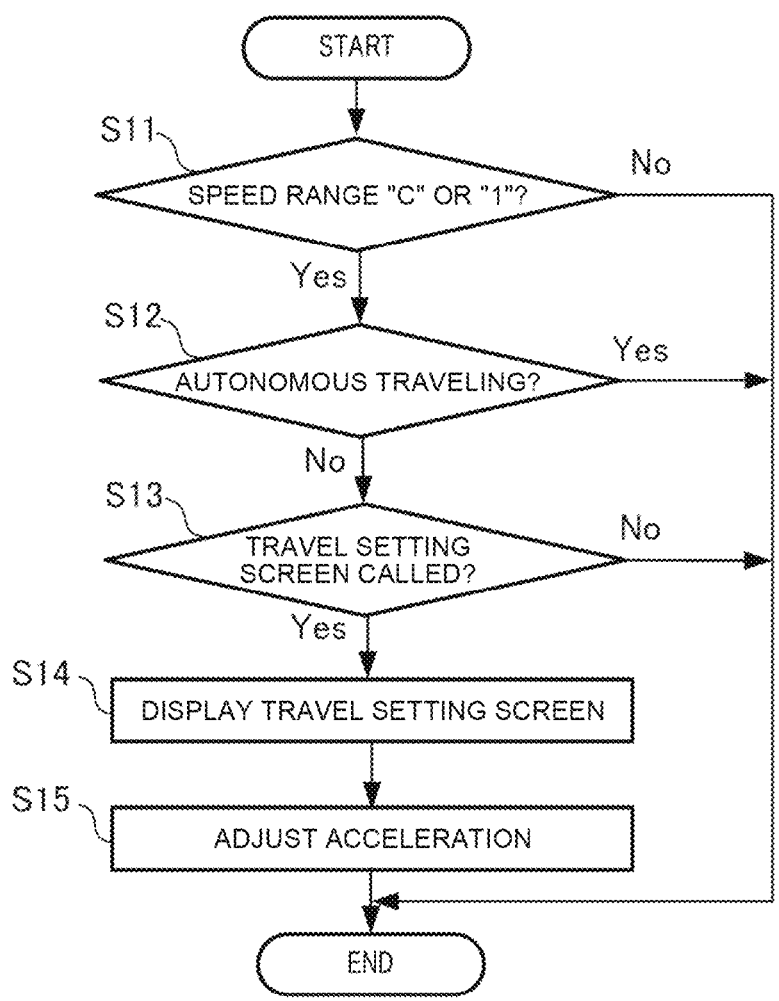
FIG. 45 is a flowchart illustrating an example of a procedure for operation control processing that is executed by the work machine according to the first embodiment of the present invention.

FIG. 45 is a flowchart illustrating an example of processing related to the acceleration adjustment in the operation control method according to the present embodiment.

More specifically, the acceleration adjustment processing unit 112 checks whether the speed range of the auxiliary transmission is the "C stage" or the "first speed" (S11). If the speed range of the auxiliary transmission is the "C stage" or the "first speed" (S11: Yes), the acceleration adjustment processing unit 112 checks whether the work machine 10 is autonomously traveling (S12). If the work machine 10 is not autonomously traveling (S12: No), the acceleration adjustment processing unit 112 determines whether the travel setting screen Dp31 has been called (S13). If the travel setting screen Dp31 has been called (S13: Yes), the display processing unit 711 displays the travel setting screen Dp31 on the operation display unit 73 (S14). Then, the acceleration adjustment processing unit 112 adjusts the positive or negative acceleration in accordance with the operation by the user (operator) on the travel setting screen Dp31 (S15).

The automatic travel system 100A repeatedly executes the processing in above steps S11 to S15. However, the flowchart illustrated in FIG. 45 is merely one example, and the processing may appropriately be added or omitted, or the order of the processing may appropriately be changed.

[2.4] Guidance Screen Dp4

Next, a description will be made on the guidance screen Dp4 related to the straight travel assist with reference to FIGS. 46 to 49.

Figure 46:
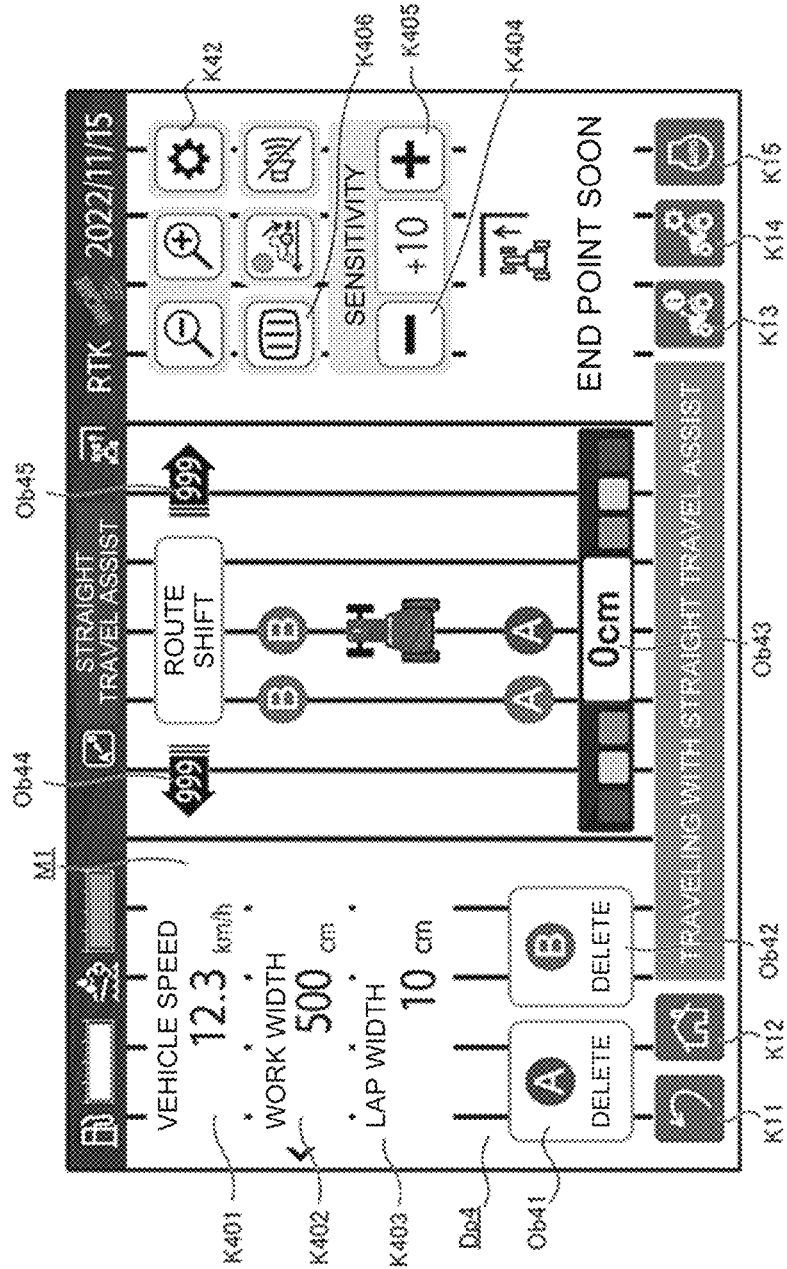
FIG. 46 is a view illustrating an example of the display screen that is displayed on the operation terminal by the operation control method according to the first embodiment of the present invention.

As illustrated in FIG. 46, a map M1 including the target route (the reference line and the plurality of straight lines parallel to the reference line) and objects such as various icons superimposed on the map M1 are displayed on the guidance screen Dp4. The map M1 is displayed in such a manner that the current position of the work machine 10 is located at a center of the guidance screen Dp4 in a lateral direction (left-right direction).

The objects that are superimposed and displayed on the map M1 include a first operation object Ob41, a second operation object Ob42, an offset guide object Ob43, and hidden route objects Ob44, Ob45. The objects that are superimposed and displayed on the map M1 further include information icons K401 to K403, a minus key K404, a plus key K405, a viewpoint switching icon K406, and the like.

In the information icons K401 to K403, information associated with the work by the work machine 10, such as the (current) vehicle speed, the work width, and the lap width, is displayed. The minus key K404 and the plus key K405 are used for the operation to adjust the sensitivity of the straight travel assist, that is, how strictly the automatic steering is performed along the target route. That is, the user (operator) can reduce the sensitivity by operating the minus key K404 or increase the sensitivity by operating the plus key K405 on the guidance screen Dp4. The viewpoint switching icon K406 is an icon for switching between displaying the map M1 with the orientation of the reference line L1 being a reference and displaying the map M1 with the orientation of the work machine 10 being a reference. That is, every time the user (operator) operates the viewpoint switching icon K406, a viewpoint of the map M1 is switched.

Figure 47:
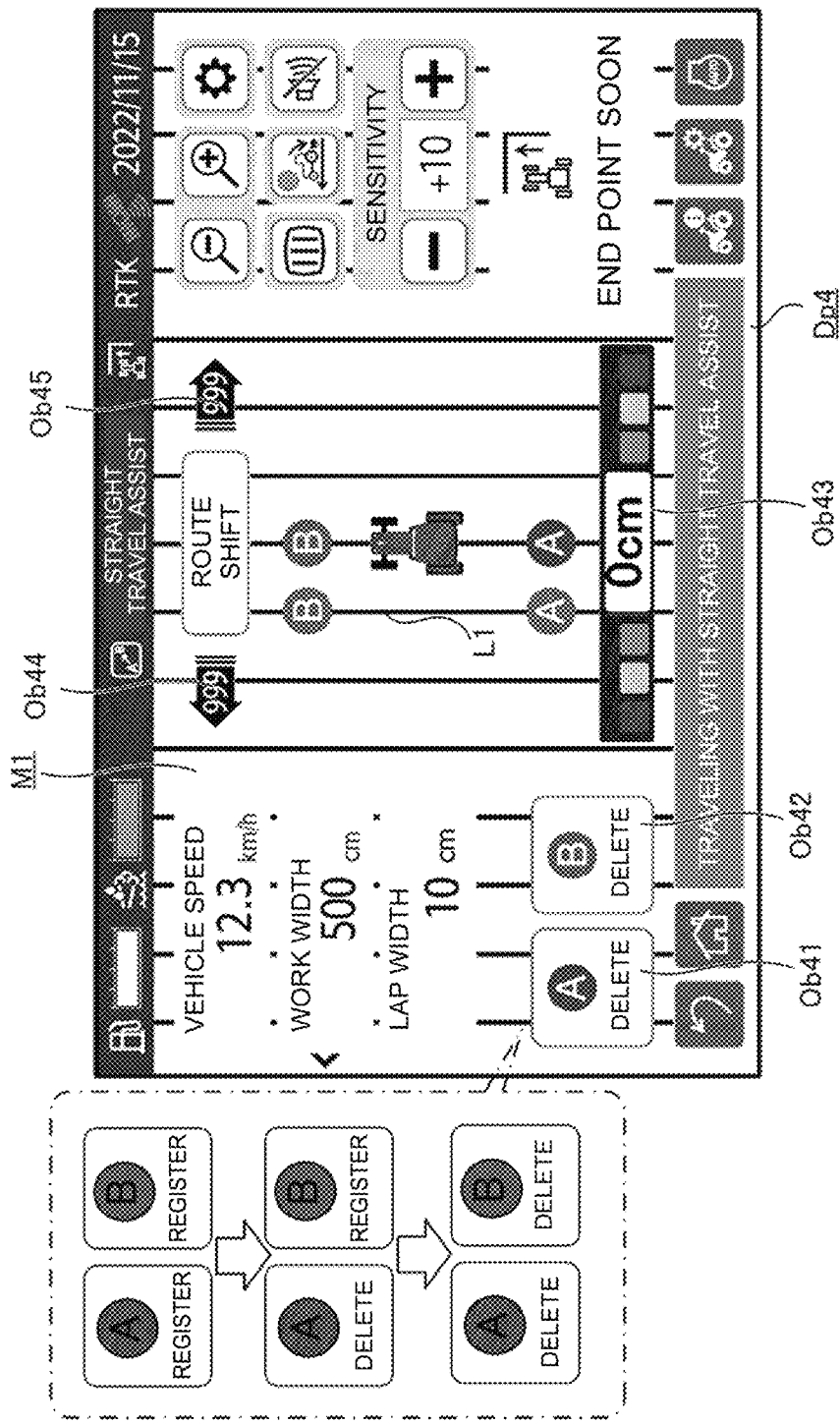
FIG. 47 is a view illustrating an example of the display screen that is displayed on the operation terminal by the operation control method according to the first embodiment of the present invention.

As illustrated in FIG. 47, the first operation object Ob41 and the second operation object Ob42 are objects that are operated by the user (operator) at the time of generating or editing the reference line L1. More specifically, the first operation object Ob41 is used to register or delete the point A (first reference point), and the second operation object Ob42 is used to register or delete the point B (second reference point).

More specifically, the points A, B that are registered at the time of generating the reference line L1 are displayed in gray on the map M1 while the points A, B on the target route (straight route) during the travel are displayed in color. Here, colors of the points A, B that are displayed in color are preferably different from each other. That is, when the points A, B that are displayed in gray are registered, the reference line L1 is generated in a manner to connect these points A, B.

Here, in regard to the point A that has been registered (that is, displayed in gray), the first operation object Ob41 allows an operation to delete the point A. In regard to the unregistered point A, the first operation object Ob41 allows an operation to register the point A. Similarly, in regard to the point B that has been registered (that is, displayed in gray), the second operation object Ob42 allows an operation to delete the point B. In regard to the unregistered point B, the second operation object Ob42 allows an operation to register the point B. In short, the functions assigned to the first operation object Ob41 and the second operation object Ob42 are switched in accordance with a target route generation status.

Furthermore, for example, it is determined that the point B is registered at a position away from the point A by a predetermined distance or more. Thus, even in the case where the point B is not registered, the point B cannot be registered when the work machine 10 is located at a position, a distance to which from the registered point A is less than the predetermined distance. In short, the functions assigned to the first operation object Ob41 and the second operation object Ob42 are also switched in accordance with an action status of the work machine 10.

Just as described, the first display screen (the guidance screen Dp4) includes the operation objects (the first operation object Ob41 and the second operation object Ob42), each of which accepts the user's operation related to the generation of the target route R for the automatic steering. In addition, the functions assigned to the operation objects are switched in accordance with at least one of the generation status of the target route R and the action status of the work machine 10.

In this way, the single first operation object Ob41 (or the second operation object Ob42) can have the plurality of the functions. Thus, compared to a case where an individual operation object is prepared for each function, the operation object can be enlarged in the display screen (guidance screen Dp4), and the operability is improved.

In the present embodiment, in particular, the plurality of the functions that can be assigned to the operation objects (the first operation object Ob41 and the second operation object Ob42) at least includes the function of the registration operation of the reference points (the point A and the point B) serving as the references of the target route R and the function of the deletion operation of such reference points.

Thus, when it is necessary to generate the reference line L1 as in the case of the straight travel assist, the target route R can be generated relatively easily by using the operation objects (the first operation object Ob41 and the second operation object Ob42).

Furthermore, in the present embodiment, as illustrated in FIG. 47, the display modes of the operation objects (the first operation object Ob41 and the second operation object Ob42) vary in accordance with the functions assigned to the operation objects. As an example, as illustrated in a balloon in FIG. 47, in a situation where both of the point A and the point B are not registered and can be registered, text notations of the first operation object Ob41 and the second operation object Ob42 are "REGISTER". Meanwhile, in a situation where the point A is registered and can be deleted, and the point B is unregistered and can be registered, the text notation of the first operation object Ob41 is "DELETE", and the text notation of the second operation object Ob42 is "REGISTER". In addition, in a situation where both of the point A and the point B are registered and can be deleted, the text notations of the first operation object Ob41 and the second operation object Ob42 are "DELETE".

Moreover, for example, in the case where the operation object does not accept an operation, such as a case where the point B is not registered and the work machine 10 is located at a position with a predetermined distance or shorter from the registered point A, the operation object is displayed in a gray-out (inactive) manner.

Since the display mode of each of the operation objects varies according to the function, just as described, the operability for the user (operator) is significantly improved.

Figure 48:
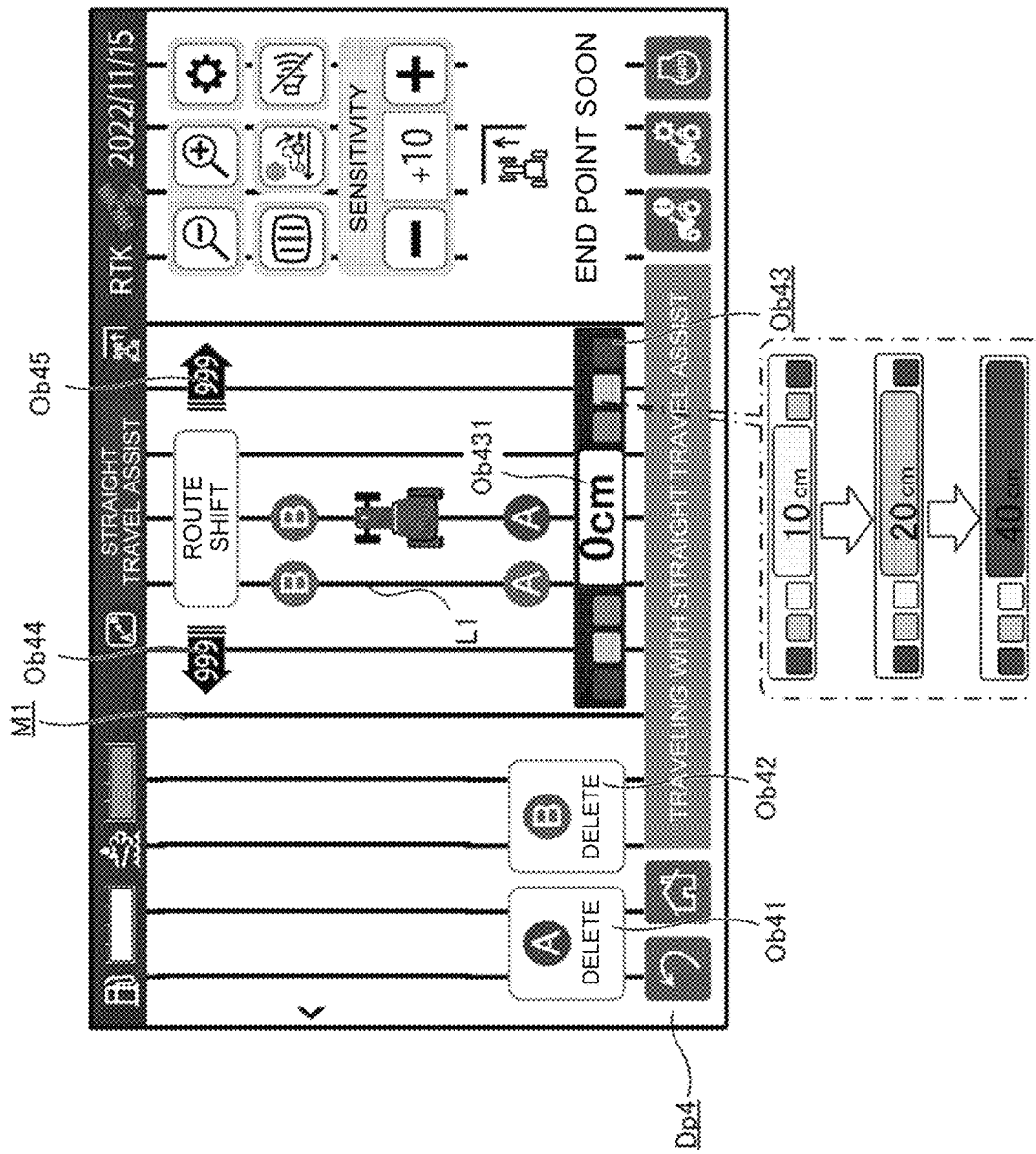
FIG. 48 is a view illustrating an example of the display screen that is displayed on the operation terminal by the operation control method according to the first embodiment of the present invention.

As illustrated in FIG. 48, the offset guide object Ob43 is an object representing an amount of the deviation (offset) of the work machine 10 from the target route. More specifically, as illustrated in a balloon of FIG. 48, the offset guide object Ob43 has a display mode in which an offset amount display frame Ob431 at a center thereof extends in an offset direction of the work machine 10 from the target route.

For example, the offset amount display frame Ob431 extends to the right when the work machine 10 is deviated to the right from the target route. In this way, the operator can easily and visually grasp the deviation from the target route. In particular, while the offset amount display frame Ob431 extends in accordance with the offset amount, a display color of the offset amount display frame Ob431 is changed depending on how far the offset amount display frame Ob431 extends. Thus, the operator can visually grasp the deviation from the target route more easily.

In the present embodiment, as illustrated in FIG. 48, the information icons K401 to K403 can be hidden by an operation on the guidance screen Dp4. This enlarges the display area of the map M1 and improves the visibility of the map M1. In addition, since the display/non-display of the information icons K401 to K403 can be switched by the operation on the guidance screen Dp4, the number of the operations performed by the user can be reduced, and the switching operation can be performed even during the work.

Here, information displayed on each of the information icons K401 to K403 can be changed (edited) by long-pressing respective one of the information icons K401 to K403. That is, in the example of FIG. 46, while "VEHICLE SPEED" is displayed in the information icon K401, the speed of the engine 131 or the like can be displayed in the information icon K401.

In addition, when the number of the target routes (straight routes) drawn in the lateral direction on the map M1 is relatively increased, the operator can easily grasp the work range of the work machine 10. Furthermore, the hidden route objects Ob44, Ob45 display the number of the target routes (straight routes) that are hidden (not displayed) on the left side and the right side of the guidance screen Dp4, respectively. This allows the operator to grasp the work range of the work machine 10 more easily.

Figure 49:
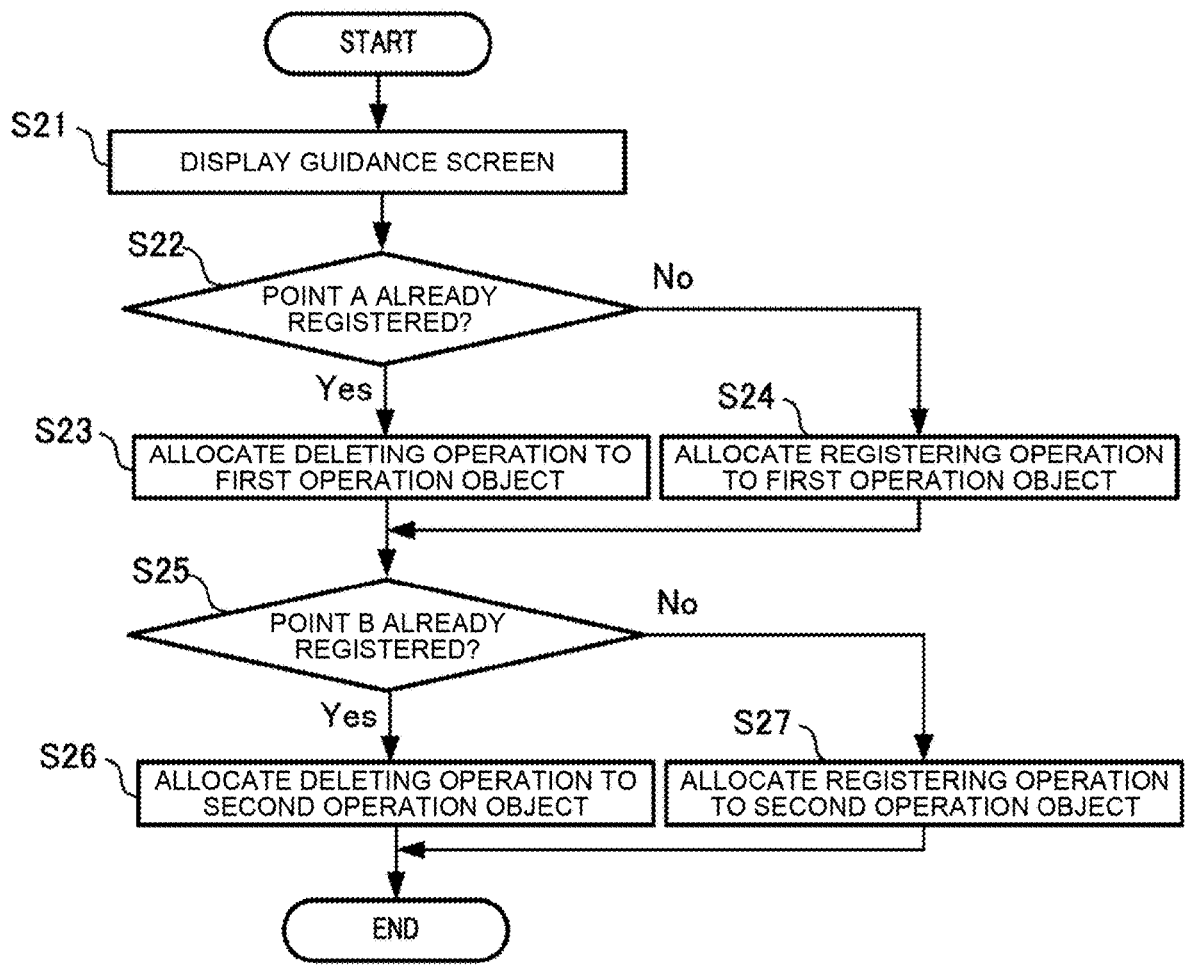
FIG. 49 is a flowchart illustrating an example of a procedure for the operation control processing that is executed by the work machine according to the first embodiment of the present invention.

FIG. 49 is a flowchart illustrating an example of processing related to the guidance screen Dp4 in the operation control method according to the present embodiment.

More specifically, first, the display processing unit 711 displays the guidance screen Dp4 on the operation display unit 73 (S21). The display processing unit 711 determines whether the point A (first reference point) has been registered (S22). If the point A has been registered (S22: Yes), the display processing unit 711 assigns the deletion operation of the point A to the first operation object Ob41 (S23). If the point A has not been registered (S22: No), the display processing unit 711 assigns the registration operation of the point A to the first operation object Ob41 (S24).

Next, the display processing unit 711 determines whether the point B (second reference point) has been registered (S25). If the point B has been registered (S25: Yes), the display processing unit 711 assigns the deletion operation of the point B to the second operation object Ob42 (S26). If the point B has not been registered (S25: No), the display processing unit 711 assigns the registration operation of the point B to the second operation object Ob42 (S27).

The automatic travel system 100A repeatedly executes the processing in above steps S21 to S27. However, the flowchart illustrated in FIG. 49 is merely one example. The processing may appropriately be added or omitted, or the order of the processing may appropriately be changed.

[2.5] UFO Operation Screen Dp5

Next, a description will be made on the UFO operation screen Dp5 related to the horizontal control for the work implement 14 with reference to FIGS. 50 to 53.

Figure 50:
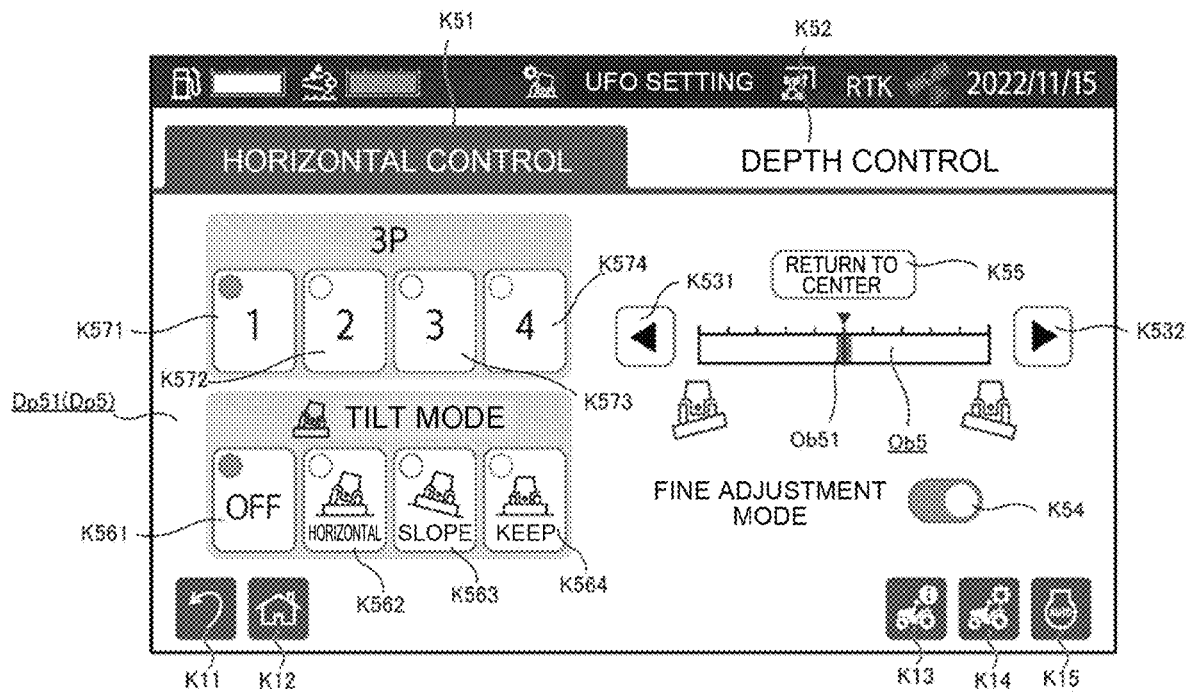
FIG. 50 is a view illustrating an example of the display screen that is displayed on the operation terminal by the operation control method according to the first embodiment of the present invention.

The UFO operation screen Dp5 (the UFO operation screen Dp51 related to the horizontal control) is an example of the "horizontal control operation screen". The UFO operation screen Dp51 includes a control operation unit that accepts an operation by the user (operator). As illustrated in FIG. 50, the control operation unit includes first operation elements K531, K532, a second operation element K54, a third operation element K55, and fourth operation elements K561 to K564. Furthermore, the UFO operation screen Dp51 includes a tilt display object Ob5, fifth operation elements K571 to K574 of the control operation unit, and the like. The fifth operation elements K571 to K574 are used for an operation for 3P switching (attachment types of the work implement 14).

The fourth operation elements K561 to K564 are each assigned with a function to switch the control mode in the horizontal control. That is, any one of the fourth operation elements K561 to K564 is alternatively selected, and the control mode corresponding to selected one of the fourth operation elements K561 to K564 is applied. The control modes include an "OFF mode" associated with the fourth operation element K561, a "horizontal mode" associated with the fourth operation element K562, a "slope mode" associated with the fourth operation element K563, and a "keep mode" associated with the fourth operation element K564.

The "OFF mode" is a mode in which the horizontal control does not function and the work implement 14 is not fixed to the machine body 101 so as not to be tilted. The "horizontal mode" is a mode in which the work implement 14 is controlled to remain horizontal even when the machine body 101 is tilted. The "slope mode" is a mode in which the tilt of the work implement 14 is controlled such that the work implement 14 is parallel to the machine body 101 in a tilted state. The "keep mode" is a mode for work using a traction system and is a mode in which a length of a cylinder for controlling the tilt of the work implement 14 is controlled to be kept constant.

Since such fourth operation elements K561 to K564 are included as the control operation units in the UFO operation screen Dp51 (horizontal control operation screen), the user (operator) can easily perform an operation to switch the control mode in the horizontal control.

The tilt display object Ob5 is a graph representing the currently set tilt of the work implement 14 (in a roll direction of the machine body 101). As an example, when an indicator Ob51 deviates from a center to either side in the lateral direction (left-right direction), it indicates that the work implement 14 is tilted with respect to the machine body 101. In addition, it indicates that, as the indicator Ob51 moves farther away from the center (approaches an end of the graph), a tilt angle is increased. Furthermore, the tilt display object Ob5 indicates the tilt with a center position (that is, a position with the tilt "0") as a guide.

Figure 51:
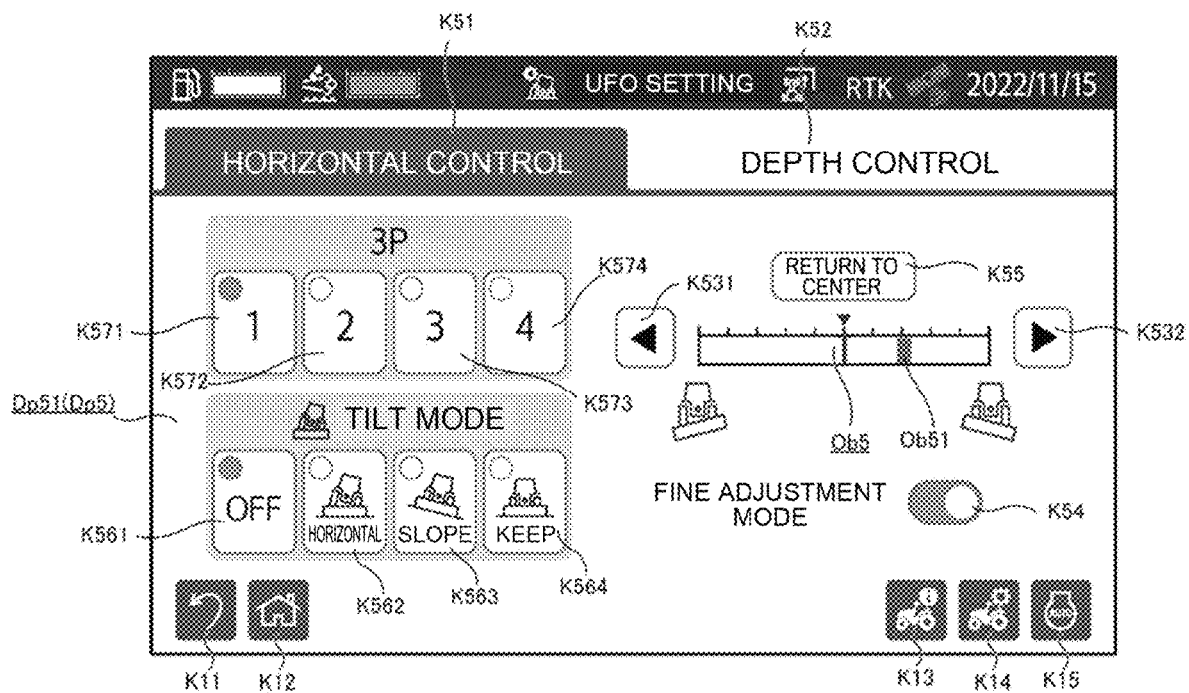
FIG. 51 is a view illustrating an example of the display screen that is displayed on the operation terminal by the operation control method according to the first embodiment of the present invention.

The first operation elements K531, K532 are each assigned with a function to adjust the tilt angle of the work implement 14 with respect to the machine body 101. That is, when the operator presses the first operation element K531 formed as a left cursor, the indicator Ob51 of the tilt display object Ob5 moves leftward, and the work implement 14 is tilted downward to the left with respect to the machine body 101. On the contrary, when the operator presses the first operation element K532 formed as a right cursor, as illustrated in FIG. 51, the indicator Ob51 of the tilt display object Ob5 moves rightward, and the work implement 14 is tilted downward to the right with respect to the machine body 101. In the present embodiment, as an example, the tilt angle can be adjusted stepwise every time the first operation element K531 or K532 is pressed. However, the present invention is not limited to this example, and the tilt angle of the work implement 14 may be adjustable in the stepless manner.

Since such first operation elements K531, K532 are included as the control operation units in the UFO operation screen Dp51 (horizontal control operation screen), the user (operator) can manually adjust the tilt of the work implement 14 with respect to the machine body 101.

The second operation element K54 is assigned with a function to change an amount of a change in the tilt angle for the operation of each of the first operation elements K531, K532. More specifically, the second operation element K54 accepts an operation to switch ON/OFF of a fine adjustment mode. That is, when the operator presses the second operation element K54, the amount of the change in the tilt angle (an amount of movement of the indicator Ob51) during the operation of the first operation elements K531, K532 is changed. When the fine adjustment mode is ON, a step size of (the amount of the change in) the tilt angle with respect to single pressing of either one of the first operation elements K531, K532 becomes smaller than that at the time when the fine adjustment mode is OFF.

Since such a second operation elements K54 is included as the control operation unit in the UFO operation screen Dp51 (horizontal control operation screen), the user (operator) can easily and manually perform the fine adjustment of the tilt of the work implement 14 with respect to the machine body 101.

The third operation element K55 is assigned with a function to reset the tilt angle of the work implement 14 that has been adjusted by the first operation elements K531, K532. More specifically, the third operation element K55 is a return-to-center button, sets the tilt angle of the work implement 14 with respect to the machine body 101 to "0", and moves the indicator Ob51 of the tilt display object Ob5 to the center position (that is, the position with the tilt "0").

Since such a third operation element K55 is included as the control operation unit in the UFO operation screen Dp51 (horizontal control operation screen), the user (operator) can reset the tilt of the work implement 14 with respect to the machine body 101 only by operating the third operation element K55 without repeatedly operating the first operation elements K531, K532.

In addition, since the tilt display object Dp5, which is included in the UFO operation screen Dp51 (horizontal control operation screen), is changed in conjunction with the change in the tilt angle of the work implement 14 with respect to the machine body 101, the tilt angle of the work implement 14 can easily be grasped with the tilt display object Ob5. In other words, when the indicator Ob51 of the tilt display object Ob5 is moved by the operation of the first operation elements K531, K532, the tilt angle of the work implement 14 with respect to the machine body 101 is changed in a manner to follow the movement.

As it has been described so far, the operation control method according to the present embodiment includes displaying the horizontal control operation screen (UFO operation screen Dp51), which is related to the horizontal control for controlling the tilt of the work implement 14 with respect to the machine body 101, for the work machine 10 including the machine body 101 and the work implement 14 attached to the machine body 101. Furthermore, the operation control method includes making the setting on the horizontal control in accordance with the user's operation of the control operation units (the first operation elements K531, K532 and the like) included in the horizontal control operation screen.

In regard to the horizontal control, for example, in the case where the user (operator) has to adjust the tilt angle of the work implement 14 with respect to the machine body 101, or the like, the work efficiency is possibly reduced depending on a skill level of the user. However, according to the configuration of the present embodiment, since such adjustment can be made on the UFO operation screen Dp51, a difficulty level is lowered. Therefore, there is an advantage that it is possible to improve the work efficiency of the work machine 10 including the machine body 101 and the work implement 14 attached to the machine body 101.

By the way, in the present embodiment, the tilt display object Ob5 does not interlock with the change in the tilt angle that is associated with switching of the control mode in the horizontal control. That is, as a premise, the tilt display object Ob5 is always included in the UFO operation screen Dp51 regardless of the control mode of the horizontal control. For example, even in the "OFF mode", the tilt display object Ob5 remains displayed, the indicator Ob51 of the tilt display object Ob5 is moved by the operation of the first operation elements K531, K532, and the tilt angle of the work implement 14 is also changed.

However, since the tilt angle of the work implement 14 may be changed in association with switching of the control mode, interlocking of the tilt display object Ob5 is temporarily canceled in a period in which the tilt angle of the work implement 14 is changed in association with switching of the control mode. In this way, for example, even in the case where the tilt angle of the work implement 14 is changed when the control mode is switched from the "slope mode" to the "horizontal mode", the indicator Ob51 of the tilt display object Ob5 does not move in response to the change in the tilt angle at this time. Thus, for example, in the case where the indicator Ob51 of the tilt display object Ob5 is located at the center position in the control mode before switching, the indicator Ob51 of the tilt display object Ob5 remains located at the center position in the control mode after switching.

Figure 52:
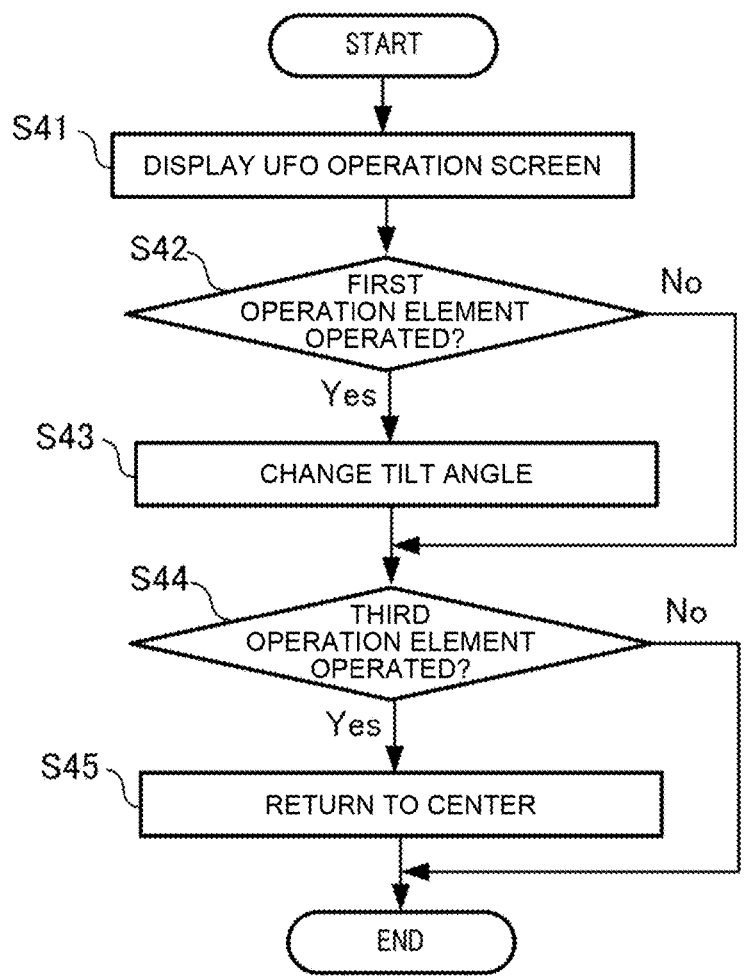
FIG. 52 is a flowchart illustrating an example of a procedure for the operation control processing that is executed by the work machine according to the first embodiment of the present invention.

FIG. 52 is a flowchart illustrating an example of processing related to the UFO operation screen Dp51 in the operation control method according to the present embodiment.

More specifically, first, the display processing unit 711 displays the UFO operation screen Dp51 on the operation display unit 73 (S41). The setting processing unit 714 determines whether there is the user's operation on at least one of the first operation elements K531, K532 included in the UFO operation screen Dp51 (S42). Then, if at least one of the first operation elements K531, K532 is operated (S42: Yes), the processing proceeds to step S43. If none of the first operation elements K531, K532 is not operated (S42: No), the processing in step S43 is skipped, and the processing proceeds to step S44.

In step S43, in consideration of the operation state of the second operation element K54 (ON/OFF of the fine adjustment mode), the setting processing unit 714 changes the tilt angle of the work implement 14 in response to the operation of either one of the first operation elements K531, K532. At this time, the indicator Ob51 of the tilt display object Ob5 also moves.

Then, the setting processing unit 714 determines whether there is the user's operation on the third operation element K55 included in the UFO operation screen Dp51 (S44). If the third operation element K55 is operated (S44: Yes), the indicator Ob51 of the tilt display object Ob5 is returned to the center (S45). If the third operation element K55 is not operated (S44: No), the processing in step S45 is skipped, and a series of the processing is terminated.

The automatic travel system 100A repeatedly executes the processing in above steps S41 to S45. However, the flowchart illustrated in FIG. 52 is merely one example. The processing may appropriately be added or omitted, or the order of the processing may appropriately be changed.

[3] Modifications

Modifications of the first embodiment will be listed below. The modifications, which will be described below, can be applied in combination as appropriate.

The automatic travel system 100A according to the present disclosure includes a computer system. The computer system includes, as main components, one or more processors and one or more memories as hardware. When the processor executes a program (operation control program) recorded in the memory of the computer system, the functions as the automatic travel system 100A in the present disclosure are implemented. The program may be recorded in the memory of the computer system in advance, may be provided through an electric communication line, or may be recorded on a non-transitory recording medium such as a memory card, an optical disk, or a hard disk drive that can be read by the computer system. Some or all of the functional units included in the automatic travel system 100A may each be configured as an electronic circuit.

The configuration that at least some of the functions of the automatic travel system 100A are integrated in a single casing is not an essential configuration of the automatic travel system 100A. The components of the automatic travel system 100A may separately be distributed in plural devices. On the contrary, in the first embodiment, the functions that are separately distributed in the plural devices may be integrated in the single casing. Furthermore, at least some of the functions of the automatic travel system 100A may be implemented by a cloud (cloud computing) or the like.

The operation terminal 17 is not limited to the general-purpose terminal such as the tablet terminal, the smartphone, or the laptop computer, and may be a dedicated terminal. Furthermore, a plurality of the operation terminals 17 may be associated with the single work machine 10. In this case, the single work machine 10 can be controlled by the plurality of the operation terminals 17. On the contrary, a plurality of the work machines 10 may be associated with the single operation terminal 17. In this case, the plurality of the work machines 10 can be controlled by the single operation terminal 17.

It is not essential to collectively adjust the acceleration during the speed reduction and the acceleration during the speed increase. The acceleration during the speed reduction and the acceleration during the speed increase may separately be adjusted. Furthermore, it is not essential that the acceleration (positive acceleration) during the speed increase can be adjusted.

The configuration of the first embodiment can be employed in combination with the various configurations (including the modifications) described in the basic configuration as appropriate.

Second Embodiment

The automatic travel system 100A according to the present embodiment (an example of the operation control system) differs from that in the first embodiment mainly in a mode of the setting on the speed change feeling (acceleration) of the travel system 13. Hereinafter, the same components as those in the first embodiment will be denoted by the same reference signs, and the description thereon will appropriately be omitted.

In the present embodiment, the acceleration adjustment processing unit 112 classifies the plurality of the speed ranges, which can be switched by the auxiliary transmission, into two or more speed change groups, and adjusts the acceleration for each speed group to generate the acceleration designated by the user. More specifically, the work machine 10 includes the auxiliary transmission that can switch the speed range of the work machine 10 among the plurality of the speed ranges. These plural speed ranges (switchable by the auxiliary transmission) are divided into the two or more speed change groups, and the acceleration can be adjusted for each speed change group in accordance with the user's operation.

The "speed change group" described in the present disclosure means a set of the classified speed ranges in a case where the plurality of the speed ranges, which can be switched by the auxiliary transmission, is classified into plural (two or more) sets. Each of the speed change groups only needs to have the one or more speed ranges. For example, the three speed ranges including the "C stage", the "first speed", and the "second speed" can be classified into a speed change group including a single speed range and a speed change group including two speed ranges. As an example, the three speed ranges including the "C stage", the "first speed", and the "second speed" can be classified into a speed change group including the "C stage" and the "first speed" and a speed change group including the "second speed". Alternatively, these three speed ranges can be classified into a speed change group including the "C stage", a speed change group including the "first speed", and a speed change group including the "second speed".

In short, in the operation control method according to the present embodiment, the acceleration (speed change feeling) is not uniformly designated for all the speed ranges, but the different acceleration (speed change feeling) can be designated for each of the speed ranges. For example, while the high acceleration is set to enable the rapid acceleration in the part of the plural speed ranges, the low acceleration is set in the other speed range to enable suppression of the speed change shock to be small.

With this configuration, the acceleration (speed change feeling) can be adjusted to the appropriate acceleration (speed change feeling) for each of the speed ranges, which can be switched by the auxiliary transmission. Thus, this leads to the improvement in the operability of the work machine 10.

In the present embodiment, as an example, the speed ranges of the auxiliary transmission, which can be switched in accordance with the operation of the secondary speed change lever 182, are the three speed ranges including the "C stage", the "first speed", and the "second speed". These three speed ranges are classified into a first speed change group including the "C stage" and the "first speed" and a second speed change group including the "second speed". That is, the two or more speed change groups are a first group including the speed ranges for the work (the "C stage" and the "first speed") and a second group including the speed range for road travel (the "second speed").

With this configuration, for example, when the speed range of the auxiliary transmission is the "C stage" or the "first speed", which is used for the work such as the tillage work, in accordance with the operation of the secondary speed change lever 182, the high acceleration is set to enable the rapid acceleration. Meanwhile, when the speed range of the auxiliary transmission is the "second speed" for the road travel, the low acceleration is set to enable the suppression of the speed change shock to be small. Therefore, the acceleration (speed change feeling) can be changed in accordance with a situation where the work machine 10 is used, which leads to the further improvement in the operability of the work machine 10.

Figure 53:
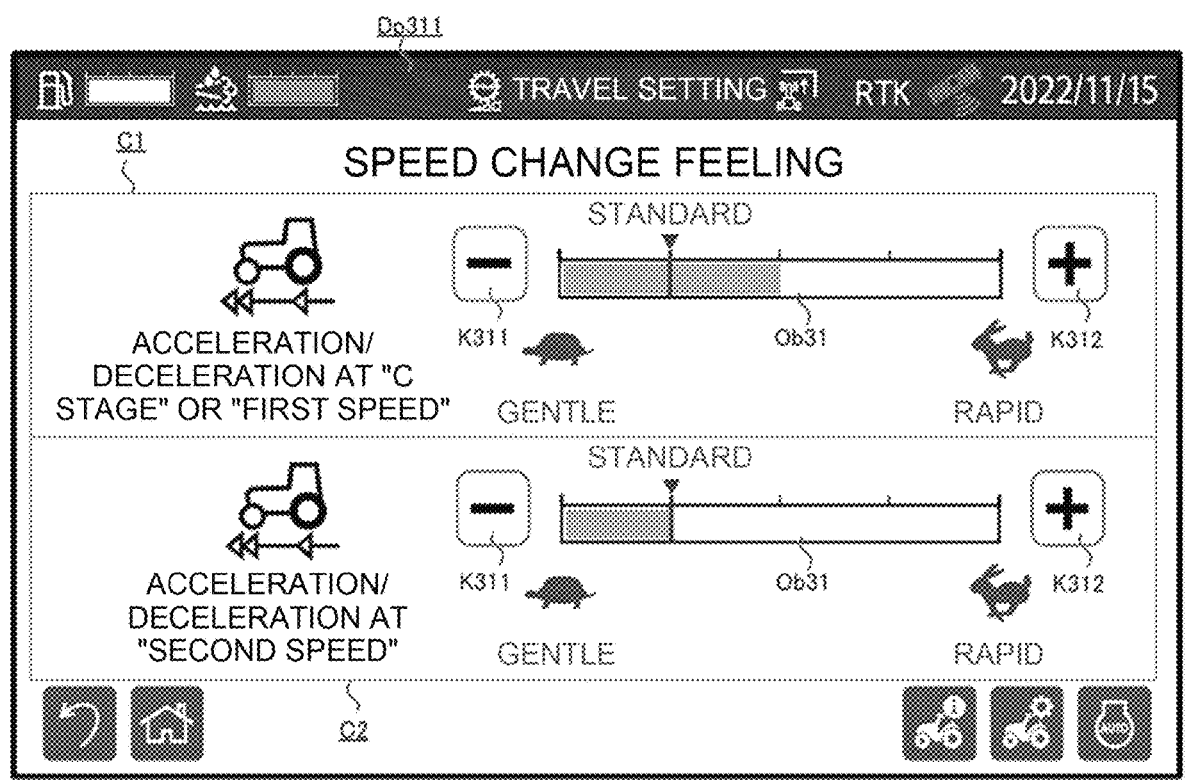
FIG. 53 is a view illustrating an example of a display screen that is displayed on an operation terminal by an operation control method according to a second embodiment of the present invention.

More specifically, on a travel setting screen Dp311 as illustrated in FIG. 53, for example, it is possible to make the settings on the speed change feeling (acceleration) of the travel system 13 for each speed change group. That is, when the operator performs an operation to designate the acceleration (speed change feeling) for each speed change group on the travel setting screen Dp311, the acceleration adjustment processing unit 112 adjusts the acceleration so as to obtain the designated acceleration for each speed change group.

The travel setting screen Dp311 illustrated in FIG. 53 includes: a first adjustment field C1 used to adjust the acceleration for the first group (speed change group including the "C stage" and the "first group"); and a second adjustment field C2 used to adjust the acceleration for the second group (speed change group including the "second speed"). The first adjustment field C1 and the second adjustment field C2 are aligned (for example, in the up-down direction) in the travel setting screen Dp311. Similar to the travel setting screen Dp31 (see FIG. 42) described in the first embodiment, each of the first adjustment field C1 and the second adjustment field C2 includes the minus key K311, the plus key K312, and the acceleration object Ob31.

On this travel setting screen Dp311, for example, when the operator presses the minus key K311 in the first adjustment field C1, the acceleration indicated by the acceleration object Ob31 in the first adjustment field C1 is reduced, and the acceleration for each of the speed ranges of the first group, that is, the "C stage" and the "first speed" is reduced. At this time, the acceleration indicated by acceleration object Ob31 in the second adjustment field C2 is not changed, and the acceleration for the speed range of the second group, that is, the "second speed" is not changed.

In addition, on the travel setting screen Dp311, for example, when the operator presses the plus key K312 in the second adjustment field C2, the acceleration indicated by the acceleration object Ob31 in the second adjustment field C2 is increased, and the acceleration for the speed range of the second group, that is, "the "second speed" is increased. At this time, the acceleration indicated by acceleration object Ob31 in the first adjustment field C1 is not changed, and the acceleration for each of the speed ranges of the first group, that is, the "C stage" and the "first speed" is not changed.

Just as described, in the operation control method according to the present embodiment, the acceleration can be adjusted independently for each speed change group. In other words, the acceleration (speed change feeling) is adjusted separately for each speed change group, and the adjustment of the acceleration for one of the speed change groups does not affect the adjustment of the acceleration for the other speed change group. This makes it possible to adjust the acceleration (speed change feeling) to the desired acceleration (speed change feeling) for each of the speed ranges, which can be switched by the auxiliary transmission, and thus leads to the improvement in the operability of the work machine 10.

In addition, the travel setting screen Dp311 as illustrated in FIG. 53 includes, on a single screen, the acceleration operation units (the minus key K311, the plus key K312, and the like) to adjust the acceleration for each of the first group and the second group. In this way, in the travel setting screen Dp311, the acceleration can be adjusted for both of the first group and the second group on the single screen.

That is, the operation control method according to the present embodiment includes displaying the travel setting screen Dp311 for adjusting the acceleration. Then, the acceleration can be adjusted in accordance with the user's operation on the acceleration operation unit that is included in the travel setting screen Dp311. Here, the acceleration for each of the two or more speed change groups can be adjusted on the single screen. Thus, the user (operator) can adjust the acceleration for the two or more speed change groups on the single screen. Furthermore, in the travel setting screen Dp311, the acceleration objects Ob31, each of which represents the acceleration for respective one of the two or more speed change groups, are aligned on the single screen. Thus, the operator can easily compare the acceleration for the two or more speed change groups.

Figure 54:
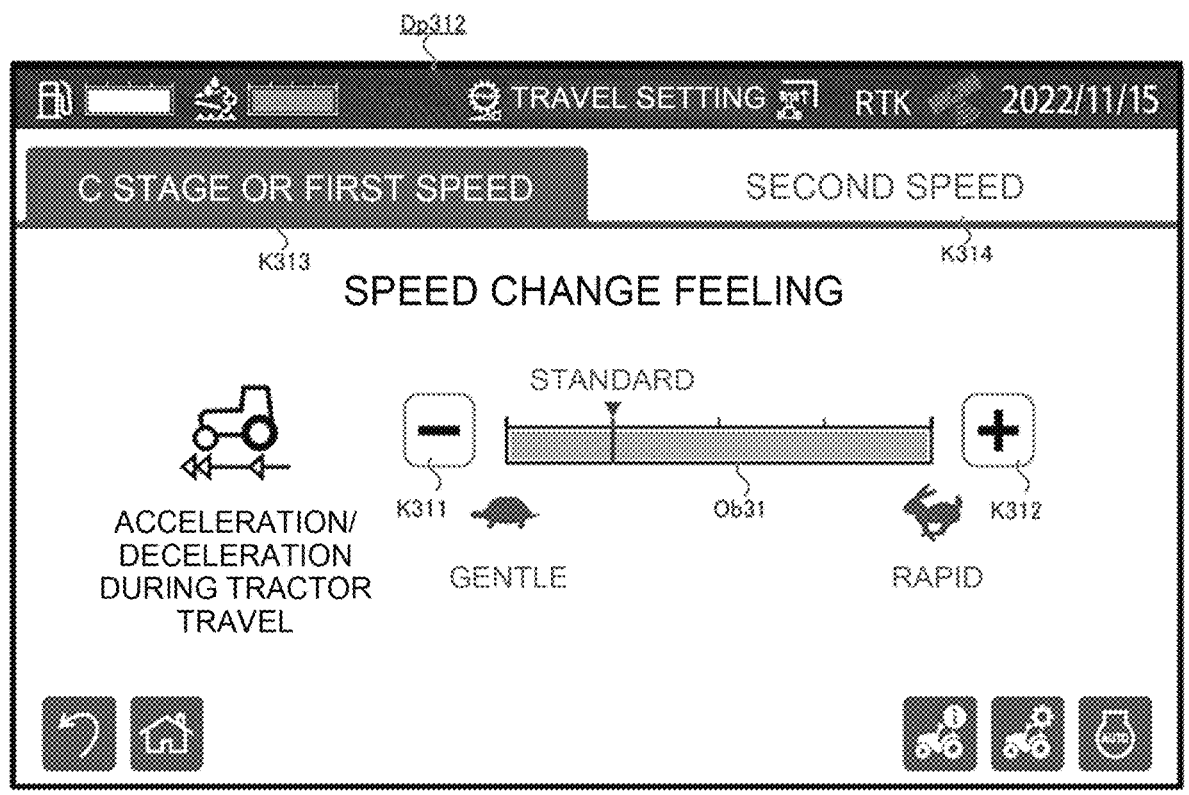
FIG. 54 is a view illustrating an example of the display screen that is displayed on the operation terminal by the operation control method according to the second embodiment of the present invention.

FIG. 54 illustrates a travel setting screen Dp312 of another mode that can be displayed by the operation control method according to the present embodiment. Also, on the travel setting screen Dp312 illustrated in FIG. 54, it is possible to make the settings on the speed change feeling (acceleration) of the travel system 13 for each speed change group.

The travel setting screen Dp312 illustrated in FIG. 54 includes two tabs K313, K314 in addition to the minus key K311, the plus key K312, and the acceleration object Ob31, and the speed change group, for which the acceleration is adjusted, is switched by a selection operation of the tabs K313, K314. More specifically, when the tab K313 for "C STAGE OR FIRST SPEED" is operated, the travel setting screen Dp312 becomes a screen for adjusting the acceleration for the first group (speed change group including the "C stage" and the "first speed"). When the tab K314 for "SECOND SPEED" is operated, the travel setting screen Dp312 becomes a screen for adjusting the acceleration for the second group (speed change group including the "second speed").

On this travel setting screen Dp312, for example, when the operator presses the minus key K311 in a state where the tab K313 for "C STAGE OR FIRST SPEED" is selected, the acceleration for each of the speed ranges of the first group, that is, the "C stage" and the "first speed" is reduced. At this time, the acceleration for the speed range of the second group, that is, the "second speed" is not changed. Meanwhile, on this travel setting screen Dp312, for example, when the operator presses the plus key K312 in a state where the tab K314 for "SECOND SPEED" is selected, the acceleration for the speed range of the second group, that is, the "second speed" is increased. At this time, the acceleration for each of the speed ranges of the first group, that is, the "C stage" and the "first speed" is not changed.

The travel setting screen Dp312 as illustrated in FIG. 54 includes the acceleration operation units (the minus keys K311, the plus keys K312, and the like) to adjust the acceleration for the first group and the second group on separate screens that are switched by the operation of the tabs K313, K314. In this way, in the travel setting screen Dp312, the acceleration can be adjusted for each of the first group and the second group on the separate screen.

That is, the operation control method according to the present embodiment includes displaying the travel setting screen Dp312 for adjusting the acceleration. Then, the acceleration can be adjusted in accordance with the user's operation on the acceleration operation unit that is included in the travel setting screen Dp312. Here, the acceleration for each of the two or more speed change groups can be adjusted on the separate screen. Thus, the user (operator) can adjust the acceleration for the two or more speed change groups on the separate screens, and a major portion of the travel setting screen Dp312 can be used for the acceleration adjustment for the single speed change group.

In addition, the screen switching for adjusting the acceleration for each of the two or more speed change groups as described above is not limited to the operation of the tabs K313, K314, but may be performed by an appropriate method such as a screen transition or pop-up display.

Figure 55:
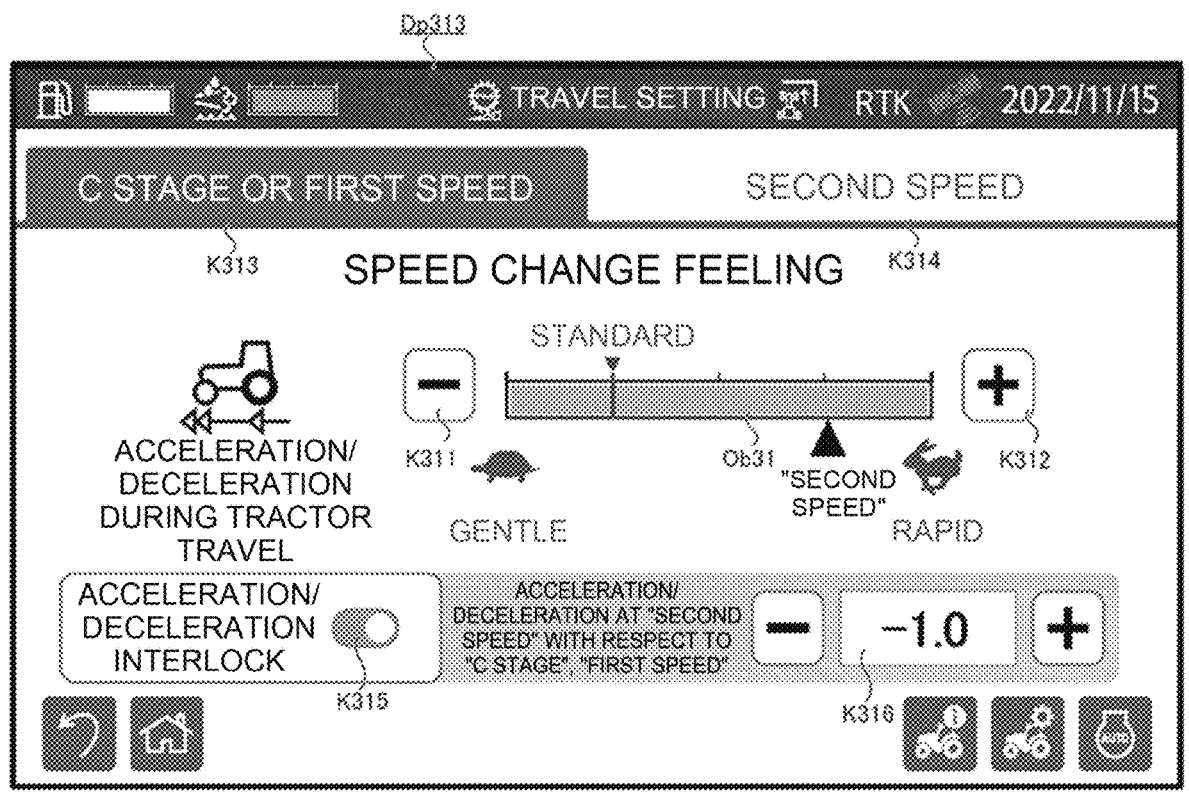
FIG. 55 is a view illustrating an example of the display screen that is displayed on the operation terminal by the operation control method according to the second embodiment of the present invention.

FIG. 55 illustrates a travel setting screen Dp313 of further another mode that can be displayed by the operation control method according to the present embodiment. Also, on the travel setting screen Dp313 illustrated in FIG. 55, it is possible to make the settings on the speed change feeling (acceleration) of the travel system 13 for each speed change group.

The travel setting screen Dp313 illustrated in FIG. 55 includes, in addition to the travel setting screen Dp312 illustrated in FIG. 54, an interlock switch K315 and a relative value designation field K316. When the interlock switch K315 is "off", a speed change feeling (acceleration) setting mode becomes an independent adjustment mode. When the interlock switch K315 is pressed to be "on", the speed change feeling (acceleration) setting mode becomes an interlocking adjustment mode.

In the independent adjustment mode, the relative value designation field K316 is inactive (or hidden), and the acceleration is adjusted by the same operation as that on the travel setting screen Dp312 illustrated in FIG. 54. That is, the acceleration can be adjusted independently for each speed change group.

Meanwhile, in the interlocking adjustment mode, the acceleration for each of the speed ranges of the first group, that is, the "C stage" and the "first speed" and the acceleration for the speed range of the second group, that is, the "second speed" are adjusted in an interlocking manner with each other. For example, when the acceleration for one of the first group and the second group is adjusted, the acceleration for the other group is automatically adjusted in accordance with a relative value designated in the relative value designation field K316. The value (relative value) in the relative value designation field K316 can be adjusted with a plus button and a minus button. That is, the acceleration can be adjusted in the interlocking manner between the different speed change groups.

As an example, such a case is assumed that the interlock switch K315 is "on" (the interlocking adjustment mode) and the relative value is set to "−1.0" in the relative value designation field K316. In this case, on the travel setting screen Dp313, for example, when the operator presses the minus key K311 in the state where the tab K313 for "C STAGE OR FIRST SPEED" is selected, the acceleration for each of the speed ranges of the first group, that is, the "C stage" and the "first speed" is reduced. At this time, the acceleration for the speed range of the second group, that is, "second speed" is also reduced in the interlocking manner with the acceleration for the first group, and is adjusted to the value of "−1.0" with respect to the acceleration for the first group.

Meanwhile, in this travel setting screen Dp313, for example, when the operator presses the plus key K312 in the state where the tab K314 for "SECOND SPEED" is selected, the acceleration for the speed range of the second group, that is, the "second speed" is increased. At this time, the acceleration for each of the speed ranges of the first group, that is, the "C stage" and the "first speed" is also increased in the interlocking manner with the acceleration for the second group, and is adjusted to the value of "+1.0" with respect to the acceleration for the second group.

Just as described, since the acceleration can be adjusted in the interlocking manner between the different speed change groups, time and effort for the user (operator) to adjust the acceleration for the two or more speed change groups is reduced.

On the travel setting screen Dp313 illustrated in FIG. 55, it is not essential that the mode can be switched between the independent adjustment mode and the interlocking adjustment mode, but the mode may be fixed to the interlocking adjustment mode. Furthermore, it is not essential that the relative value can be adjusted in the relative value designation field K316, but the relative value may be a fixed value.

The configuration of the second embodiment can be employed in combination with the various configurations (including the modifications) described in the basic configuration and the first embodiment as appropriate.

[Supplementary Notes of Invention]

Hereinafter, a summary of the present invention extracted from the above-described embodiments will be described below as supplementary notes. It should be noted that configurations and processing function, which will be described in the supplementary notes below, may appropriately be selected, omitted, or combined.

<Supplementary Note 1>

An operation control method includes:
  executing travel control related to travel of a work machine; and
  adjusting acceleration until time at which a travel speed of the work machine reaches a target speed during a speed reduction of the work machine in accordance with a user's operation.

<Supplementary Note 2>

The operation control method according to Supplementary Note 1 further includes:
  adjusting the acceleration until time at which the travel speed of the work machine reaches the target speed during a speed increase of the work machine.

<Supplementary Note 3>

The operation control method according to Supplementary Note 2, in which the acceleration during the speed reduction and the acceleration during the speed increase are collectively adjusted.

<Supplementary Note 4>

The operation control method according to any one of Supplementary Notes 1 to 3 further includes:
  suppressing the acceleration in a start period, in which the speed of the work machine 10 is increased from a stopped state, to be lower than the acceleration other than that in the start period.

<Supplementary Note 5>

The operation control method according to any one of Supplementary Notes 1 to 4 further includes:

setting the target speed in response to an operation of a first operation unit, in which when the target speed is changed in response to the operation of the first operation unit, the acceleration until time at which the travel speed of the work machine reaches the changed target speed is adjusted in accordance with the user's operation.

<Supplementary Note 6>

The operation control method according to Supplementary Note 5 further includes:

reducing the target speed in response to an operation of a second operation unit different from the first operation unit, in which when the target speed is reduced in response to the operation of the second operation unit, the acceleration until time at which the travel speed of the work machine reaches the reduced target speed is adjusted in accordance with the user's operation.

<Supplementary Note 7>

The operation control method according to any one of Supplementary Notes 1 to 6, in which the work machine includes an auxiliary transmission that can switch a speed range of the work machine among a plurality of speed ranges, and the acceleration can be adjusted in accordance with the user's operation only when the speed of the work machine falls within a part of the plurality of speed ranges.

<Supplementary Note 8>

The operation control method according to any one of Supplementary Notes 1 to 7, in which the acceleration can be adjusted in accordance with the user's operation even when the work machine is moving.

<Supplementary Note 9>

The operation control method according to any one of claims 1 to 8 further includes:

displaying a travel setting screen for adjustment of the acceleration, in which the acceleration can be adjusted in accordance with the user's operation on an acceleration operation unit included in the travel setting screen.

<Supplementary Note 10>

The operation control method according to any one of Supplementary Notes 1 to 9 further includes:

causing the work machine to autonomously travel, in which adjustment of the acceleration is disabled during autonomous travel of the work machine.

<Supplementary Note 11>

The operation control method according to any one of Supplementary Notes 1 to 10, in which the work machine includes an auxiliary transmission that can switch a speed range of the work machine among a plurality of speed ranges, and the plurality of speed ranges is divided into two or more speed change groups, and the acceleration can be adjusted in accordance with the user's operation for each of the speed change groups.

<Supplementary Note 12>

The operation control method according to Supplementary Note 11, in which the two or more speed change groups are a first group including a speed range for work and a second group including a speed range for road travel.

<Supplementary Note 13>

The operation control method according to Supplementary Note 11 or 12, in which the acceleration can be adjusted independently for each of the speed change groups.

<Supplementary Note 14>

The operation control method according to any one of Supplementary Notes 11 to 13 further comprising:

displaying a travel setting screen for adjustment of the acceleration, in which the acceleration can be adjusted in accordance with the user's operation on an acceleration operation unit included in the travel setting screen, and the acceleration for each of the two or more speed change groups can be adjusted on one screen.

<Supplementary Note 15>

The operation control method according to any one of Supplementary Notes 11 to 13 further comprising:

displaying a travel setting screen for adjustment of the acceleration, in which the acceleration can be adjusted in accordance with the user's operation on an acceleration operation unit included in the travel setting screen, and the acceleration for each of the two or more speed change groups can be adjusted on a separate screen.

REFERENCE SIGNS LIST

10: Work machine
100, 100A: Automatic travel system (operation control system)
111: Travel control processing unit
112: Acceleration adjustment processing unit
181: Primary speed change lever (first operation unit)
183: Reverser lever (first operation unit)
185: Brake pedal (second operation unit)
186: Clutch pedal (second operation unit)
Dp31, Dp311, Dp312, Dp313: Travel setting screen
K311: Minus key (acceleration operation unit)
K312: Plus key (acceleration operation unit)
T1: Start period
V1, V2: Target speed

The invention claimed is:

1. An operation control method comprising:

executing travel control related to travel of a work machine;

adjusting acceleration until time at which a travel speed of the work machine reaches a target speed during a speed reduction of the work machine in accordance with a user's operation;

displaying a travel setting screen for adjustment of the acceleration, and wherein the acceleration is adjusted in accordance with the user's operation on an acceleration operation unit included in the travel setting screen.

2. The operation control method according to claim 1 further comprising:

adjusting the acceleration until time at which the travel speed of the work machine reaches the target speed during a speed increase of the work machine in accordance with the user's operation.

3. The operation control method according to claim 2, wherein the acceleration during the speed reduction and the acceleration during the speed increase are collectively adjusted.

4. The operation control method according to claim 1, further comprising:
suppressing the acceleration in a start period, in which the speed of the work machine is increased from a stopped state, to be lower than the acceleration other than that in the start period.

5. The operation control method according to claim 1, further comprising:
setting the target speed in response to an operation of a first operation unit, and
wherein, when the target speed is changed in response to the operation of the first operation unit, the acceleration until time at which the travel speed of the work machine reaches the changed target speed is adjusted in accordance with the user's operation.

6. The operation control method according to claim 5, further comprising:
reducing the target speed in response to an operation of a second operation unit different from the first operation unit, and
wherein, when the target speed is reduced in response to the operation of the second operation unit, the acceleration until time at which the travel speed of the work machine reaches the reduced target speed is adjusted in accordance with the user's operation.

7. The operation control method according to claim 1, wherein;
the work machine includes an auxiliary transmission that can switch a speed range of the work machine among a plurality of speed ranges, and
the acceleration is adjusted in accordance with the user's operation only when the speed of the work machine falls within a part of the plurality of speed ranges.

8. The operation control method according to claim 1, wherein the acceleration is adjusted in accordance with the user's operation even when while the work machine is moving.

9. The operation control method according to claim 1, further comprising:
causing the work machine to autonomously travel, and
wherein adjustment of the acceleration is disabled during autonomous travel of the work machine.

10. The operation control method according to claim 1, wherein:
the work machine includes an auxiliary transmission configured to switch a speed range of the work machine among a plurality of speed ranges, and
the plurality of speed ranges is divided into two or more speed change groups, and
the acceleration is adjusted in accordance with the user's operation for each of the speed change groups.

11. The operation control method according to claim 10, wherein the two or more speed change groups are a first group including a speed range for work and a second group including a speed range for road travel.

12. The operation control method according to claim 10, wherein the acceleration is adjusted independently for each of the speed change groups.

13. The operation control method according to claim 10, further comprising:
displaying the travel setting screen for adjustment of the acceleration, and wherein:
the acceleration is adjusted in accordance with the user's operation on the acceleration operation unit included in the travel setting screen, and
the acceleration for each of the two or more speed change groups is adjusted on one screen.

14. The operation control method according to claim 10, further comprising:
displaying the travel setting screen for adjustment of the acceleration, and wherein:
the acceleration is adjusted in accordance with the user's operation on the acceleration operation unit included in the travel setting screen, and
the acceleration for each of the two or more speed change groups is adjusted on a separate screen.

15. An operation control system comprising:
a travel control unit configured to execute travel control related to travel of a work machine;
an acceleration adjustment processing unit configured to adjust acceleration until time at which a travel speed of the work machine reaches a target speed during a speed reduction of the work machine in accordance with a user's operation;
displaying a travel setting screen for adjustment of the acceleration, and
wherein the acceleration is adjusted in accordance with the user's operation on an acceleration operation unit included in the travel setting screen.

16. An operation control program for causing one or more processors to: execute travel control related to travel of a work machine;
adjust acceleration until time at which a travel speed of the work machine reaches a target speed during a speed reduction of the work machine in accordance with a user's operation;
displaying a travel setting screen for adjustment of the acceleration, and
wherein the acceleration is adjusted in accordance with the user's operation on an acceleration operation unit included in the travel setting screen.

* * * * *